(12) United States Patent
Kramar et al.

(10) Patent No.: US 12,221,065 B2
(45) Date of Patent: Feb. 11, 2025

(54) MOBILE KEY ENROLLMENT AND USE

(71) Applicant: Apple Inc., Cupertino, CA (US)

(72) Inventors: Vitalii Kramar, Woodinville, WA (US); Dorian D. Dargan, Oakland, CA (US); Marcel Van Os, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/595,238

(22) Filed: Mar. 4, 2024

(65) Prior Publication Data

US 2024/0198960 A1 Jun. 20, 2024

Related U.S. Application Data

(63) Continuation of application No. 18/128,775, filed on Mar. 30, 2023, now Pat. No. 12,030,458, which is a continuation of application No. 17/077,820, filed on Oct. 22, 2020, now Pat. No. 11,643,048.

(60) Provisional application No. 62/966,481, filed on Jan. 27, 2020.

(51) Int. Cl.
| | |
|---|---|
| B60R 25/24 | (2013.01) |
| B60K 35/00 | (2024.01) |
| B60R 25/01 | (2013.01) |
| B60R 25/25 | (2013.01) |
| G07C 9/00 | (2020.01) |
| B60K 35/10 | (2024.01) |

(52) U.S. Cl.
CPC .............. *B60R 25/24* (2013.01); *B60K 35/00* (2013.01); *B60R 25/01* (2013.01); *B60R 25/25* (2013.01); *G07C 9/00309* (2013.01); *B60K 35/10* (2024.01); *G07C 2009/00412* (2013.01)

(58) Field of Classification Search
CPC ......... B60R 25/24; B60R 25/01; B60R 25/25; B60K 35/00; B60K 2370/12; G07C 9/00309; G07C 2009/00412
See application file for complete search history.

(56) References Cited

U.S. PATENT DOCUMENTS

| | | | |
|---|---|---|---|
| 2,013,027 | A | 9/1935 | Branch |
| 8,353,448 | B1 | 1/2013 | Miller et al. |
| 8,381,969 | B1 | 2/2013 | Miller et al. |
| 8,466,875 | B2 | 6/2013 | Nakada et al. |

(Continued)

FOREIGN PATENT DOCUMENTS

| | | |
|---|---|---|
| AU | 2021213717 A1 | 2/2022 |
| CN | 101689188 A | 3/2010 |

(Continued)

OTHER PUBLICATIONS

Advisory Action received for U.S. Appl. No. 17/030,260, mailed on Dec. 13, 2022, 4 pages.

(Continued)

*Primary Examiner* — Thomas D Alunkal
(74) *Attorney, Agent, or Firm* — DLA Piper LLP (US)

(57) ABSTRACT

A computer system performs techniques related to displaying a representation of a secure credential and using the secure credential. In some embodiments, a computer system detects that the computer system is physically near a vehicle. In some embodiments, a computer system permits a user access to use one or more functions of a vehicle using a secure credential.

33 Claims, 59 Drawing Sheets

(56) References Cited

U.S. PATENT DOCUMENTS

| | | |
|---|---|---|
| 8,943,187 B1 | 1/2015 | Saylor |
| 9,348,492 B1 | 5/2016 | Penilla et al. |
| 9,485,251 B2 | 11/2016 | White et al. |
| 10,163,105 B1 | 12/2018 | Ziraknejad et al. |
| 10,164,975 B1 | 12/2018 | Son et al. |
| 10,192,217 B1 | 1/2019 | Ellis et al. |
| 10,234,953 B1* | 3/2019 | Li ................... G06F 3/1423 |
| 10,242,351 B1 | 3/2019 | Wilson et al. |
| 10,275,956 B1 | 4/2019 | Gehret et al. |
| 10,282,727 B2 | 5/2019 | Van Os et al. |
| 10,332,104 B2* | 6/2019 | Prakash .......... G06Q 20/3674 |
| 10,339,521 B1* | 7/2019 | Bodkin ............. G06Q 20/322 |
| 10,366,387 B2* | 7/2019 | Aabye .............. G06Q 20/36 |
| 10,503,912 B1 | 12/2019 | Kerr |
| 10,701,067 B1 | 6/2020 | Ziraknejad et al. |
| 10,776,779 B1 | 9/2020 | Ellis et al. |
| 10,803,400 B2 | 10/2020 | Sindia et al. |
| 10,853,791 B1* | 12/2020 | Ellis ................ G06Q 20/3676 |
| 10,878,437 B2 | 12/2020 | Ye et al. |
| 11,026,085 B2 | 6/2021 | Grange et al. |
| 11,127,013 B1 | 9/2021 | Boyd et al. |
| 11,157,918 B1 | 10/2021 | Ellison et al. |
| 11,182,774 B1 | 11/2021 | Boyd et al. |
| 11,206,544 B2 | 12/2021 | Boyd et al. |
| 11,312,207 B1 | 4/2022 | Sanders et al. |
| 11,748,507 B2 | 9/2023 | Cool et al. |
| 2002/0120867 A1 | 8/2002 | Mitchell et al. |
| 2005/0099275 A1 | 5/2005 | Kamdar et al. |
| 2005/0177867 A1 | 8/2005 | Toutonghi |
| 2006/0255906 A1 | 11/2006 | Ghabra et al. |
| 2008/0041936 A1 | 2/2008 | Vawter |
| 2008/0048022 A1* | 2/2008 | Vawter .............. G06Q 20/425 235/380 |
| 2008/0214150 A1 | 9/2008 | Ramer et al. |
| 2009/0320125 A1 | 12/2009 | Pleasant et al. |
| 2010/0026503 A1 | 2/2010 | Proefke et al. |
| 2010/0075656 A1* | 3/2010 | Howarter .......... B60R 25/241 340/5.2 |
| 2011/0077983 A1 | 3/2011 | Hua et al. |
| 2011/0126003 A1 | 5/2011 | Engert |
| 2011/0131494 A1 | 6/2011 | Ono et al. |
| 2011/0165859 A1 | 7/2011 | Wengrovitz |
| 2011/0282785 A1 | 11/2011 | Chin |
| 2012/0129493 A1 | 5/2012 | Vasudevan |
| 2012/0200390 A1 | 8/2012 | Saravanan |
| 2012/0323664 A1 | 12/2012 | Klems |
| 2013/0024371 A1 | 1/2013 | Hariramani et al. |
| 2013/0046600 A1 | 2/2013 | Coppinger |
| 2013/0073459 A1 | 3/2013 | Zacarias et al. |
| 2013/0275008 A1 | 10/2013 | Breed |
| 2013/0304642 A1 | 11/2013 | Campos |
| 2014/0047331 A1 | 2/2014 | Feldman et al. |
| 2014/0129053 A1 | 5/2014 | Kleve et al. |
| 2014/0244494 A1 | 8/2014 | Davis et al. |
| 2014/0244495 A1 | 8/2014 | Davis et al. |
| 2014/0244514 A1 | 8/2014 | Rodriguez et al. |
| 2014/0258110 A1* | 9/2014 | Davis ............... G06Q 20/3223 705/26.4 |
| 2014/0279519 A1 | 9/2014 | Mattes et al. |
| 2014/0304173 A1 | 10/2014 | Ernsdorff |
| 2014/0365466 A1 | 12/2014 | Chu et al. |
| 2015/0053757 A1 | 2/2015 | Williams et al. |
| 2015/0074774 A1 | 3/2015 | Nema et al. |
| 2015/0210287 A1 | 7/2015 | Penilla et al. |
| 2015/0271175 A1 | 9/2015 | Je et al. |
| 2015/0278780 A1 | 10/2015 | Vaidyanathan et al. |
| 2015/0324791 A1 | 11/2015 | Khan |
| 2015/0348001 A1 | 12/2015 | Van Os et al. |
| 2016/0018525 A1 | 1/2016 | Lanzagorta |
| 2016/0055511 A1 | 2/2016 | Chidella et al. |
| 2016/0057138 A1* | 2/2016 | Hoyos .............. G06V 40/168 726/7 |
| 2016/0070447 A1 | 3/2016 | Righter et al. |
| 2016/0072794 A1 | 3/2016 | Engert |
| 2016/0078143 A1 | 3/2016 | Huang et al. |
| 2016/0078581 A1 | 3/2016 | Maher |
| 2016/0134599 A1 | 5/2016 | Ross et al. |
| 2016/0180332 A1 | 6/2016 | Wilczynski |
| 2016/0252978 A1* | 9/2016 | Yoo ................... G06F 3/017 345/184 |
| 2016/0259497 A1 | 9/2016 | Foss et al. |
| 2016/0294831 A1 | 10/2016 | Borunda et al. |
| 2016/0295005 A1 | 10/2016 | Schussmann et al. |
| 2016/0300054 A1 | 10/2016 | Turgeman et al. |
| 2016/0357752 A1 | 12/2016 | Yang et al. |
| 2016/0373458 A1 | 12/2016 | Moreton et al. |
| 2017/0032485 A1 | 2/2017 | Vemury |
| 2017/0053470 A1 | 2/2017 | Bergerhoff et al. |
| 2017/0091765 A1 | 3/2017 | Lloyd et al. |
| 2017/0103388 A1 | 4/2017 | Pillai et al. |
| 2017/0109901 A1 | 4/2017 | Raj |
| 2017/0120864 A1 | 5/2017 | Fischer et al. |
| 2017/0124312 A1 | 5/2017 | Inoue |
| 2017/0140642 A1 | 5/2017 | Kim |
| 2017/0151928 A1 | 6/2017 | Kang et al. |
| 2017/0169528 A1 | 6/2017 | Kundu et al. |
| 2017/0213211 A1 | 7/2017 | Sibert et al. |
| 2017/0243200 A1 | 8/2017 | Vaidyanathan et al. |
| 2017/0248946 A1 | 8/2017 | Ogura et al. |
| 2017/0286656 A1 | 10/2017 | Kohli |
| 2017/0343200 A1 | 11/2017 | Lai et al. |
| 2017/0357520 A1 | 12/2017 | De Vries et al. |
| 2018/0018595 A1 | 1/2018 | Scott et al. |
| 2018/0018664 A1 | 1/2018 | Purves et al. |
| 2018/0029560 A1 | 2/2018 | Mohaupt et al. |
| 2018/0033034 A1 | 2/2018 | Ye et al. |
| 2018/0041503 A1 | 2/2018 | Lindemann |
| 2018/0103414 A1 | 4/2018 | Golsch |
| 2018/0108031 A1 | 4/2018 | Jones et al. |
| 2018/0130044 A1* | 5/2018 | Gage ............... G06Q 20/4015 |
| 2018/0165655 A1 | 6/2018 | Marcelle et al. |
| 2018/0165676 A1 | 6/2018 | Bhatt et al. |
| 2018/0167387 A1 | 6/2018 | Bhatt et al. |
| 2018/0186333 A1* | 7/2018 | Santiano ............. H04W 12/08 |
| 2018/0191501 A1 | 7/2018 | Lindemann |
| 2018/0195874 A1 | 7/2018 | Andrew et al. |
| 2018/0260553 A1 | 9/2018 | Hoyos et al. |
| 2018/0265095 A1 | 9/2018 | Joe et al. |
| 2018/0276657 A1 | 9/2018 | Cho et al. |
| 2018/0322488 A1 | 11/2018 | Arana et al. |
| 2018/0335928 A1 | 11/2018 | Van Os et al. |
| 2018/0336327 A1 | 11/2018 | Wallace et al. |
| 2018/0349581 A1 | 12/2018 | Ramalingam |
| 2018/0357846 A1 | 12/2018 | Chen |
| 2018/0367946 A1 | 12/2018 | Best |
| 2019/0043148 A1 | 2/2019 | Vemury |
| 2019/0057412 A1 | 2/2019 | Bhattacharjee et al. |
| 2019/0061687 A1 | 2/2019 | Khalil |
| 2019/0080070 A1 | 3/2019 | Van Os et al. |
| 2019/0080189 A1 | 3/2019 | Van Os et al. |
| 2019/0092279 A1 | 3/2019 | Jarvis et al. |
| 2019/0163876 A1 | 5/2019 | Remme et al. |
| 2019/0164165 A1 | 5/2019 | Ithabathula |
| 2019/0168036 A1 | 6/2019 | Conboy |
| 2019/0168410 A1 | 6/2019 | Conboy |
| 2019/0171998 A1 | 6/2019 | Conboy |
| 2019/0172149 A1 | 6/2019 | Conboy |
| 2019/0172161 A1 | 6/2019 | Conboy |
| 2019/0197527 A1 | 6/2019 | Agarwalla et al. |
| 2019/0213525 A1 | 7/2019 | Haci et al. |
| 2019/0220662 A1 | 7/2019 | Dawoud |
| 2019/0263356 A1 | 8/2019 | Golsch et al. |
| 2019/0287111 A1 | 9/2019 | Cvetkovich et al. |
| 2019/0304216 A1 | 10/2019 | Mendelson et al. |
| 2019/0305949 A1 | 10/2019 | Hamel et al. |
| 2019/0327228 A1 | 10/2019 | Pantfoerder et al. |
| 2019/0355191 A1 | 11/2019 | Jones et al. |
| 2019/0364020 A1 | 11/2019 | Wardell et al. |
| 2019/0370781 A1 | 12/2019 | Van Os et al. |
| 2020/0020196 A1 | 1/2020 | Petersen et al. |
| 2020/0029173 A1 | 1/2020 | Pang et al. |
| 2020/0065822 A1 | 2/2020 | Lin et al. |
| 2020/0079320 A1* | 3/2020 | Lacoss-Arnold ... B60R 25/2081 |
| 2020/0211031 A1 | 7/2020 | Patil |

(56) References Cited

U.S. PATENT DOCUMENTS

| | | |
|---|---|---|
| 2020/0269811 A1 | 8/2020 | Kim et al. |
| 2020/0320653 A1 | 10/2020 | Hastings et al. |
| 2020/0349244 A1 | 11/2020 | Kim et al. |
| 2020/0391049 A1 | 12/2020 | Moffat et al. |
| 2021/0004792 A1 | 1/2021 | Kikinis et al. |
| 2021/0014678 A1 | 1/2021 | Seagraves et al. |
| 2021/0089635 A1 | 3/2021 | Weeresinghe |
| 2021/0127233 A1 | 4/2021 | Santavicca et al. |
| 2021/0229630 A1 | 7/2021 | Kramar et al. |
| 2021/0266500 A1 | 8/2021 | Taylor et al. |
| 2021/0287768 A1 | 9/2021 | Craig et al. |
| 2021/0319468 A1 | 10/2021 | Zhu et al. |
| 2021/0319862 A1 | 10/2021 | Boyd et al. |
| 2021/0321263 A1 | 10/2021 | Boyd et al. |
| 2021/0373744 A1 | 12/2021 | Miller et al. |
| 2021/0373745 A1 | 12/2021 | Chang |
| 2021/0374714 A1 | 12/2021 | Chang |
| 2021/0374750 A1 | 12/2021 | Miller et al. |
| 2021/0377742 A1 | 12/2021 | Boyd et al. |
| 2021/0392125 A1 | 12/2021 | Bryson |
| 2022/0135001 A1 | 5/2022 | Alsina et al. |
| 2022/0277295 A1 | 9/2022 | Robinson-Morgan et al. |
| 2022/0332285 A1 | 10/2022 | Sanders et al. |
| 2022/0391481 A1 | 12/2022 | Gaviola et al. |
| 2022/0391482 A1 | 12/2022 | Gaviola et al. |
| 2023/0039942 A1 | 2/2023 | Young et al. |
| 2023/0045850 A1 | 2/2023 | Sammoura et al. |
| 2023/0089689 A1 | 3/2023 | Bordes et al. |
| 2023/0234537 A1 | 7/2023 | Kramar et al. |
| 2023/0394899 A1 | 12/2023 | Young |
| 2024/0036713 A1 | 2/2024 | Chang |
| 2024/0104188 A1 | 3/2024 | Villanueva Gaviola et al. |
| 2024/0147243 A1 | 5/2024 | Gaviola et al. |
| 2024/0253419 A1 | 8/2024 | Sanders et al. |

FOREIGN PATENT DOCUMENTS

| | | | |
|---|---|---|---|
| CN | 103635923 A | | 3/2014 |
| CN | 103886460 A | | 6/2014 |
| CN | 105099694 A | | 11/2015 |
| CN | 105190659 A | | 12/2015 |
| CN | 105321067 A | | 2/2016 |
| CN | 105338066 A | | 2/2016 |
| CN | 105787755 A | | 7/2016 |
| CN | 106453341 A | | 2/2017 |
| CN | 107609865 A | | 1/2018 |
| CN | 108064393 A | | 5/2018 |
| CN | 109353309 A | | 2/2019 |
| CN | 109949120 A | | 6/2019 |
| CN | 110086609 A | | 8/2019 |
| CN | 110135872 A | | 8/2019 |
| CN | 110197059 A | | 9/2019 |
| CN | 112819475 A | | 5/2021 |
| EP | 2981115 A2 | | 2/2016 |
| EP | 3460692 A1 | | 3/2019 |
| EP | 3476670 A1 | | 5/2019 |
| EP | 3926888 A1 | | 12/2021 |
| JP | 2004-213362 A | | 7/2004 |
| JP | 2012-508930 A | | 4/2012 |
| JP | 2013-37568 A | | 2/2013 |
| JP | 2013-257878 A | | 12/2013 |
| JP | 2016-133969 A | | 7/2016 |
| JP | 2016-526211 A | | 9/2016 |
| JP | 2018-501680 A | | 1/2018 |
| JP | 2018-136886 A | | 8/2018 |
| JP | 2018-156283 A | | 10/2018 |
| JP | 2019-46122 A | | 3/2019 |
| JP | 2019-95880 A | | 6/2019 |
| JP | 2019-149167 A | | 9/2019 |
| JP | 2019-191753 A | | 10/2019 |
| JP | 2019-197332 A | | 11/2019 |
| JP | 2019-535931 A | | 12/2019 |
| KR | 10-2013-0035286 A | | 4/2013 |
| KR | 10-2013-0131956 A | | 12/2013 |
| KR | 10-1509596 B1 | | 4/2015 |
| KR | 10-2015-0066892 A | | 6/2015 |
| KR | 10-1684188 B1 | | 12/2016 |
| KR | 10-2062919 B1 | | 1/2020 |
| KR | 10-2020-0108515 A | | 9/2020 |
| WO | 2008/157016 A1 | | 12/2008 |
| WO | 2013/003210 A3 | | 2/2013 |
| WO | 2014/146186 A1 | | 9/2014 |
| WO | 2015/153154 A1 | | 10/2015 |
| WO | 2015/184353 A1 | | 12/2015 |
| WO | 2015/194135 A1 | | 12/2015 |
| WO | 2016/128569 A1 | | 8/2016 |
| WO | 2017/078635 A1 | | 5/2017 |
| WO | 2017/218490 A1 | | 12/2017 |
| WO | 2018/048703 A1 | | 3/2018 |
| WO | 2018/071674 A1 | | 4/2018 |
| WO | 2018/074504 A1 | | 4/2018 |
| WO | 2018/081317 A1 | | 5/2018 |
| WO | 2018/160863 A1 | | 9/2018 |
| WO | 2019/069129 A1 | | 4/2019 |
| WO | 2019/191213 A1 | | 10/2019 |
| WO | 2020/197694 A1 | | 10/2020 |
| WO | 2021/038298 A2 | | 3/2021 |

OTHER PUBLICATIONS

Advisory Action received for U.S. Appl. No. 17/222,568, mailed on Apr. 20, 2023, 5 pages.
Advisory Action received for U.S. Appl. No. 17/375,767, mailed on Jun. 29, 2023, 2 pages.
Advisory Action received for U.S. Appl. No. 17/485,086, mailed on Sep. 9, 2022, 5 pages.
Applicant-Initiated Interview Summary received for U.S. Appl. No. 17/030,260, mailed on Jan. 7, 2022, 2 pages.
Applicant-Initiated Interview Summary received for U.S. Appl. No. 17/485,086, mailed on Apr. 26, 2022, 2 pages.
Applicant-Initiated Interview Summary received for U.S. Appl. No. 17/030,256, mailed on Feb. 23, 2022, 2 pages.
Applicant-Initiated Interview Summary received for U.S. Appl. No. 17/030,256, mailed on Jun. 17, 2022, 2 pages.
Applicant-Initiated Interview Summary received for U.S. Appl. No. 17/030,257, mailed on Aug. 29, 2022, 5 pages.
Applicant-Initiated Interview Summary received for U.S. Appl. No. 17/030,257, mailed on Feb. 7, 2022, 5 pages.
Applicant-Initiated Interview Summary received for U.S. Appl. No. 17/030,257, mailed on Jan. 31, 2023, 7 pages.
Applicant-Initiated Interview Summary received for U.S. Appl. No. 17/030,259, mailed on Nov. 19, 2021, 18 pages.
Applicant-Initiated Interview Summary received for U.S. Appl. No. 17/030,260, mailed on May 5, 2022, 2 pages.
Applicant-Initiated Interview Summary received for U.S. Appl. No. 17/030,260, mailed on Nov. 29, 2022, 2 pages.
Applicant-Initiated Interview Summary received for U.S. Appl. No. 17/030,260, mailed on Oct. 11, 2022, 2 pages.
Applicant-Initiated Interview Summary received for U.S. Appl. No. 17/077,820, mailed on Oct. 6, 2022, 2 pages.
Applicant-Initiated Interview Summary received for U.S. Appl. No. 17/222,568, mailed on Aug. 25, 2023, 2 pages.
Applicant-Initiated Interview Summary received for U.S. Appl. No. 17/375,767, mailed on Apr. 13, 2023, 2 pages.
Applicant-Initiated Interview Summary received for U.S. Appl. No. 17/375,767, mailed on Dec. 22, 2023, 2 pages.
Applicant-Initiated Interview Summary received for U.S. Appl. No. 17/375,767, mailed on Feb. 2, 2023, 2 pages.
Applicant-Initiated Interview Summary received for U.S. Appl. No. 17/375,767, mailed on Jun. 26, 2023, 2 pages.
Applicant-Initiated Interview Summary received for U.S. Appl. No. 17/375,767, mailed on Oct. 27, 2022, 4 pages.
Applicant-Initiated Interview Summary received for U.S. Appl. No. 17/485,086, mailed on Dec. 23, 2022, 2 pages.
Applicant-Initiated Interview Summary received for U.S. Appl. No. 17/900,734, mailed on Feb. 22, 2024, 3 pages.
Applicant-Initiated Interview Summary received for U.S. Appl. No. 17/900,734, mailed on Nov. 20, 2023, 4 pages.

(56) References Cited

OTHER PUBLICATIONS

August et al., "Mobile web searching", Bell Lab Technical Journal, vol. 6, No. 2, 2002, pp. 84-98.
"Cease", Dictionary.com, Merriam-Webster, 2022, 1 page.
Certificate of Examination received for Australian Patent Application No. 2021100511, mailed on Nov. 5, 2021, 2 pages.
Corrected Notice of Allowance received for U.S. Appl. No. 17/030,256, mailed on Nov. 9, 2022, 8 pages.
Corrected Notice of Allowance received for U.S. Appl. No. 17/030,257, mailed on Nov. 24, 2023, 2 pages.
Corrected Notice of Allowance received for U.S. Appl. No. 17/030,257, mailed on Sep. 12, 2023, 2 pages.
Corrected Notice of Allowance received for U.S. Appl. No. 17/030,259, mailed on Apr. 4, 2022, 2 pages.
Corrected Notice of Allowance received for U.S. Appl. No. 17/030,259, mailed on Jan. 5, 2022, 2 pages.
Corrected Notice of Allowance received for U.S. Appl. No. 17/077,820, mailed on Feb. 6, 2023, 2 pages.
Corrected Notice of Allowance received for U.S. Appl. No. 17/077,820, mailed on Jan. 19, 2023, 2 pages.
Corrected Notice of Allowance received for U.S. Appl. No. 17/077,820, mailed on Mar. 8, 2023, 2 pages.
Corrected Notice of Allowance received for U.S. Appl. No. 17/398,723, mailed on Nov. 15, 2023, 12 pages.
Corrected Notice of Allowance received for U.S. Appl. No. 17/484,306, mailed on Mar. 30, 2022, 4 pages.
Corrected Notice of Allowance received for U.S. Appl. No. 17/485,098, mailed on Oct. 13, 2022, 8 pages.
Corrected Notice of Allowance received for U.S. Appl. No. 18/128,775, mailed on Dec. 7, 2023, 2 pages.
Corrected Notice of Allowance received for U.S. Appl. No. 18/128,775, mailed on Jan. 8, 2024, 2 pages.
Corrected Notice of Allowance received for U.S. Appl. No. 18/128,775, mailed on Nov. 17, 2023, 2 pages.
Dahan et al., "Increasing TeraGrid User Productivity through Integration of Information and Interactive Services", IEEE, 2008, 11 pages.
Decision to Grant received for Danish Patent Application No. PA202170032, mailed on Feb. 1, 2022, 2 pages.
Decision to Grant received for Danish Patent Application No. PA202170598, mailed on Jul. 11, 2023, 1 page.
Eminagaoglu et al., "A Two-Factor Authentication System with QR Codes for Web and Mobile Applications", 2014 Fifth International Conference on Emerging Security Technologies, 2014, pp. 105-112.
Extended European Search Report received for European Patent Application No. 23165330.4, mailed on Jun. 28, 2023, 10 pages.
Final Office Action received for U.S. Appl. No. 17/030,256, mailed on Mar. 14, 2022, 20 pages.
Final Office Action received for U.S. Appl. No. 17/030,257, mailed on Dec. 8, 2022, 29 pages.
Final Office Action received for U.S. Appl. No. 17/030,260, mailed on Mar. 9, 2022, 42 pages.
Final Office Action received for U.S. Appl. No. 17/030,260, mailed on Nov. 4, 2022, 39 pages.
Final Office Action received for U.S. Appl. No. 17/222,568, mailed on Dec. 14, 2023, 92 pages.
Final Office Action received for U.S. Appl. No. 17/222,568, mailed on Feb. 8, 2023, 68 pages.
Final Office Action received for U.S. Appl. No. 17/375,767, mailed on Dec. 29, 2022, 13 pages.
Final Office Action received for U.S. Appl. No. 17/375,767, mailed on Jun. 1, 2023, 15 pages.
Final Office Action received for U.S. Appl. No. 17/485,086, mailed on May 4, 2022, 21 pages.
Final Office Action received for U.S. Appl. No. 17/900,734, mailed on Jan. 19, 2024, 11 pages.
Intention to Grant received for Danish Patent Application No. PA202170032, mailed on Oct. 6, 2021, 2 pages.
Intention to Grant received for Danish Patent Application No. PA202170598, mailed on Apr. 24, 2023, 2 pages.
Intention to Grant received for Danish Patent Application No. PA202170598, mailed on Jan. 16, 2023, 2 pages.
International Preliminary Report on Patentability received for PCT Patent Application No. PCT/US2021/015123, mailed on Aug. 11, 2022, 14 pages.
International Preliminary Report on Patentability received for PCT Patent Application No. PCT/US2021/033051, mailed on Dec. 8, 2022, 14 pages.
International Preliminary Report on Patentability received for PCT Patent Application No. PCT/US2021/057325, mailed on May 19, 2023, 8 pages.
International Preliminary Report on Patentability received for PCT Patent Application No. PCT/US2022/025365, mailed on Nov. 2, 2023, 11 pages.
International Preliminary Report on Patentability received for PCT Patent Application No. PCT/US2022/030567, mailed on Dec. 21, 2023, 18 pages.
International Search Report and Written Opinion received for PCT Patent Application No. PCT/US2021/015123, mailed on Aug. 9, 2021, 20 pages.
International Search Report and Written Opinion received for PCT Patent Application No. PCT/US2021/033051, mailed on Oct. 29, 2021, 20 pages.
International Search Report and Written Opinion received for PCT Patent Application No. PCT/US2021/057325, mailed on Jan. 5, 2022, 14 pages.
International Search Report and Written Opinion received for PCT Patent Application No. PCT/US2022/025365, mailed on Sep. 27, 2022, 16 pages.
International Search Report and Written Opinion received for PCT Patent Application No. PCT/US2022/030567, mailed on Dec. 9, 2022, 24 pages.
International Search Report and Written Opinion received for PCT Patent Application No. PCT/US2022/042978, mailed on Nov. 29, 2022, 15 pages.
International Search Report and Written Opinion received for PCT Patent Application No. PCT/US2023/023766, mailed on Nov. 7, 2023, 20 pages.
Invitation to Pay Addition Fees received for PCT Patent Application No. PCT/US2021/015123, mailed on Jun. 16, 2021, 12 pages.
Invitation to Pay Additional Fees and Partial International Search Report received for PCT Patent Application No. PCT/US2022/030567, mailed on Sep. 13, 2022, 13 pages.
Invitation to Pay Additional Fees and Partial International Search Report received for PCT Patent Application No. PCT/US2023/023766, mailed on Sep. 14, 2023, 14 pages.
Invitation to Pay Additional Fees received for PCT Patent Application No. PCT/US2021/033051, mailed on Aug. 26, 2021, 10 pages.
Invitation to Pay Additional Fees received for PCT Patent Application No. PCT/US2022/025365, mailed on Aug. 4, 2022, 9 pages.
Juan, "Everything you can do with Wechat QR codes in 2019", Available online at: https://qpsoftware.net/blog/wechat-qr-code, Jul. 1, 2019, 13 pages.
Kormann et al., "Risks of the Passport Single Signon Protocol", IEEE Computer Networks, Jul. 2000, 12 pages.
LineLovers, "4 ways to add someone to your Line friends list", Available online at: http://line-lovers-world.com/2016/10/23/%E3%80%90line-app%E3%80%914-ways-to-add-someone-to-your-line-friends-list/, Oct. 23, 2016, 14 pages.
Lurey C., "Keeper fortifies industry best security architecture with integrated two-factor codes", Online available at: URL: https://www.keepersecurity.com/blog/2019/08/29/keeper-fortifies-industry-best-securityarchitecture-with-integrated-two-factor-codes/>, Aug. 29, 2019, 8 pages.
Mack, Brandon, "How Do Snapchat's Snapcodes Work?", Available online at: https://blackatlascreative.com/blog/how-do-snapchats-snapcodes-work/, Nov. 10, 2015, 10 pages.
"Meet Your Model 3", Available Online at: https://www.tesla.com/support/meet-your-tesla/model-3#keys, 2021, 3 pages.
Non-Final Office Action received for U.S. Appl. No. 17/030,256, mailed on Jan. 18, 2022, 20 pages.

(56) References Cited

OTHER PUBLICATIONS

Non-Final Office Action received for U.S. Appl. No. 17/030,257, mailed on Jun. 20, 2022, 27 pages.
Non-Final Office Action received for U.S. Appl. No. 17/030,259, mailed on Aug. 19, 2021, 20 pages.
Non-Final Office Action received for U.S. Appl. No. 17/030,260, mailed on Jul. 8, 2022, 36 pages.
Non-Final Office Action received for U.S. Appl. No. 17/030,260, mailed on Oct. 6, 2021, 43 pages.
Non-Final Office Action received for U.S. Appl. No. 17/077,820, mailed on Aug. 31, 2022, 10 pages.
Non-Final Office Action received for U.S. Appl. No. 17/222,568, mailed on May 25, 2023, 72 pages.
Non-Final Office Action received for U.S. Appl. No. 17/222,568, mailed on Sep. 16, 2022, 32 pages.
Non-Final Office Action received for U.S. Appl. No. 17/375,767, mailed on Aug. 31, 2023, 16 pages.
Non-Final Office Action received for U.S. Appl. No. 17/375,767, mailed on Feb. 16, 2023, 12 pages.
Non-Final Office Action received for U.S. Appl. No. 17/375,767, mailed on Nov. 28, 2023, 16 pages.
Non-Final Office Action received for U.S. Appl. No. 17/375,767, mailed on Sep. 29, 2022, 10 pages.
Non-Final Office Action received for U.S. Appl. No. 17/485,086, mailed on Jan. 24, 2022, 19 pages.
Non-Final Office Action received for U.S. Appl. No. 17/485,086, mailed on Nov. 14, 2022, 22 pages.
Non-Final Office Action received for U.S. Appl. No. 17/900,734, mailed on Oct. 24, 2023, 12 pages.
Non-Final Office Action received for U.S. Appl. No. 17/030,257, mailed on Dec. 24, 2021, 24 pages.
Notice of Acceptance received for Australian Patent Application No. 2021213717, mailed on Sep. 21, 2022, 3 pages.
Notice of Acceptance received for Australian Patent Application No. 2022235545, mailed on Jun. 27, 2023, 3 pages.
Notice of Allowance received for Chinese Patent Application No. 202310033917.0, mailed on Nov. 26, 2023, 2 pages.
Notice of Allowance received for Japanese Patent Application No. 2022-520133, mailed on Jan. 27, 2023, 4 pages.
Notice of Allowance received for Japanese Patent Application No. 2022-573404, mailed on Dec. 11, 2023, 4 pages.
Notice of Allowance received for Japanese Patent Application No. 2023-028792, mailed on Jun. 26, 2023, 4 pages.
Notice of Allowance rReceived for Japanese Patent Application No. 2023-528157, mailed on Feb. 5, 2024, 4 pages.
Notice of Allowance received for Korean Patent Application No. 10-2021-7037387, mailed on Jan. 31, 2024, 7 pages.
Notice of Allowance received for Korean Patent Application No. 10-2022-0003867, mailed on Oct. 21, 2022, 7 pages.
Notice of Allowance received for Korean Patent Application No. 10-2022-7045895, mailed on Apr. 19, 2023, 7 pages.
Notice of Allowance received for Korean Patent Application No. 10-2023-7010480, mailed on Nov. 29, 2023, 7 pages.
Notice of Allowance received for U.S. Appl. No. 17/030,256, mailed on Jul. 20, 2022, 9 pages.
Notice of Allowance received for U.S. Appl. No. 17/030,257, mailed on Jul. 26, 2023, 14 pages.
Notice of Allowance received for U.S. Appl. No. 17/030,259, mailed on Dec. 14, 2021, 8 pages.
Notice of Allowance received for U.S. Appl. No. 17/030,260, mailed on Aug. 7, 2023, 11 pages.
Notice of Allowance received for U.S. Appl. No. 17/030,260, mailed on Jun. 28, 2023, 11 pages.
Notice of Allowance received for U.S. Appl. No. 17/030,260, mailed on May 3, 2023, 14 pages.
Notice of Allowance received for U.S. Appl. No. 17/077,820, mailed on Jan. 6, 2023, 11 pages.
Notice of Allowance received for U.S. Appl. No. 17/180,509, mailed on Apr. 28, 2021, 16 pages.
Notice of Allowance received for U.S. Appl. No. 17/180,509, mailed on Aug. 23, 2021, 14 pages.
Notice of Allowance received for U.S. Appl. No. 17/375,767, mailed on Feb. 20, 2024, 6 pages.
Notice of Allowance received for U.S. Appl. No. 17/398,723, mailed on Feb. 23, 2023, 17 pages.
Notice of Allowance received for U.S. Appl. No. 17/398,723, mailed on Jan. 30, 2024, 15 pages.
Notice of Allowance received for U.S. Appl. No. 17/398,723, mailed on Jun. 15, 2023, 15 pages.
Notice of Allowance received for U.S. Appl. No. 17/398,723, mailed on Oct. 26, 2023, 15 pages.
Notice of Allowance received for U.S. Appl. No. 17/484,306, mailed on Nov. 26, 2021, 9 pages.
Notice of Allowance received for U.S. Appl. No. 17/485,086, mailed on Jan. 30, 2023, 9 pages.
Notice of Allowance received for U.S. Appl. No. 17/485,098, mailed on Aug. 5, 2022, 12 pages.
Notice of Allowance received for U.S. Appl. No. 18/128,775, mailed on Feb. 28, 2024, 11 pages.
Notice of Allowance received for U.S. Appl. No. 18/128,775, mailed on Nov. 2, 2023, 10 pages.
Office Action received for Australian Patent Application No. 2021100511, mailed on May 26, 2021, 5 pages.
Office Action received for Australian Patent Application No. 2021100511, mailed on Sep. 2, 2021, 3 pages.
Office Action received for Australian Patent Application No. 2021102823, mailed on Aug. 24, 2021, 8 pages.
Office Action received for Australian Patent Application No. 2021102823, mailed on Feb. 22, 2022, 5 pages.
Office Action received for Australian Patent Application No. 2021102823, mailed on Nov. 24, 2021, 7 pages.
Office Action received for Australian Patent Application No. 2021203367, mailed on May 23, 2022, 5 pages.
Office Action received for Australian Patent Application No. 2021213717, mailed on Feb. 10, 2022, 4 pages.
Office Action received for Australian Patent Application No. 2021213717, mailed on Jun. 17, 2022, 4 pages.
Office Action received for Australian Patent Application No. 2022235545, mailed on May 11, 2023, 3 pages.
Office Action received for Australian Patent Application No. 2023200021, mailed on Feb. 1, 2024, 4 pages.
Office Action received for Australian Patent Application No. 2023200021, mailed on Nov. 1, 2023, 3 pages.
Office Action received for Chinese Patent Application No. 202310033917.0, mailed on Jun. 28, 2023, 19 pages.
Office Action received for Chinese Patent Application No. 202310865934.0, mailed on Jan. 16, 2024, 12 pages.
Office Action received for Danish Patent Application No. PA202170032, mailed on May 7, 2021, 7 pages.
Office Action received for Danish Patent Application No. PA202170598, mailed on Sep. 7, 2022, 4 pages.
Office Action received for Danish Patent Application No. PA202270438, mailed on Jul. 10, 2023, 4 pages.
Office Action received for European Patent Application No. 21707473.1, mailed on May 4, 2023, 5 pages.
Office Action received for European Patent Application No. 21707473.1, mailed on Oct. 27, 2023, 5 pages.
Office Action received for European Patent Application No. 21707473.1, mailed on Oct. 31, 2022, 7 pages.
Office Action received for European Patent Application No. 21731662.9, mailed on Oct. 12, 2023, 8 pages.
Office Action received for Japanese Patent Application No. 2022-520133, mailed on Oct. 17, 2022, 4 pages.
Office Action received for Japanese Patent Application No. 2022-573404, mailed on Jul. 3, 2023, 12 pages.
Office Action received for Japanese Patent Application No. 2023-528157, mailed on Dec. 8, 2023, 4 pages.
Office Action received for Korean Patent Application No. 10-2021-0151108, mailed on Jan. 13, 2023, 10 pages.
Office Action received for Korean Patent Application No. 10-2021-0151108, mailed on Sep. 21, 2023, 12 pages.

(56) References Cited

OTHER PUBLICATIONS

Office Action received for Korean Patent Application No. 10-2021-0182662, mailed on Oct. 26, 2023, 13 pages.
Office Action received for Korean Patent Application No. 10-2021-7037387, mailed on Oct. 12, 2023, 14 pages.
Office Action received for Korean Patent Application No. 10-2022-0003867, mailed on May 17, 2022, 19 pages.
Office Action received for Korean Patent Application No. 10-2023-7010480, mailed on Jul. 20, 2023, 14 pages.
Office Action received for Korean Patent Application No. 10-2023-7033718, mailed on Dec. 4, 2023, 5 pages.
Search Report and Opinion received for Danish Patent Application No. PA202170598, mailed on Feb. 15, 2022, 11 pages.
Search Report and Opinion received for Danish Patent Application No. PA202270438, mailed on Dec. 5, 2022, 9 pages.
Sibila, Alex, "Tesla App Full Walkthrough (Mar. 2020)", Available Online at: https://www.youtube.com/watch?v=RHMWPj_RXLU, Mar. 16, 2020, 3 pages.
"Use your iPhone or Apple Watch as a car key", Available Online at: https://support.apple.com/en-us/HT211234, Mar. 16, 2021, 5 pages.
"Volvo on Call app: Operating remote start of the car", Available Online at: https://www.volvocars.com/en-ca/support/topics/volvo-on-call/app/volvo-on-call-app-operating-remote-start-of-the-car-2, Nov. 5, 2020, 4 pages.
2004-213362, JP, A, Cited by the Japanese Patent Office in an Office Action for related Patent Application No. 2023-200980 on Apr. 22, 2024.
2019-197332, JP, A, Cited by the Japanese Patent Office in an Office Action for related Patent Application No. 2023-200980 on Apr. 22, 2024.
Corrected Notice of Allowance received for U.S. Appl. No. 18/128,775, mailed on Jun. 6, 2024, 2 pages.
Notice of Allowance received for Korean Patent Application No. 10-2021-0151108, mailed on May 26, 2024, 7 pages (2 pages of English Translation and 5 pages of Official Copy).
Notice of Allowance received for Korean Patent Application No. 10-2021-0182662, mailed on Jun. 2, 2024, 6 pages (2 pages of English Translation and 4 pages of Official Copy).
Office Action received for European Patent Application No. 22785826.3, mailed on Aug. 1, 2024, 7 pages.
Office Action received for Japanese Patent Application No. 2023-200980, mailed on Aug. 2, 2024, 8 pages (4 pages of English Translation and 4 pages of Official Copy).
Advisory Action received for U.S. Appl. No. 17/900,734, mailed on Mar. 21, 2024, 5 pages.
Extended European Search Report received for European Patent Application No. 23200887.0, mailed on Mar. 26, 2024, 9 pages.
Extended European Search Report received for European Patent Application No. 23214955.9, mailed on Feb. 22, 2024, 10 pages.
International Preliminary Report on Patentability received for PCT Patent Application No. PCT/US2022/042978, mailed on Apr. 4, 2024, 12 pages.
Office Action received for Chinese Patent Application No. 202180005556.8, mailed on Feb. 8, 2024, 16 pages (9 pages of English Translation and 7 pages of Official Copy).
Office Action received for European Patent Application No. 23165330.4, mailed on Mar. 18, 2024, 4 pages.
Office Action received for Japanese Patent Application No. 2023-168764, mailed on Feb. 5, 2024, 5 pages (2 pages of English Translation and 3 pages of Official Copy).
Summons to Attend Oral Proceedings received for European Patent Application No. 21707473.1, mailed on Mar. 22, 2024, 9 pages.
Notice of Acceptance received for Australian Patent Application No. 2023200021, mailed on Jul. 22, 2024, 3 pages.
Notice of Allowance received for Japanese Patent Application No. 2023-168764, mailed on Jul. 26, 2024, 4 pages (1 page of English Translation and 3 pages of Official Copy).
2013-257878, JP, A, Cited by the Japanese Patent Office in an Office Action for related Patent Application No. 2023-168764 on Feb, 5, 2024.
2018-501680, JP, A, Cited by the Japanese Patent Office in an Office Action for related Patent Application No. 2023-168764 on Feb, 5, 2024.
2019-149167, JP, A, Cited by the Japanese Patent Office in an Office Action for related Patent Application No. 2023-168764 on Feb, 5, 2024.
Decision to Grant received for European Patent Application No. 21731662.9, mailed on Sep. 12, 2024, 4 pages.
Non-Final Office Action received for U.S. Appl. No. 17/951,818, mailed on Sep. 9, 2024, 30 pages.
Notice of Allowance received for Chinese Patent Application No. 202311569957.3, mailed on Sep. 2, 2024, 5 pages (1 page of English Translation and 4 pages of Official Copy).
Result of Consultation received for European Patent Application No. 21707473.1, mailed on Sep. 6, 2024, 3 pages.
Summons to Attend Oral Proceedings received for European Patent Application No. 22732745.9, mailed on Sep. 3, 2024, 11 pages.
Intention to Grant received for European Patent Application No. 21731662.9, mailed on May 3, 2024, 9 pages.
Notice of Allowance received for Korean Patent Application No. 10-2023-7033718, mailed on Apr. 18, 2024, 7 pages (2 pages of English Translation and 5 pages of Official Copy).
Office Action received for Australian Patent Application No. 2023200021, mailed on Apr. 24, 2024, 4 pages.
Office Action received for European Patent Application No. 22732745.9, mailed on Apr. 10, 2024, 7 pages.
Office Action received for Japanese Patent Application No. 2023-200980, mailed on Apr. 22, 2024, 8 pages (4 pages of English Translation and 4 pages of Official Copy).
Notice of Allowance received for Chinese Patent Application No. 202310865934.0, mailed on May 8, 2024, 2 pages (1 page of English Translation and 1 page of Official Copy).
Office Action received for Japanese Patent Application No. 2023-168764, mailed on May 17, 2024, 6 pages (3 pages of English Translation and 3 pages of Official Copy).
Office Action received for Chinese Patent Application No. 202311323829.0, mailed on Sep. 5, 2024, 11 pages (6 pages of English Translation and 5 pages of Official Copy).
Applicant-Initiated Interview Summary received for U.S. Appl. No. 17/951,818, mailed on Nov. 4, 2024, 5 pages.
Notice of Allowance received for Japanese Patent Application No. 2023-200980, mailed on Nov. 5, 2024, 4 pages (1 page of English Translation and 3 pages of Official Copy).
Notice of Allowance received for Korean Patent Application No. 10-2024-0100836, mailed on Oct. 14, 2024, 7 pages (2 pages of English Translation and 5 pages of Official Copy).
Notice of Allowance received for U.S. Appl. No. 18/404,058, mailed on Oct. 9, 2024, 12 pages.
Office Action received for Indian Patent Application No. 202217048935, mailed on Oct. 29, 2024, 9 pages.

\* cited by examiner

MOBILE KEY ENROLLMENT AND USE

CROSS-REFERENCE TO RELATED APPLICATIONS

This application is a continuation of U.S. patent application Ser. No. 18/128,775, entitled "MOBILE KEY ENROLLMENT AND USE," filed Mar. 30, 2023, which is a continuation of U.S. patent application Ser. No. 17/077,820, now U.S. Pat. No. 11,643,048, entitled "MOBILE KEY ENROLLMENT AND USE," filed Oct. 22, 2020, which claims priority to U.S. Provisional Application Ser. No. 62/966,481, entitled "MOBILE KEY ENROLLMENT AND USE," filed Jan. 27, 2020, the contents of which are hereby incorporated by reference in their entirety.

FIELD

The present disclosure relates generally to computer user interfaces, and more specifically to techniques for enrolling and using a mobile key (e.g., secure credential).

BACKGROUND

As electronic devices such as smartphones have become more widely used, their functions have grown beyond phone calls and text messaging. Providing an efficient method for using and implementing the various functions on these electronic devices can be complex and time-consuming.

BRIEF SUMMARY

Some techniques for enrolling and using a mobile key using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for enrolling and using a mobile key. Such methods and interfaces optionally complement or replace other methods for enrolling and using a mobile key. Such methods and interfaces reduce the cognitive burden on a user and produce a more efficient human-machine interface. For battery-operated computing devices, such methods and interfaces conserve power and increase the time between battery charges.

In some embodiments, a method comprises: at a first electronic device with a display: detecting a request to add a first secure credential to the first electronic device, wherein the first secure credential is configured to provide authorization to use one or more functions of a vehicle; in response to detecting the request to add the first secure credential to the first electronic device, initiating a process for adding the first secure credential to the first electronic device; and after completing the process for adding the first secure credential to the first electronic device, displaying, on the display, a user interface of an electronic wallet application with a representation of the first secure credential and one or more representations of other secure credentials that are not associated with a vehicle manufacturer of the vehicle.

In some embodiments, a non-transitory computer-readable storage medium stores one or more programs configured to be executed by one or more processors of a first electronic device with a display, the one or more programs including instructions for: detecting a request to add a first secure credential to the first electronic device, wherein the first secure credential is configured to provide authorization to use one or more functions of a vehicle; in response to detecting the request to add the first secure credential to the first electronic device, initiating a process for adding the first secure credential to the first electronic device; and after completing the process for adding the first secure credential to the first electronic device, displaying, on the display, a user interface of an electronic wallet application with a representation of the first secure credential and one or more representations of other secure credentials that are not associated with a vehicle manufacturer of the vehicle.

In some embodiments, a transitory computer-readable storage medium stores one or more programs configured to be executed by one or more processors of a first electronic device with a display, the one or more programs including instructions for: detecting a request to add a first secure credential to the first electronic device, wherein the first secure credential is configured to provide authorization to use one or more functions of a vehicle; in response to detecting the request to add the first secure credential to the first electronic device, initiating a process for adding the first secure credential to the first electronic device; and after completing the process for adding the first secure credential to the first electronic device, displaying, on the display, a user interface of an electronic wallet application with a representation of the first secure credential and one or more representations of other secure credentials that are not associated with a vehicle manufacturer of the vehicle.

In some embodiments, a first electronic device comprises: a display; one or more processors; and memory storing one or more programs configured to be executed by the one or more processors, the one or more programs including instructions for: detecting a request to add a first secure credential to the first electronic device, wherein the first secure credential is configured to provide authorization to use one or more functions of a vehicle; in response to detecting the request to add the first secure credential to the first electronic device, initiating a process for adding the first secure credential to the first electronic device; and after completing the process for adding the first secure credential to the first electronic device, displaying, on the display, a user interface of an electronic wallet application with a representation of the first secure credential and one or more representations of other secure credentials that are not associated with a vehicle manufacturer of the vehicle.

In some embodiments, a first electronic device comprises: a display; means for detecting a request to add a first secure credential to the first electronic device, wherein the first secure credential is configured to provide authorization to use one or more functions of a vehicle; means, in response to detecting the request to add the first secure credential to the first electronic device, for initiating a process for adding the first secure credential to the first electronic device; and means, after completing the process for adding the first secure credential to the first electronic device, for displaying, on the display, a user interface of an electronic wallet application with a representation of the first secure credential and one or more representations of other secure credentials that are not associated with a vehicle manufacturer of the vehicle.

In some embodiments, a method comprises: at a first electronic device with a display, wherein the first electronic device corresponds to a first user account and the first electronic device includes a first secure credential: displaying, on the display, an invite selectable user interface object for inviting a second user account that is different from the first user account to use a second secure credential, wherein: the second secure credential corresponds to the first secure credential, and the second secure credential is configured to provide authorization to use one or more functions of a vehicle; detecting a sequence of one or more user inputs including selection of a recipient for the second secure credential and user input corresponding to selection of the invite selectable user interface object; and in response to detecting the sequence of one or more user inputs, transmitting an invitation for the second user account to the recipient selected based on the sequence of one or more user inputs.

In some embodiments, a non-transitory computer-readable storage medium stores one or more programs configured to be executed by one or more processors of a first electronic device with a display, wherein the first electronic device corresponds to a first user account and the first electronic device includes a first secure credential, the one or more programs including instructions for: displaying, on the display, an invite selectable user interface object for inviting a second user account that is different from the first user account to use a second secure credential, wherein: the second secure credential corresponds to the first secure credential, and the second secure credential is configured to provide authorization to use one or more functions of a vehicle; detecting a sequence of one or more user inputs including selection of a recipient for the second secure credential and user input corresponding to selection of the invite selectable user interface object; and in response to detecting the sequence of one or more user inputs, transmitting an invitation for the second user account to the recipient selected based on the sequence of one or more user inputs.

In some embodiments, a transitory computer-readable storage medium stores one or more programs configured to be executed by one or more processors of a first electronic device with a display, wherein the first electronic device corresponds to a first user account and the first electronic device includes a first secure credential, the one or more programs including instructions for: displaying, on the display, an invite selectable user interface object for inviting a second user account that is different from the first user account to use a second secure credential, wherein: the second secure credential corresponds to the first secure credential, and the second secure credential is configured to provide authorization to use one or more functions of a vehicle; detecting a sequence of one or more user inputs including selection of a recipient for the second secure credential and user input corresponding to selection of the invite selectable user interface object; and in response to detecting the sequence of one or more user inputs, transmitting an invitation for the second user account to the recipient selected based on the sequence of one or more user inputs.

In some embodiments, a first electronic device comprises: a display; one or more processors; and memory storing one or more programs configured to be executed by the one or more processors of the first electronic device, wherein the first electronic device corresponds to a first user account and the first electronic device includes a first secure credential, the one or more programs including instructions for: displaying, on the display, an invite selectable user interface object for inviting a second user account that is different from the first user account to use a second secure credential, wherein: the second secure credential corresponds to the first secure credential, and the second secure credential is configured to provide authorization to use one or more functions of a vehicle; detecting a sequence of one or more user inputs including selection of a recipient for the second secure credential and user input corresponding to selection of the invite selectable user interface object; and in response to detecting the sequence of one or more user inputs, transmitting an invitation for the second user account to the recipient selected based on the sequence of one or more user inputs.

In some embodiments, a first electronic device comprises: a display, wherein the first electronic device corresponds to a first user account and the first electronic device includes a first secure credential; and means for displaying, on the display, an invite selectable user interface object for inviting a second user account that is different from the first user account to use a second secure credential, wherein: the second secure credential corresponds to the first secure credential, and the second secure credential is configured to provide authorization to use one or more functions of a vehicle; means for detecting a sequence of one or more user inputs including selection of a recipient for the second secure credential and user input corresponding to selection of the invite selectable user interface object; and means, in response to detecting the sequence of one or more user inputs, for transmitting an invitation for the second user account to the recipient selected based on the sequence of one or more user inputs.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for enrolling and using a mobile key, thereby increasing the effectiveness, efficiency, and user satisfaction with such devices. Such methods and interfaces may complement or replace other methods for enrolling and using a mobile key.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for enrolling and using a mobile key. For example, after completing a process for enrolling a secure credential, a user would benefit from being able to quickly enroll a second secure credential on a companion device. Such techniques can reduce the cognitive burden on a user who enrolls and uses a mobile key, thereby enhancing productivity. Further, such techniques can reduce processor and battery power otherwise wasted on redundant user inputs.

Figure 6A:
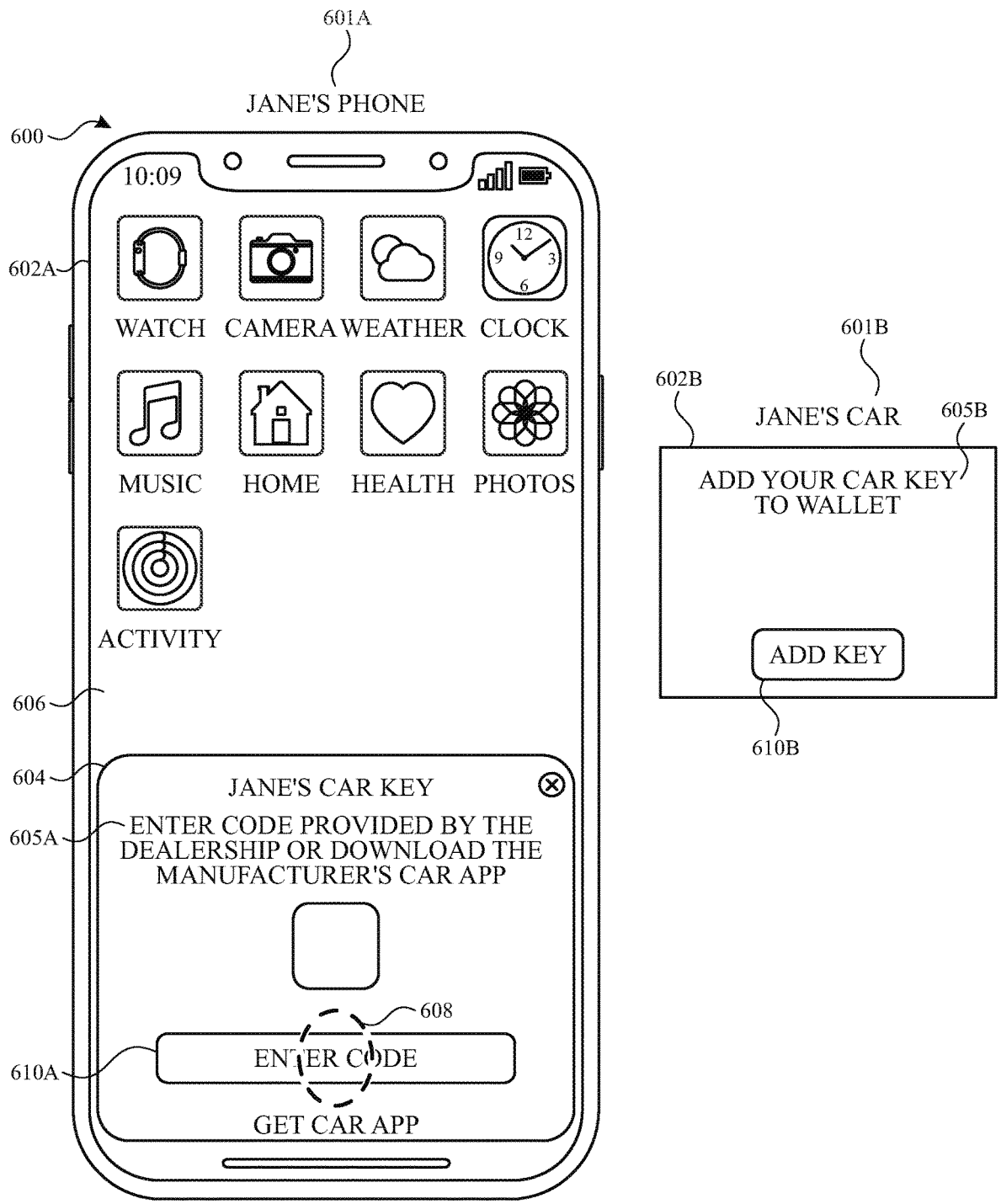
FIGS. 6A-6V illustrate exemplary user interfaces for enrolling a secure credential, in accordance with some embodiments.
Figure 7:
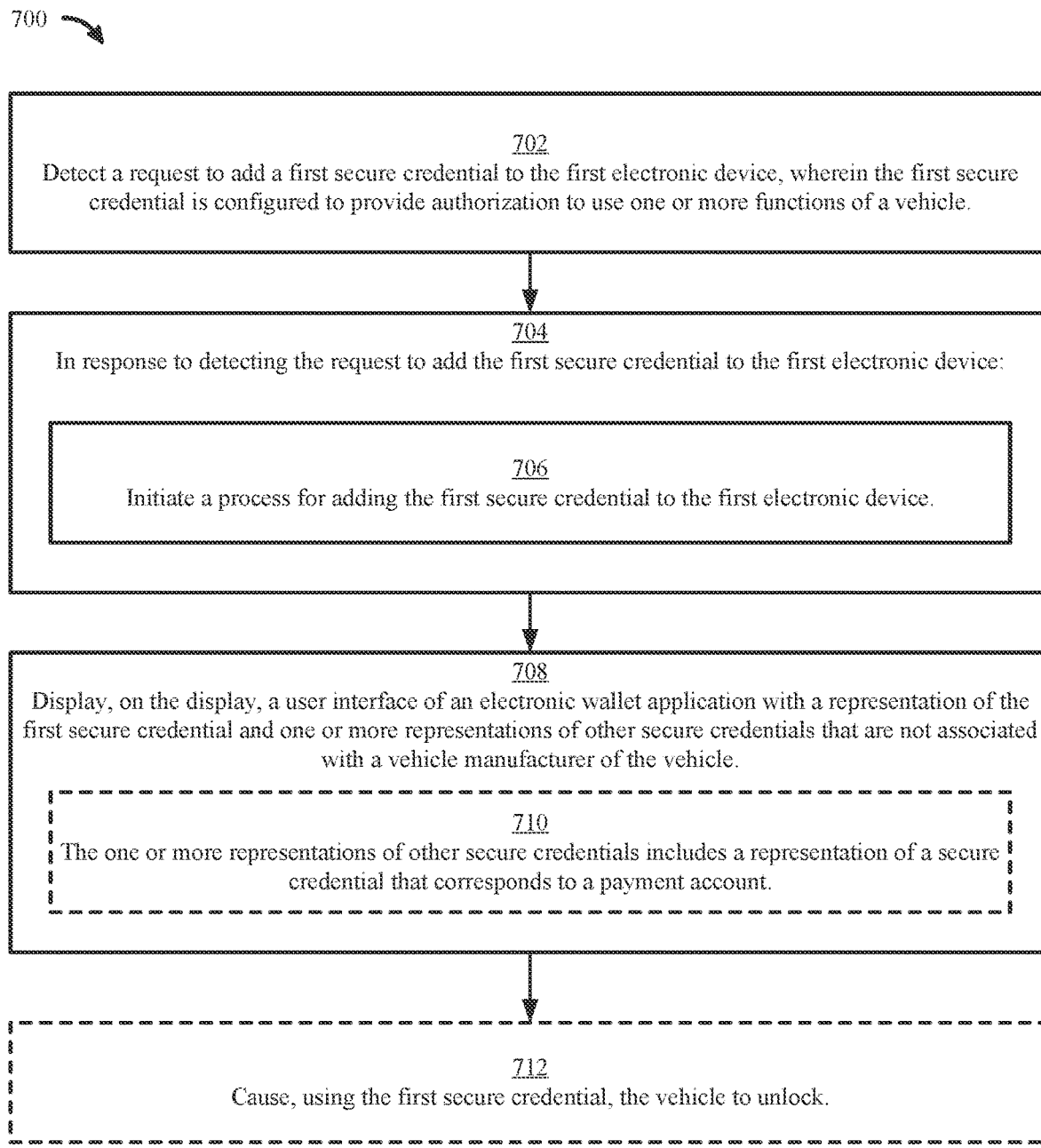
FIG. 7 is a flow diagram illustrating an exemplary process for enrolling a secure credential, in accordance with some embodiments.
Figure 8A:
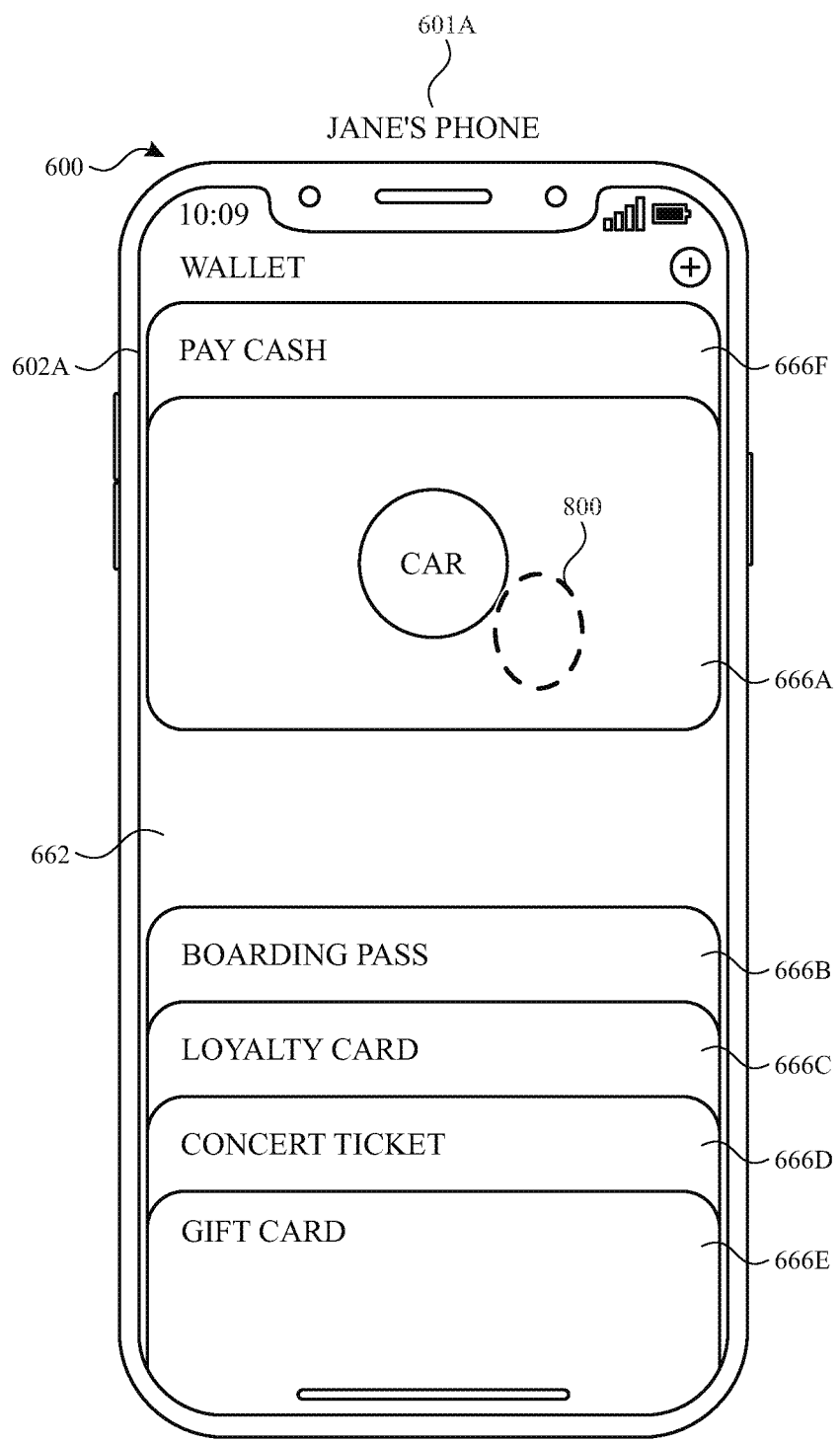
FIGS. 8A-8AD illustrate exemplary user interfaces for inviting a user account to use a secure credential, in accordance with some embodiments.
Figure 9:
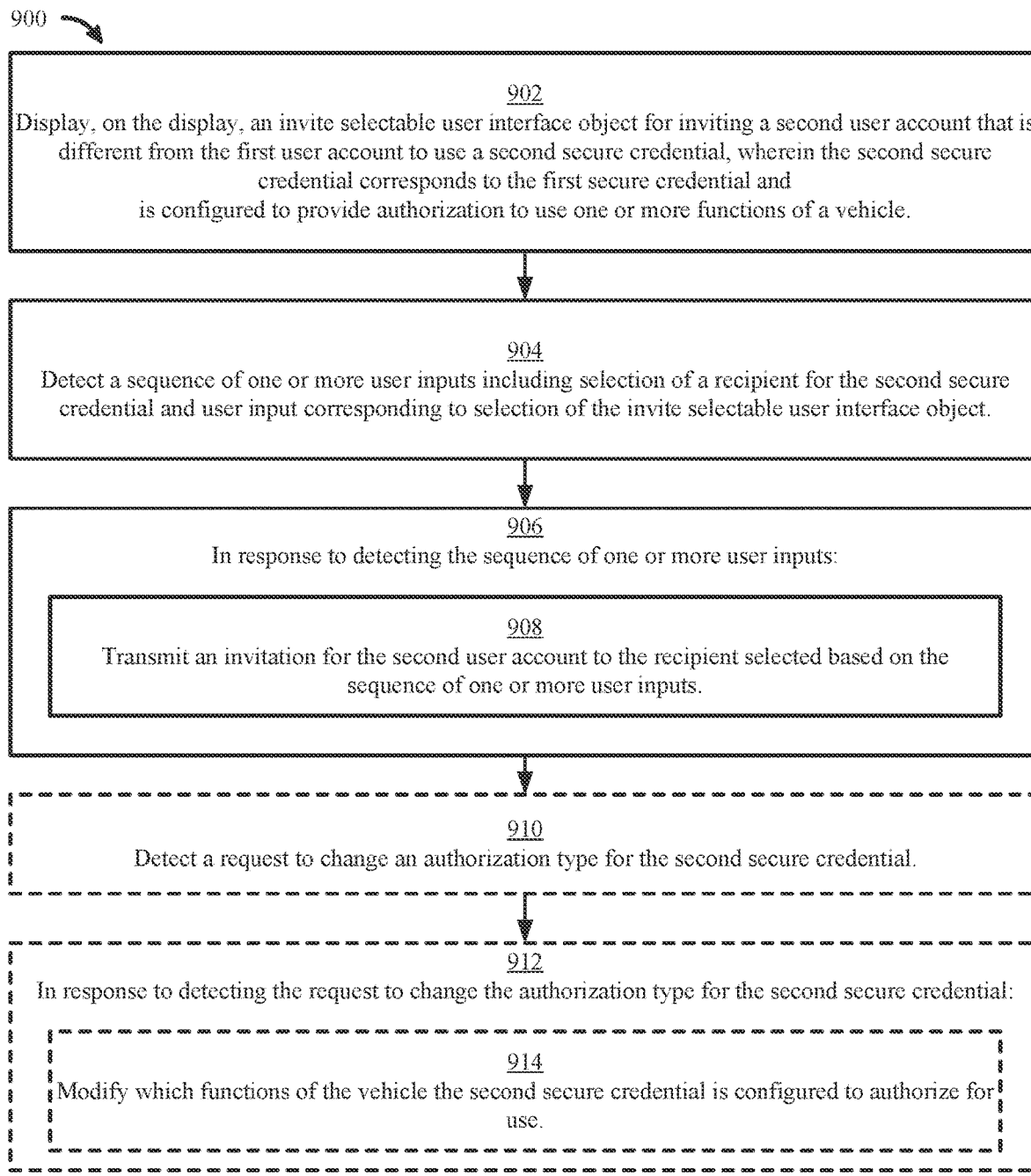
FIG. 9 is a flow diagram illustrating an exemplary process for inviting a user account to use a secure credential, in accordance with some embodiments.

Below, FIGS. 1A-1B, 2, 3, 4A-4B, and 5A-5B provide a description of exemplary devices for performing the techniques for managing event notifications. FIGS. 6A-6V illustrate exemplary user interfaces for enrolling a secure credential, in accordance with some embodiments. FIG. 7 is a flow diagram illustrating an exemplary process for enrolling a secure credential, in accordance with some embodiments. The user interfaces in FIGS. 6A-6V are used to illustrate the processes described below, including the processes in FIGS. 7. FIGS. 8A-8AD illustrate exemplary user interfaces for inviting a user account to use a secure credential, in accordance with some embodiments. FIG. 9 is a flow diagram illustrating an exemplary process for inviting a user account to use a secure credential, in accordance with some embodiments. The user interfaces in FIGS. 8A-8AD are used to illustrate the processes described below, including the processes in FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
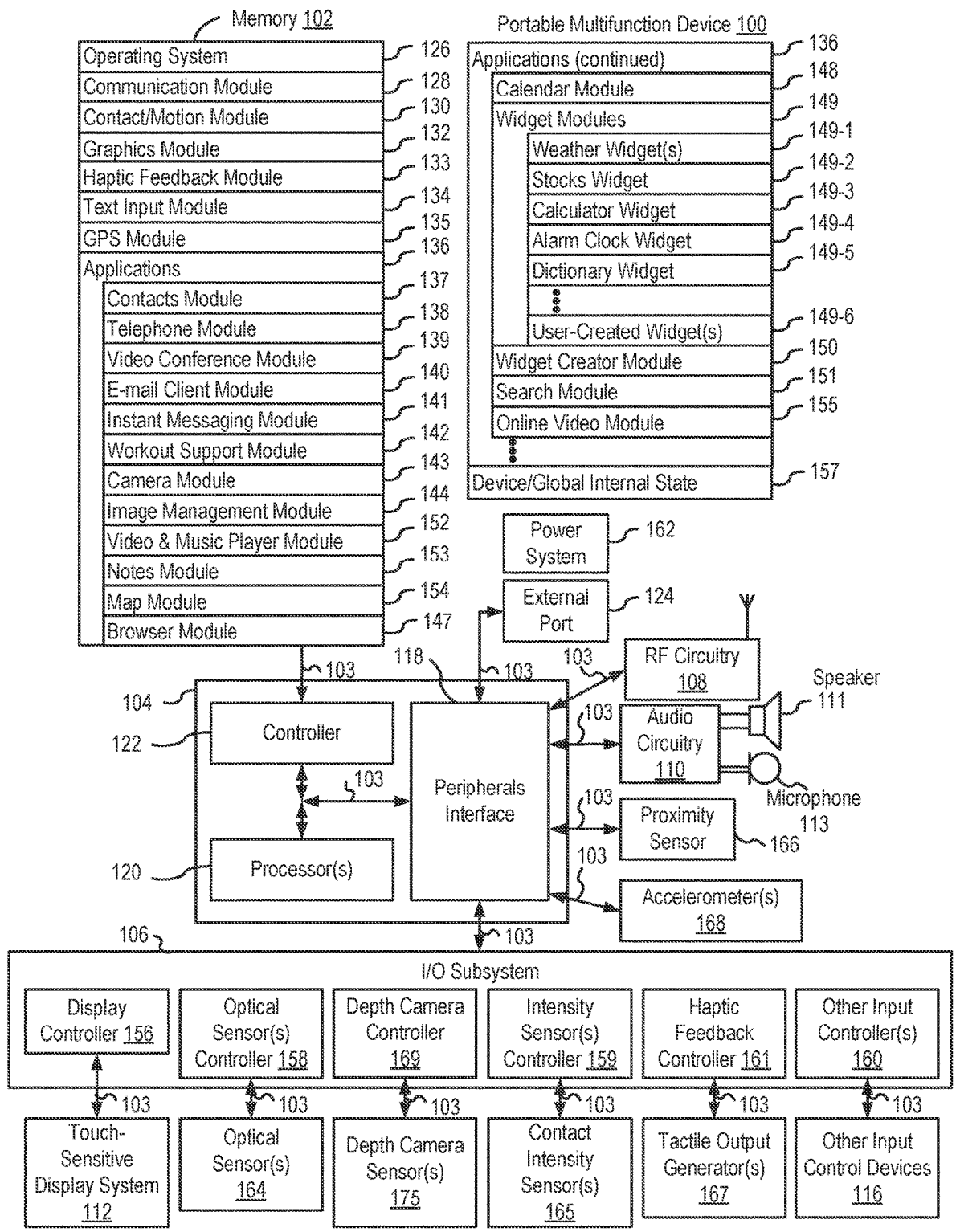
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
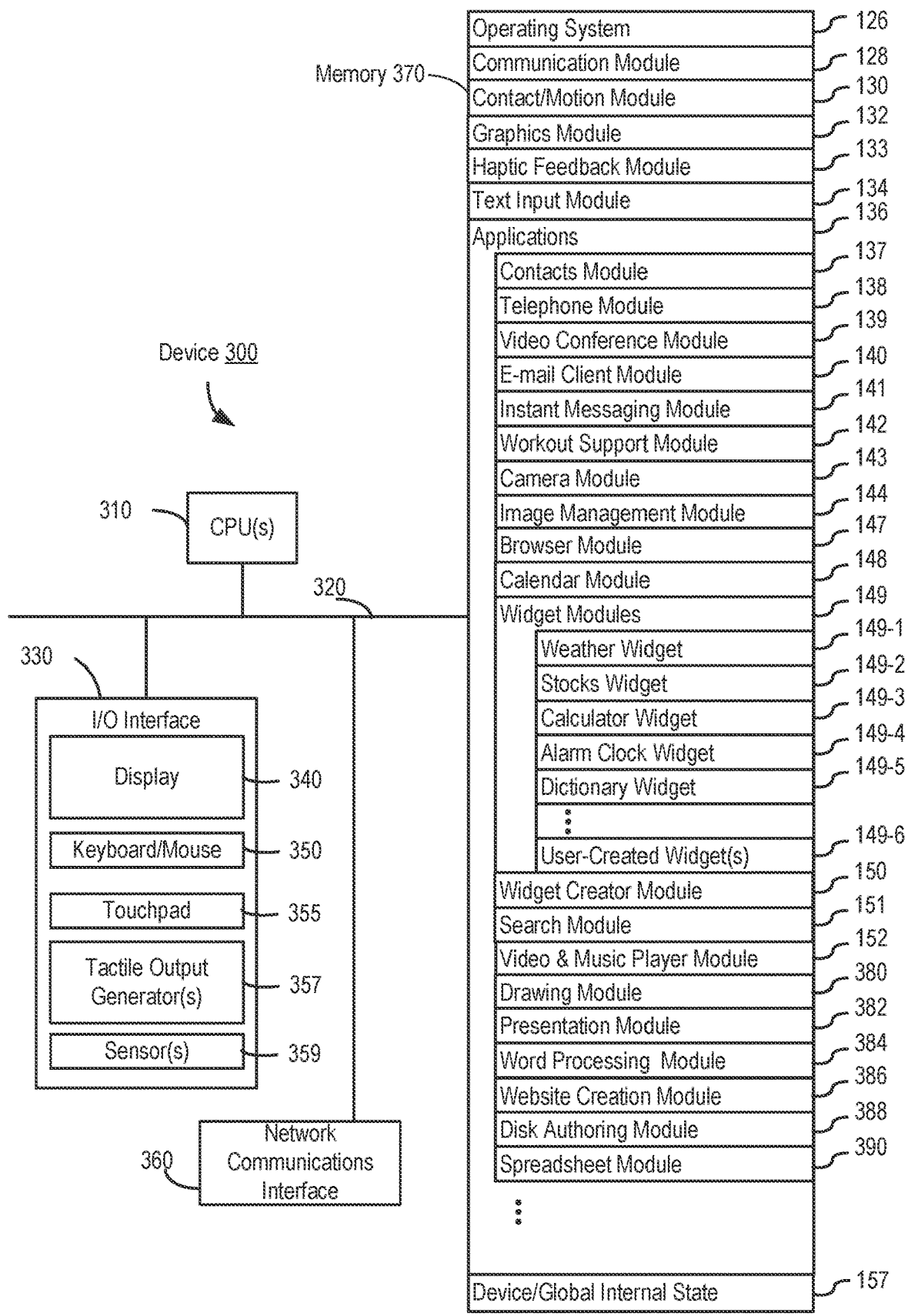
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions.

In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
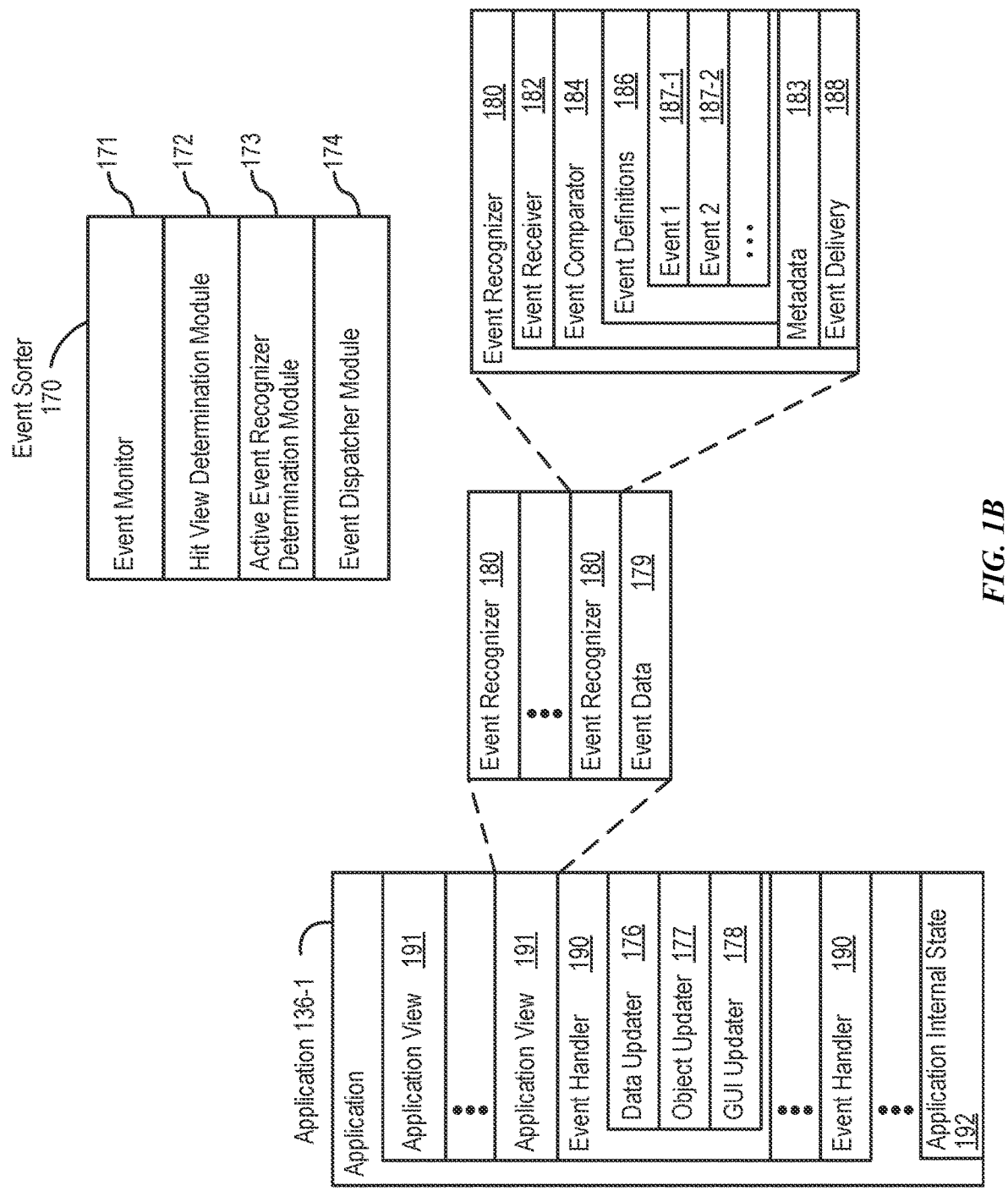
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
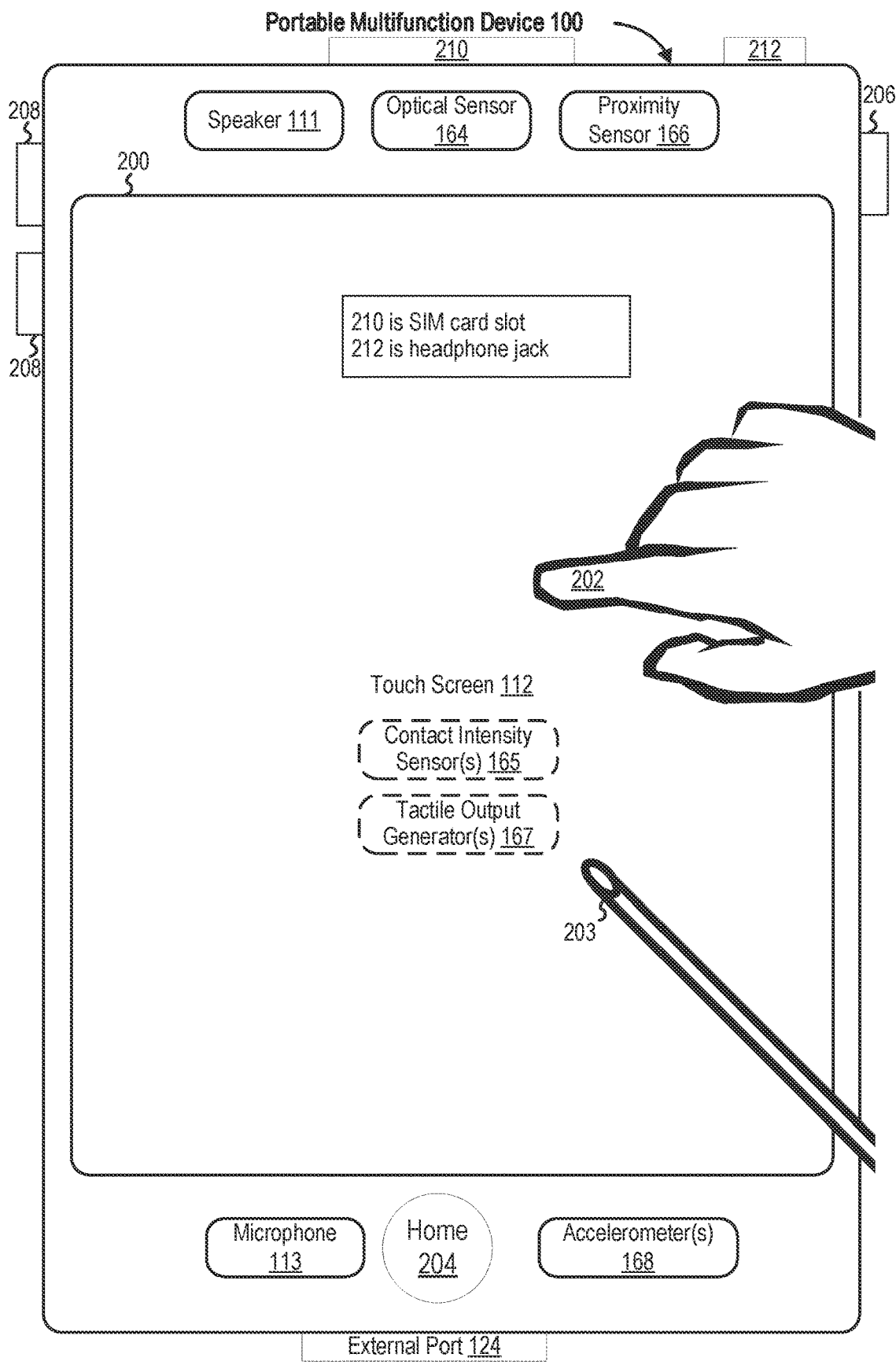
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
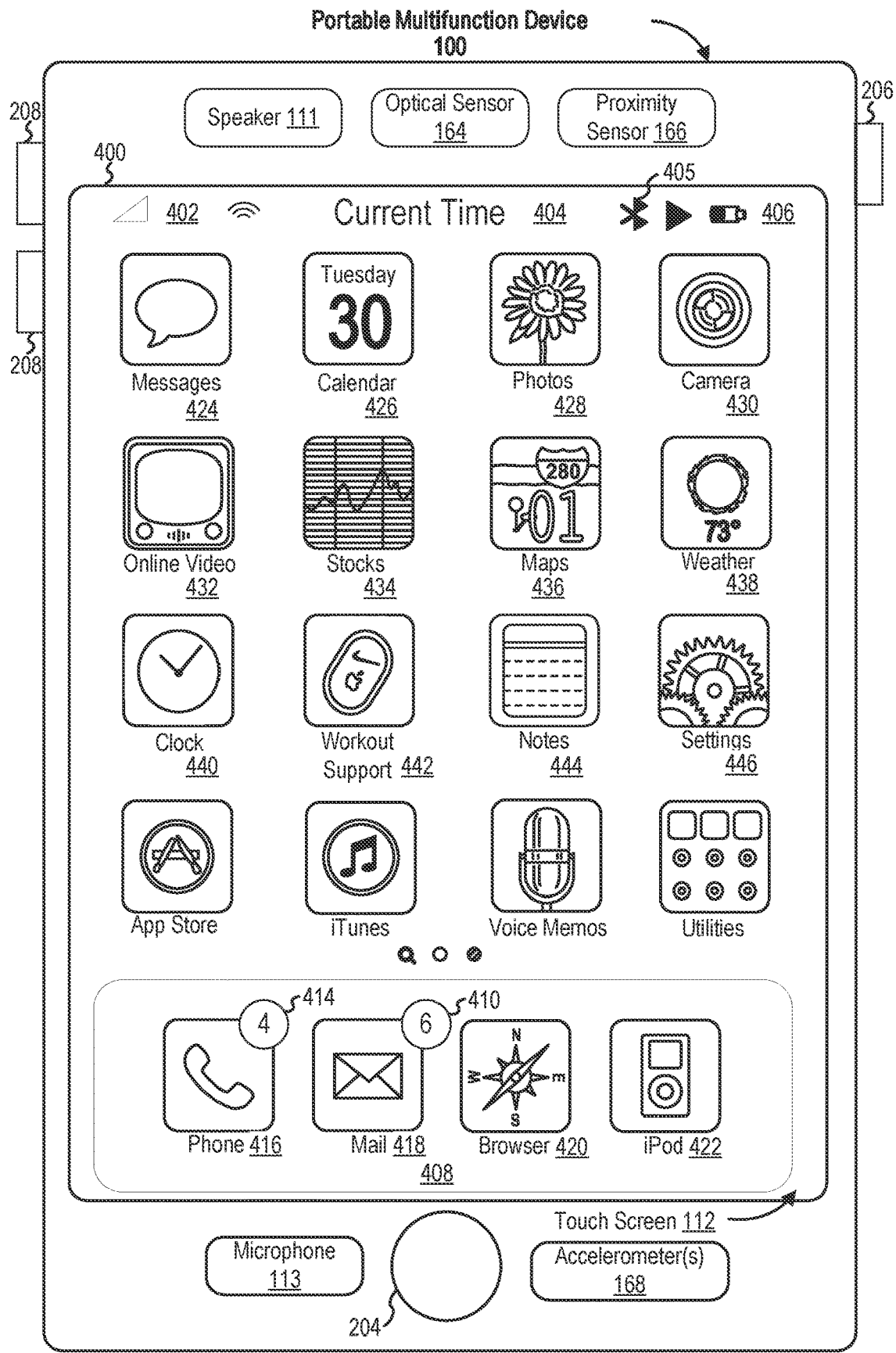
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
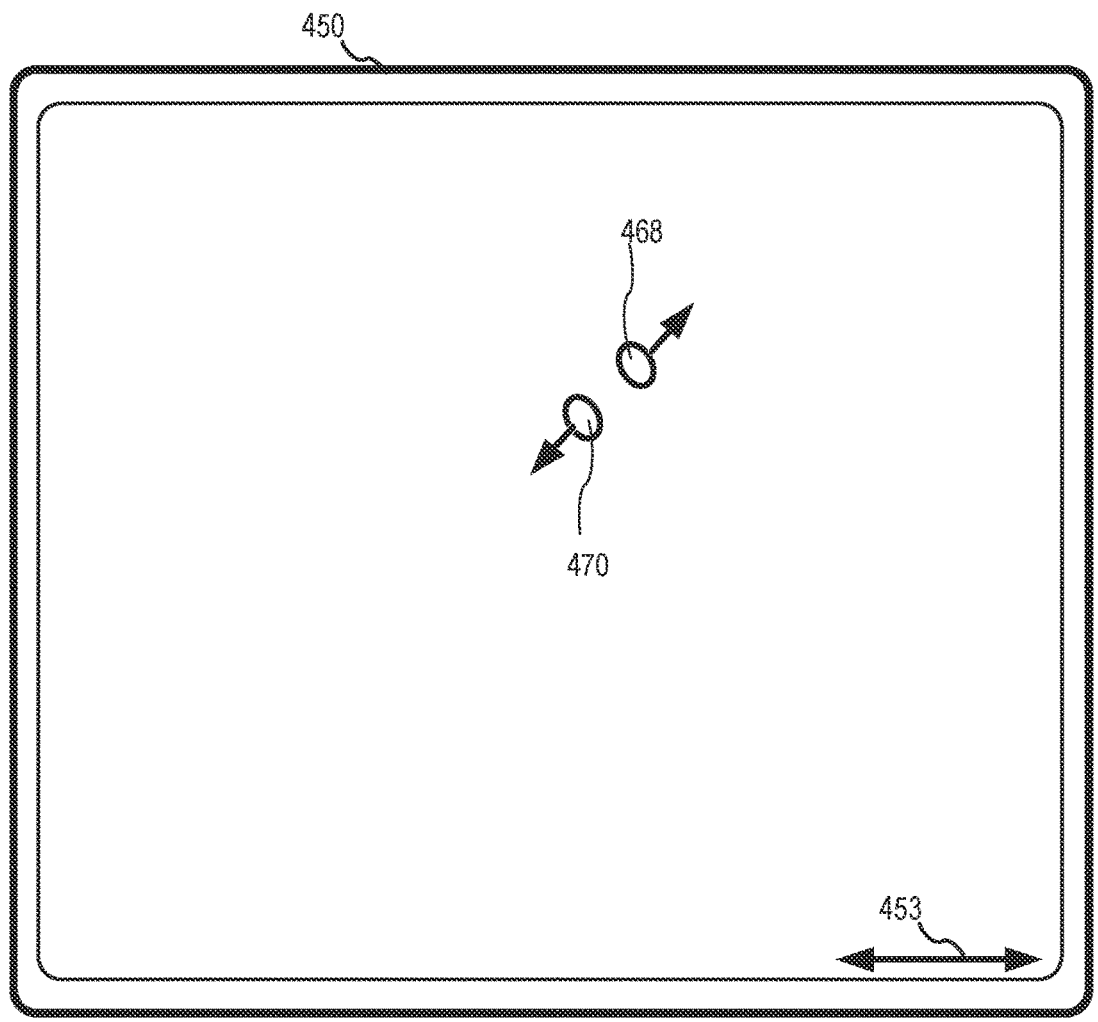
FIG. 4B illustrates an exemplary user interface for a multifunction device with a touch-sensitive surface that is separate from the display in accordance with some embodiments.
Figure 4B:
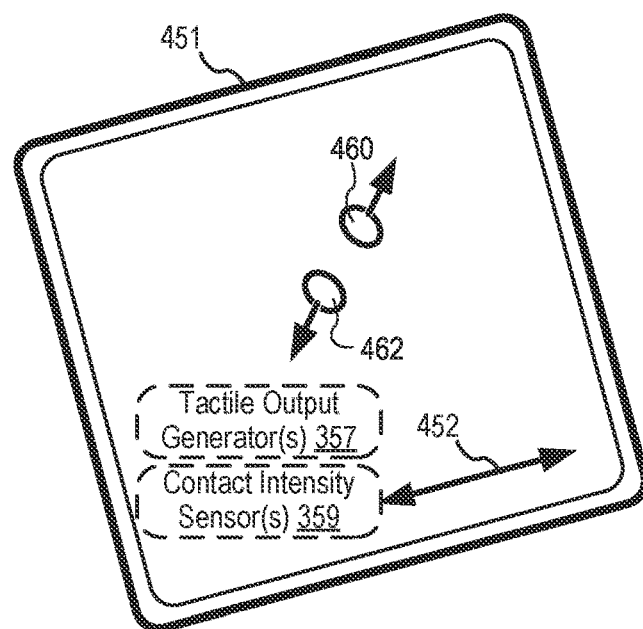

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
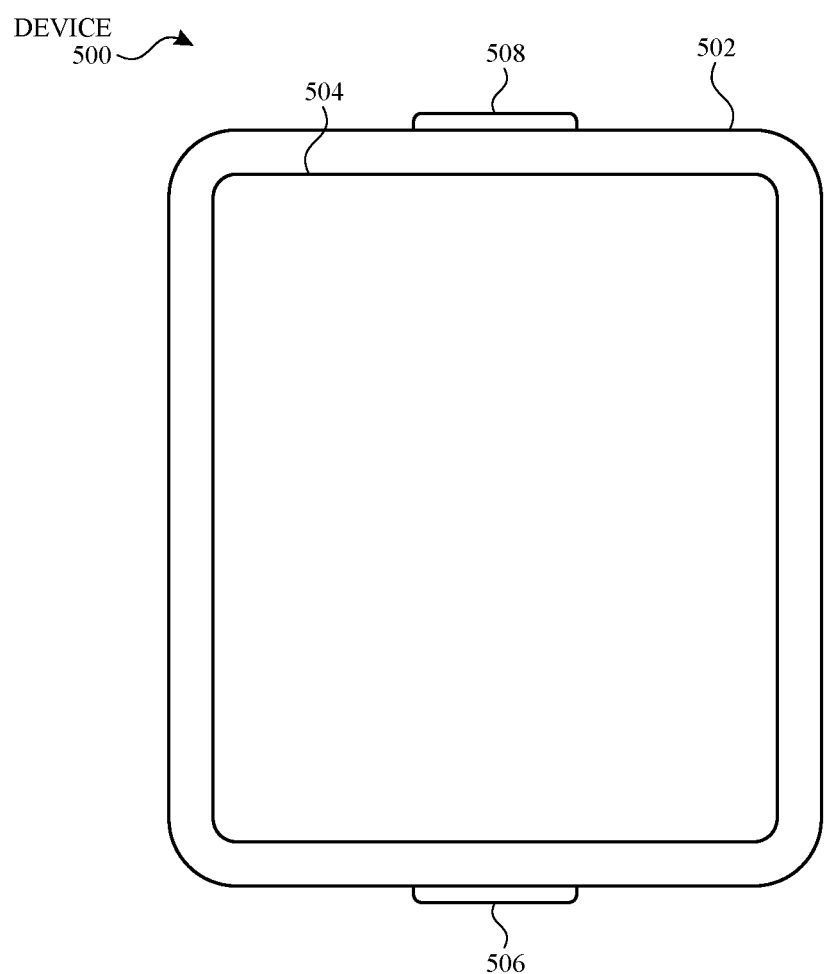
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May. 8, 2013, published as WIPO Publication No. WO/2013/169482, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
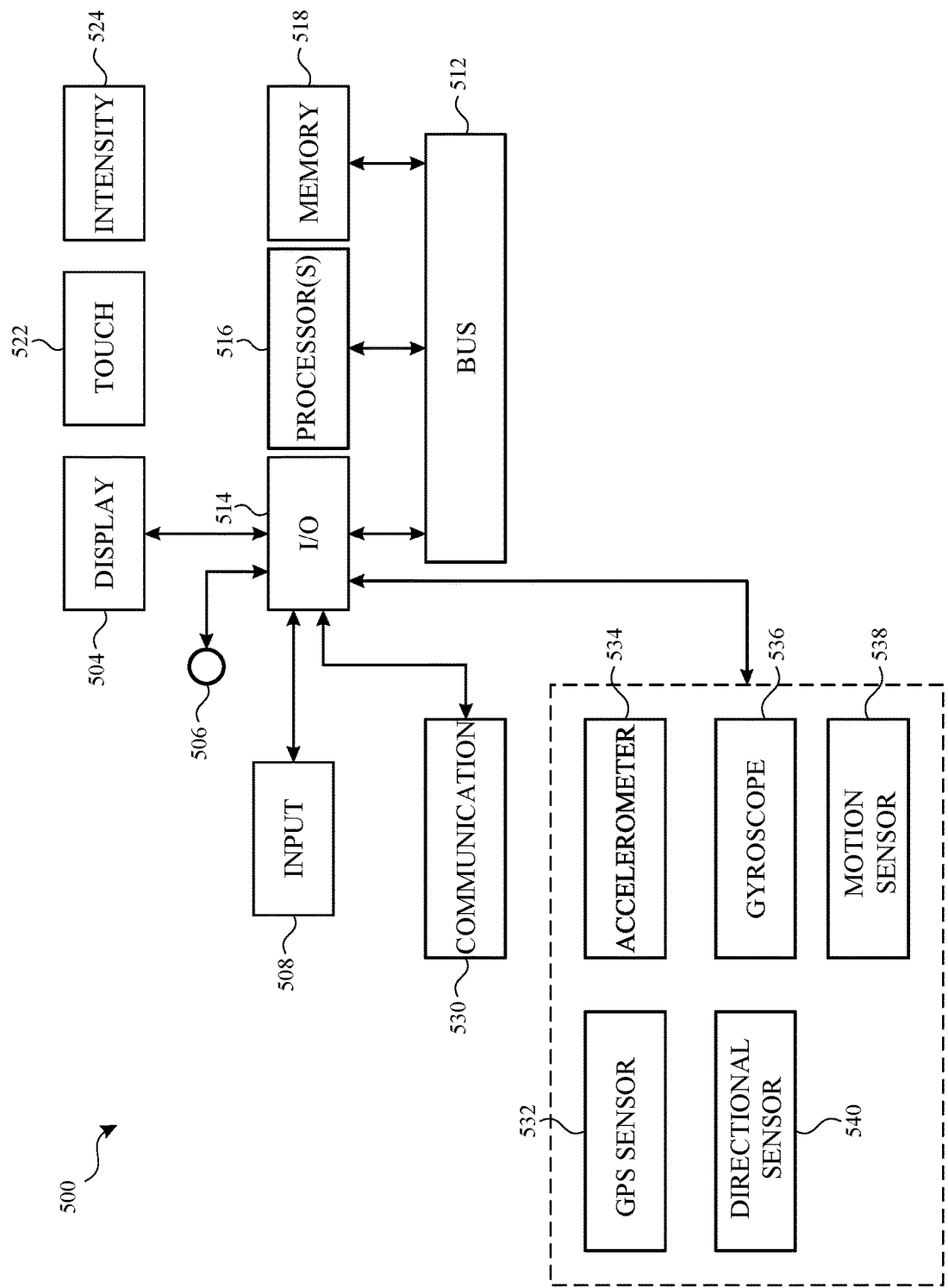
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6V illustrate exemplary user interfaces for enrolling (e.g., provisioning) a secure credential (e.g., a digital or virtual mobile key, a digital or virtual car key, a security token) on electronic device 600, in accordance with some embodiments. The user interfaces in these figures are used to illustrate the processes described below, including the processes in FIG. 7.

FIG. 6A depicts electronic device 600, which is a smartphone with display 602A. Electronic device 600 is logged into a user account corresponding to Jane Appleseed, as indicated by identifier 601A. It is noted that identifier 601A is not displayed by electronic device 600. Instead, identifier 601A is included in certain figures for ease of explanation with respect to techniques performed by electronic device 600. Display 602A of electronic device 600 includes a touch-sensitive surface on which electronic device 600 can detect user gestures (e.g., tap, swipe, drag). In some embodiments, electronic device 600 includes one or more features of electronic device 100, 300, and/or 500.

At FIG. 6A, electronic device 600 displays card 604 overlaid on home screen 606, where card 604 includes prompt 605A to initiate a process for enrolling a secure credential on electronic device 600. In some embodiments, completing the process for enrolling the secure credential results in the secure credential being stored on a secure element of electronic device 600, where the secure credential is configured to provide authorization to use one or more functions of the vehicle. For example, the secure credential is configured to provide authorization to unlock and drive the vehicle. Additional types of authorization are further discussed below. In some embodiments, electronic device 600 detects that electronic device 600 is in proximity of another device such as an NFC or ultra-wideband reader in the vehicle and, in response, triggers display of card 604. In some embodiments, in response to detecting the proximity, electronic device 600 transmits data to the vehicle, causing display 602B of the vehicle (e.g., a display of an in-dash navigation system) to display option 610B and prompt 605B (e.g., corresponding to prompt 605A) to initiate the process for enrolling the secure credential on electronic device 600. As indicated by identifier 601B, the vehicle belongs to Jane Appleseed, whose user account is associated with electronic device 600. Similar to identifier 601A, identifier 601B is not displayed by display 602B, but is instead included in certain figures for ease of explanation with respect to techniques performed by electronic device 600. In some embodiments, the vehicle only displays option 610B if vehicle determines that the process is authorized. In some embodiments, the process is authorized if an authorizing key fob, physical key, or other authorizing mechanism or device is present.

In some embodiments, electronic device 600 receives data (e.g., from the vehicle) as a result of input at display 602B of the vehicle and, in response, performs an operation based on the received data. For example, electronic device 600 receives data indicating that option 610B has been selected at display 602B and, in response, electronic device 600 displays, on display 602A, code entry user interface 612 of FIG. 6B.

Returning to FIG. 6A, electronic device 600 detects a tap gesture to initiate a process for enrolling the secure credential on electronic device 600. While displaying card 604 overlaid on home screen 606, electronic device 600 detects input 608 at a location corresponding to option 610A.

Figure 6B:
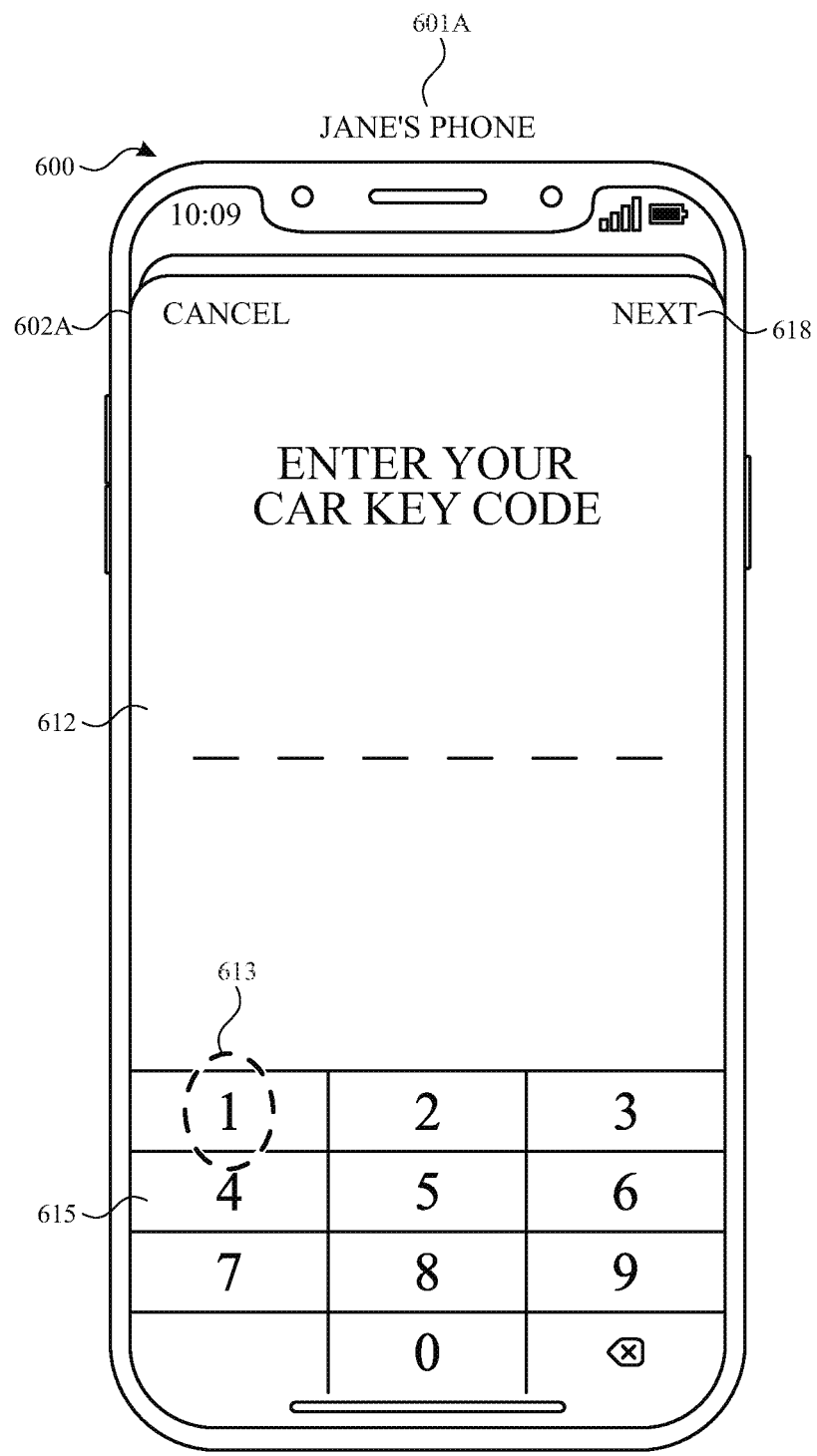

At FIG. 6B, in response to detecting input 608, electronic device 600 replaces display of card 604 with code entry user interface 612 that includes virtual numpad 615. The user inputs a code that was provided by a manufacturer of the vehicle (e.g., via an application provided by the manufacturer, via a website of the manufacture, or via a dealership when purchasing or leasing the vehicle). While displaying code entry user interface 612, electronic device 600 detects one or more inputs, including input 613, via virtual numpad 615. It is noted that successful authentication of the inputted code is required to proceed with the process for enrolling the secure credential. In some embodiments, the inputted code is authenticated at a server. In some embodiments, the inputted code is authenticated at electronic device 600.

Figure 6C:
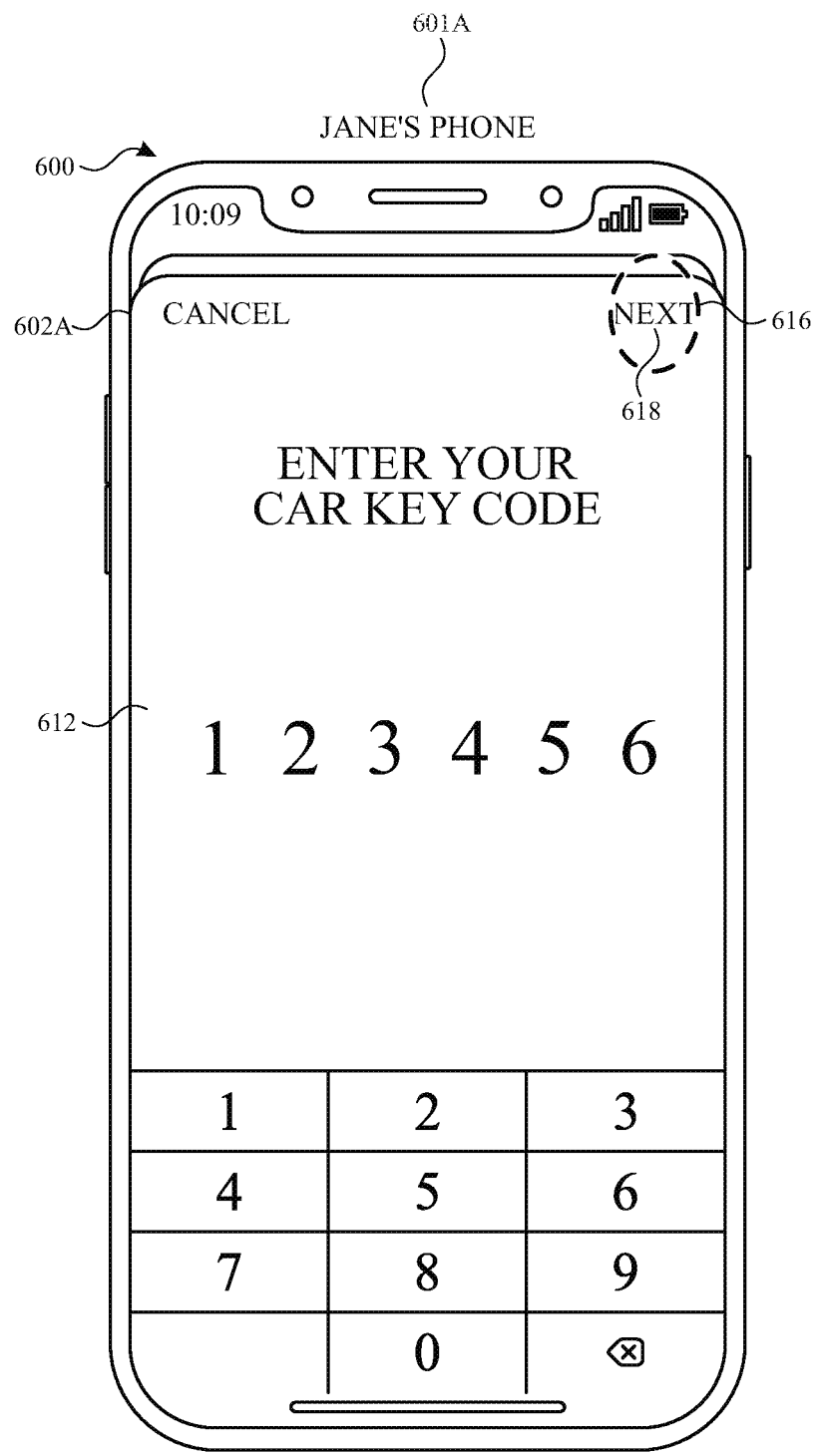

At FIG. 6C, the user submits the inputted code. Electronic device 600 detects input 616 at a location corresponding to option 618. In response to detecting input 616, electronic device 600 attempts to authenticate (e.g., validate) the inputted code. In some embodiments, electronic device 600 transmits the inputted code to be authenticated at another device (e.g., authentication server).

Figure 6D:
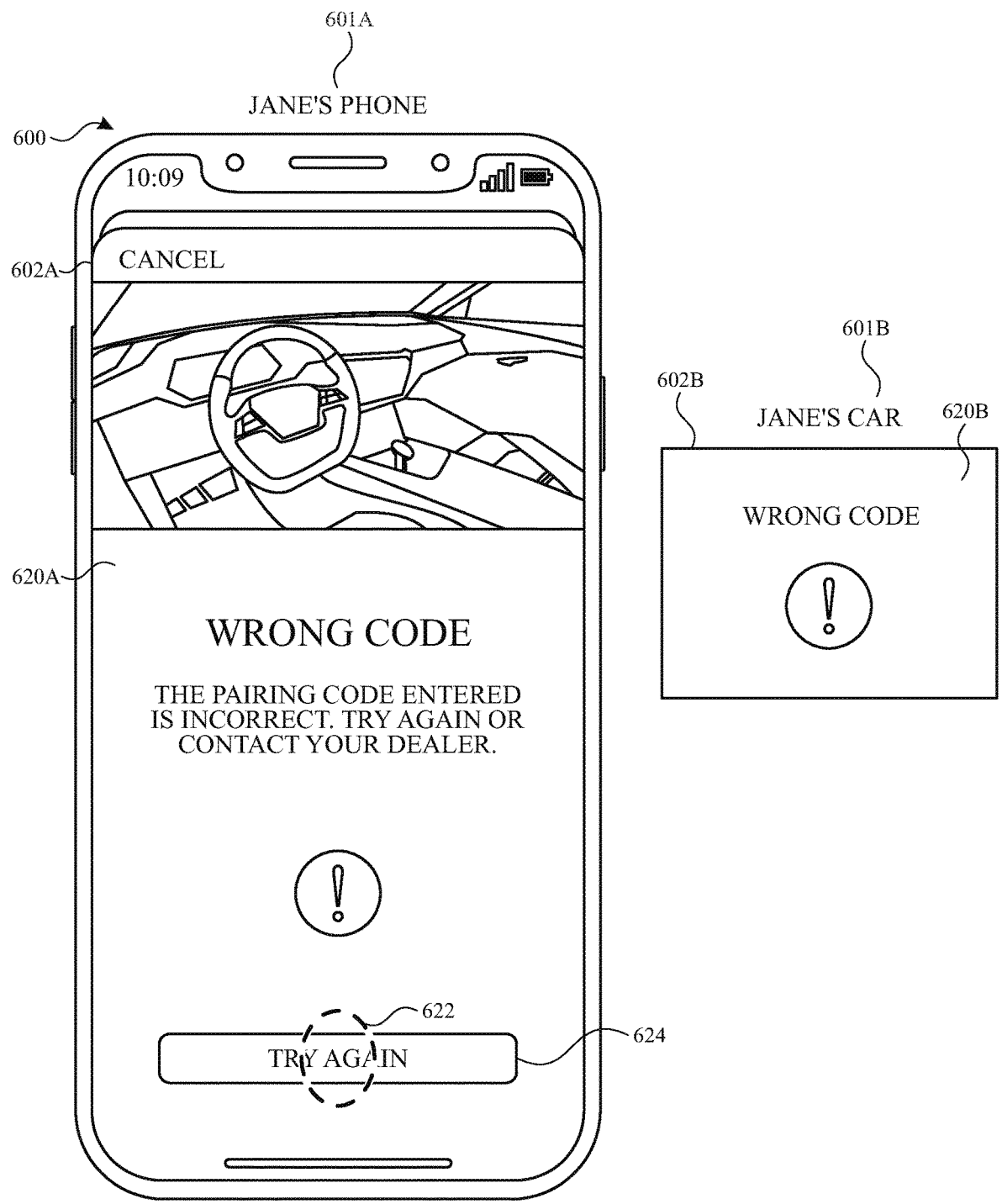

At FIG. 6D, in response to detecting input 616 and in accordance with a determination that authentication of the inputted code has failed, electronic device 600 replaces display of code entry user interface 612 with error user interface 620A, which indicates that the inputted code has failed to be authenticated. Error user interface 620A includes a prompt to retry inputting the code and option 624 for initiating a process to retry inputting the code. Additionally, in response to detecting input 616 and in accordance with a determination that authentication of the inputted code has failed, electronic device 600 transmits data to the vehicle, causing display 602B of the vehicle to display error user interface 620B that corresponds to error user interface 620A. Error user interface 620B similarly indicates that the inputted code has failed to be authenticated. In some embodiments, in response to detecting input 616 and in accordance with a determination that authentication of the inputted code is successful, electronic device 600 replaces display of code entry user interface 612 with key user interface 626A of FIG. 6E.

Returning to FIG. 6D, electronic device 600 detects a tap gesture to initiate the process for retrying inputting the code. Electronic device 600 detects input 622 at a location corresponding to option 624. In response to detecting input 622, electronic device 600 replaces display of error user interface 620A with code entry user interface 612 of FIG. 6B. The user retries inputting the code and submits the inputted code. Electronic device 600 detects one or more inputs via virtual numpad 615 and detects an input at a location corresponding to option 618.

Figure 6E:
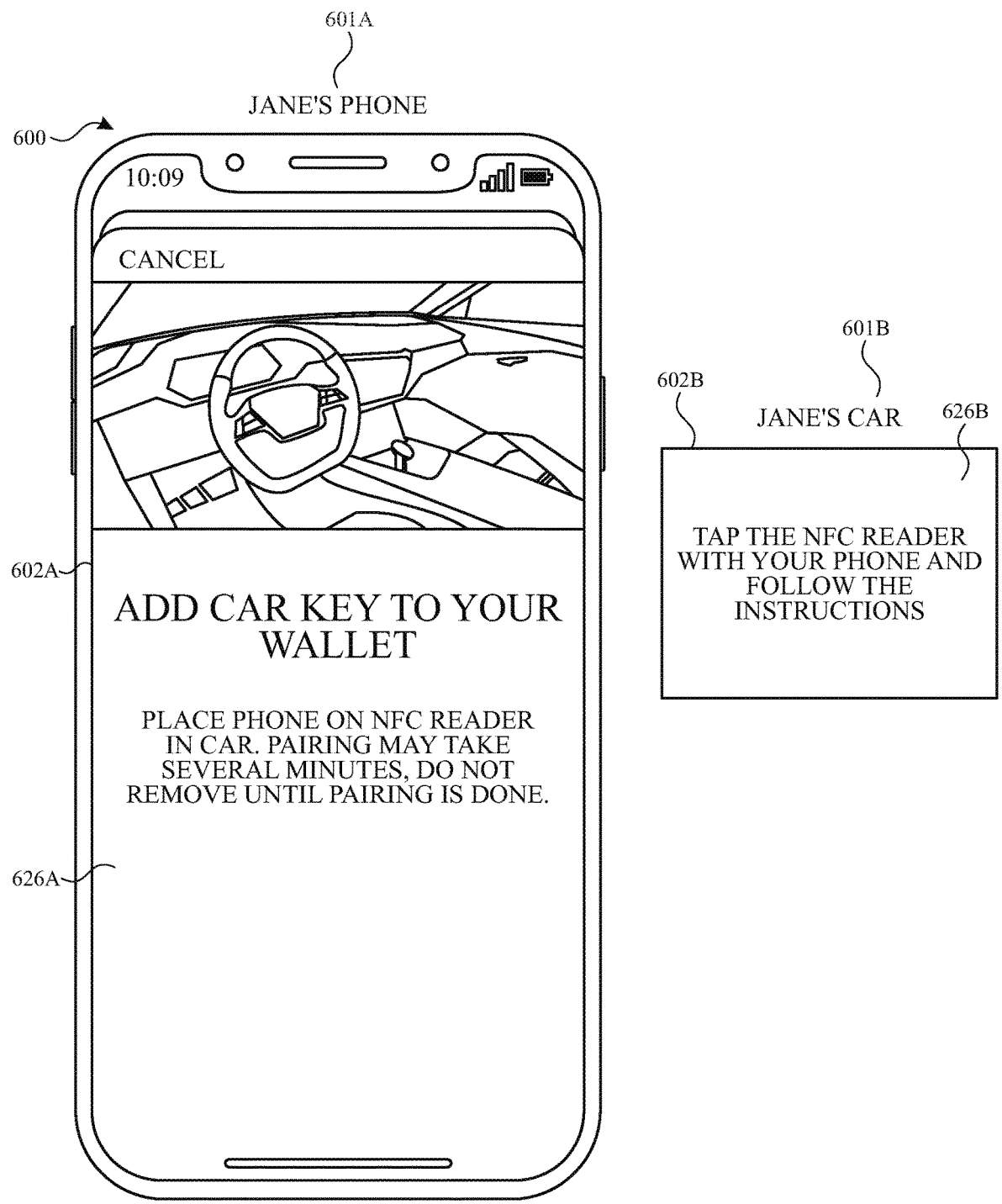

At FIG. 6E, in response to detecting the input corresponding to option 618 and in accordance with a determination that authentication of the inputted code is successful, electronic device 600 replaces display of code entry user interface 612 with key user interface 626A, which prompts the user to place electronic device 600 on an NFC reader in the vehicle to continue with the process for enrolling the secure credential on electronic device 600. In some embodiments, key user interface 626A includes a prompt to place electronic device 600 in the proximity of the vehicle. Additionally, in response to detecting the input corresponding to option 618 and in accordance with a determination that authentication of the inputted code is successful, electronic device 600 transmits data to the vehicle, causing display 602B of the vehicle to display key user interface 626B that corresponds to key user interface 626A. Key user interface 626B similarly prompts the user to place electronic device 600 on an NFC reader in the vehicle.

Figure 6F:
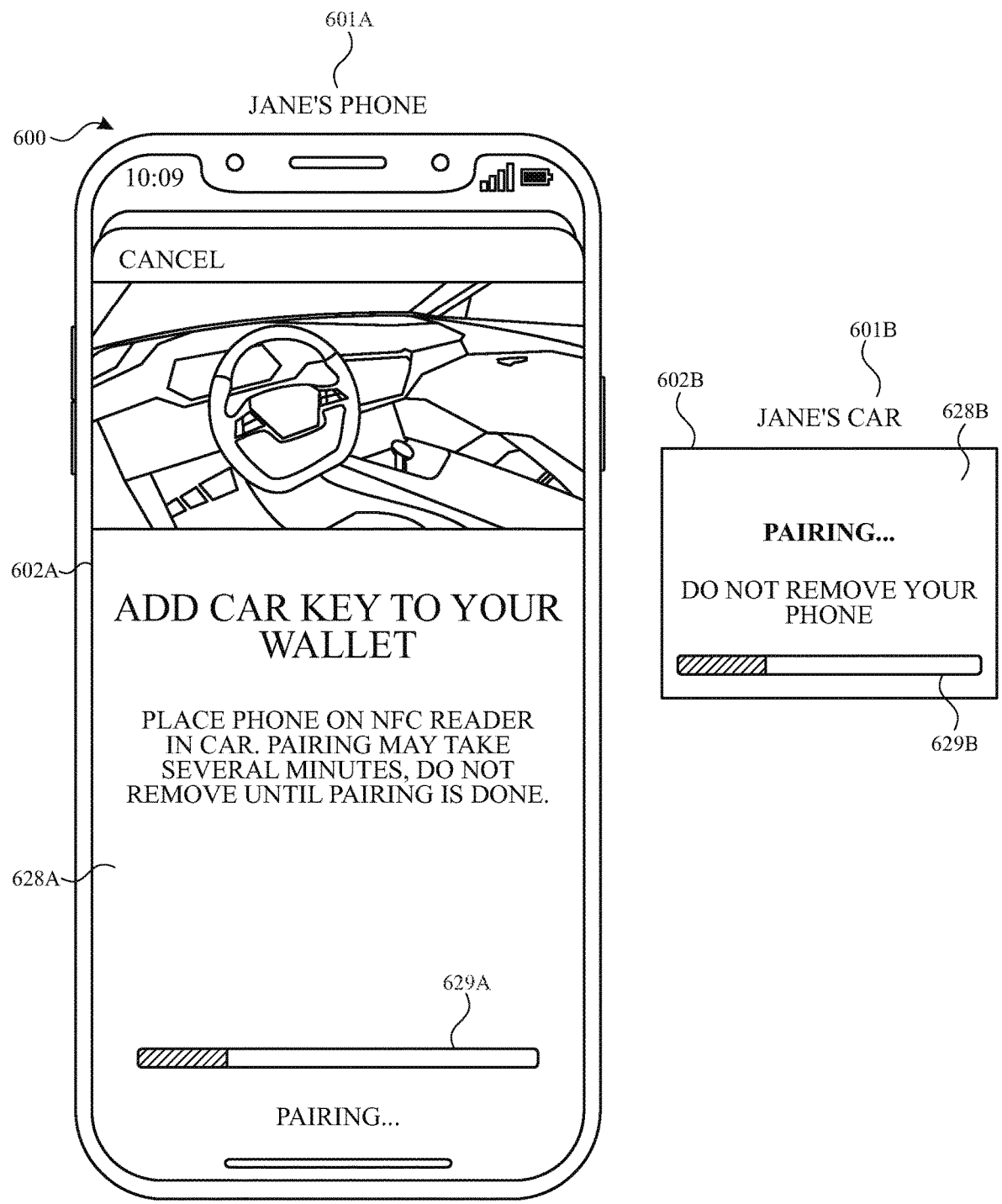

At FIG. 6F, the user places electronic device 600 on the NFC reader. Electronic device 600 detects that electronic device 600 has been placed in the proximity of the NFC reader. In response to detecting the proximity of the NFC reader, electronic device 600 displays key user interface 628A, which includes a progress indicator 629A corresponding to the enrolling of the secure credential on electronic device 600. Additionally, in response to detecting the proximity of the NFC reader, electronic device 600 transmits data to the vehicle, causing display 602B of the vehicle to display key user interface 628B that corresponds to key user interface 628A. Key user interface 628B similarly provides progress indicator 629B corresponding to the enrolling of the secure credential on electronic device 600.

Figure 6G:
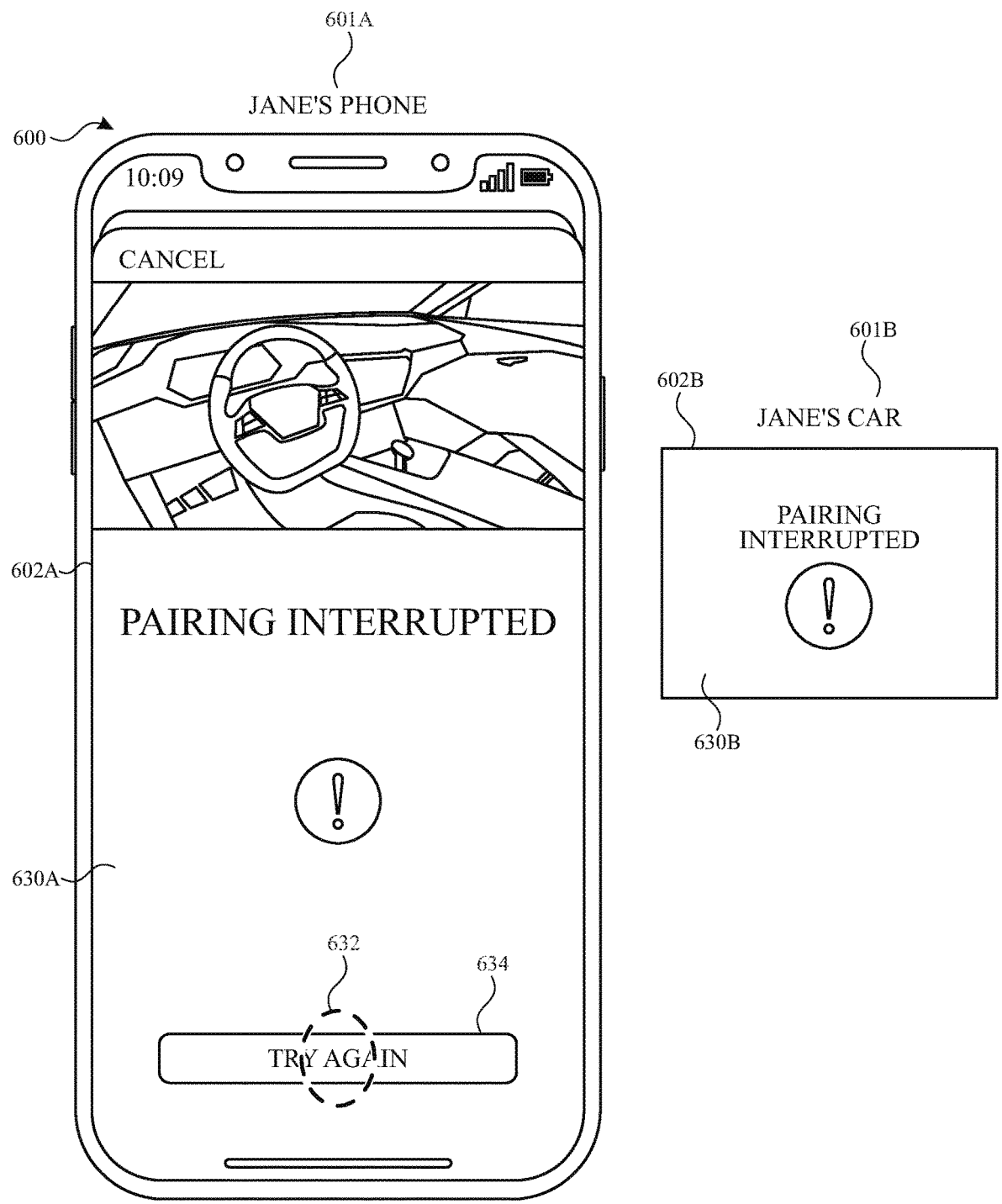

At FIG. 6G, an error occurs during the process for enrolling the secure credential. For example, communication between the vehicle and electronic device 600 is interrupted. Electronic device 600 detects that an error has occurred during the process for enrolling the secure credential on electronic device 600. In response to detecting the error, electronic device 600 replaces display of key user interface 628A with error user interface 630A, which provides an indication that an error has occurred during the enrollment process. Additionally, in response to detecting the error, electronic device 600 transmits data to the vehicle, causing display 602B of the vehicle to display error user interface 630B that corresponds to error user interface 630A. In some embodiments, the vehicle displays error user interface 630B upon detecting an error, without the need for data to be transmitted from device 600 that indicates an error. Error user interface 630B similarly indicates that an error has occurred during the enrollment process.

As shown in FIG. 6G, electronic device 600 detects a tap gesture to re-initiate the process for enrolling the secure credential on electronic device 600. Electronic device 600 detects input 632 at a location corresponding to option 634. In response to detecting input 632, electronic device 600 replaces display of error user interface 630A with key user interface 628A of FIG. 6F with progress indicator 629A.

Figure 6H:
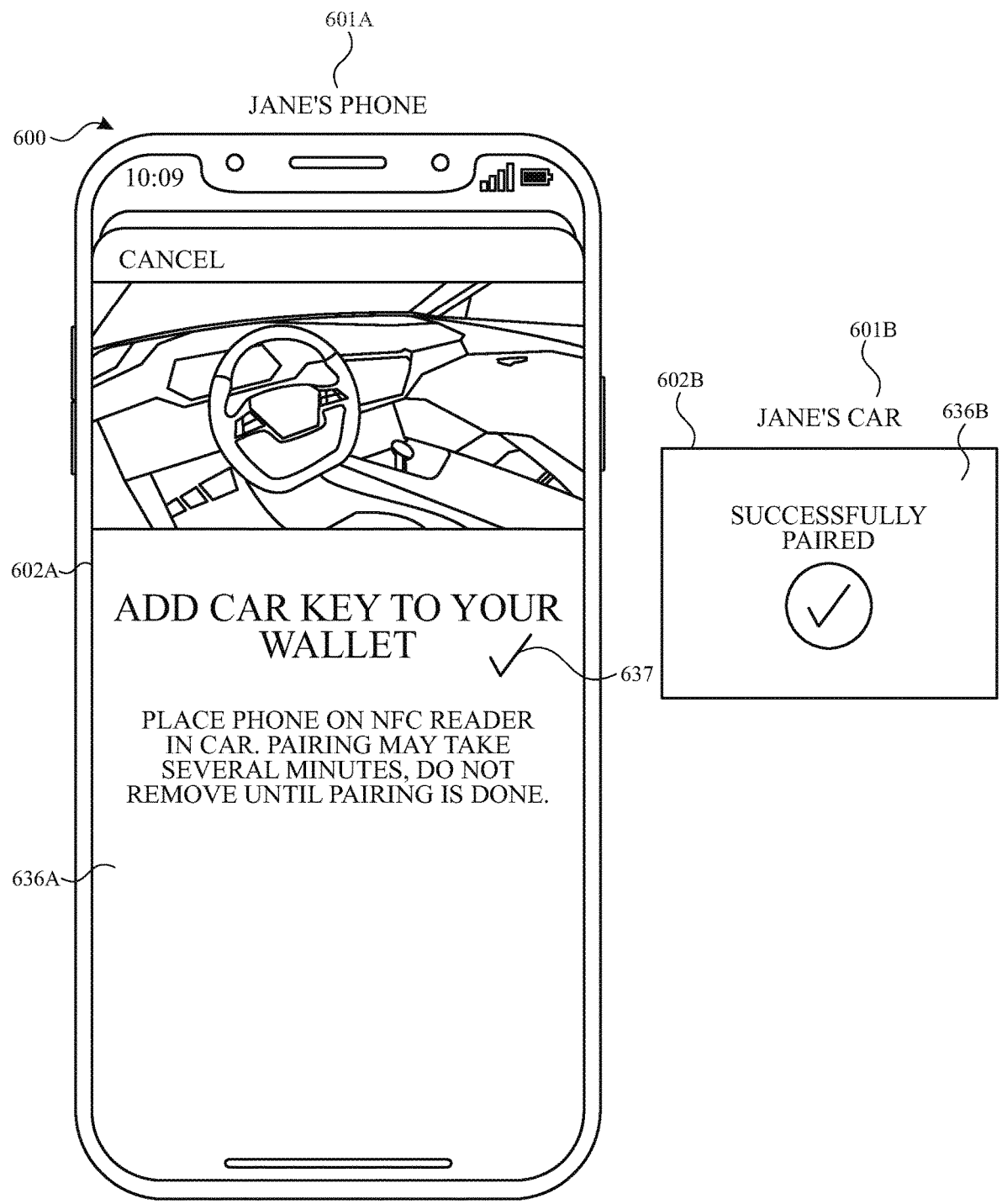

At FIG. 6H, in response to detecting that enrollment on electronic device 600 has completed, electronic device 600 replaces key user interface 628A with success user interface 636A. In some embodiments, success user interface 636A is displayed immediately after interface 628A, without intervening display of error user interface 630A, when pairing succeeds without any errors. Success user interface 636A includes success indicator 637, which provides an indication that the secure credential has been successfully enrolled on electronic device 600. Additionally, in response to detecting that enrollment has completed, electronic device 600 transmits data to the vehicle, causing display 602B of the vehicle to display success user interface 636B that corresponds to success user interface 636A. Success user interface 636B similarly indicates that the secure credential has been successfully enrolled on electronic device 600.

Figure 6I:
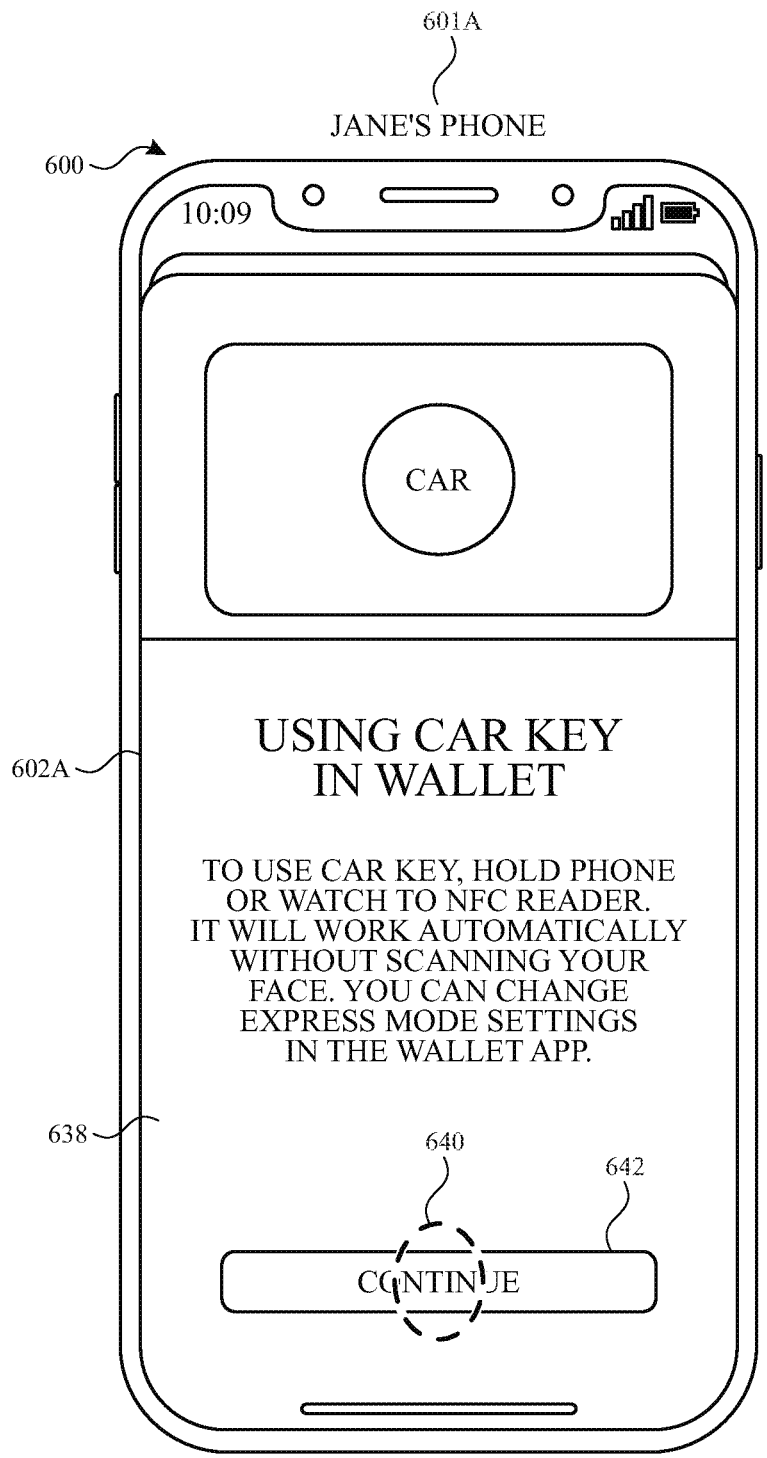

At FIG. 6I, electronic device 600 automatically transitions from success user interface 636B to completion user interface 638. In particular, in response to determining that a predetermined amount of time has elapsed, electronic device 600 replaces display of success user interface 636B with completion user interface 638, which indicates that the secure credential on electronic device 600 is ready for use. Moreover, completion user interface 638 includes instructions for how to use the secure credential on electronic device 600.

As depicted in FIG. 6I, electronic device 600 detects a tap gesture at option 642 to continue to the next step. Electronic device 600 detects input 640 at a location corresponding to option 642.

Figure 6J:
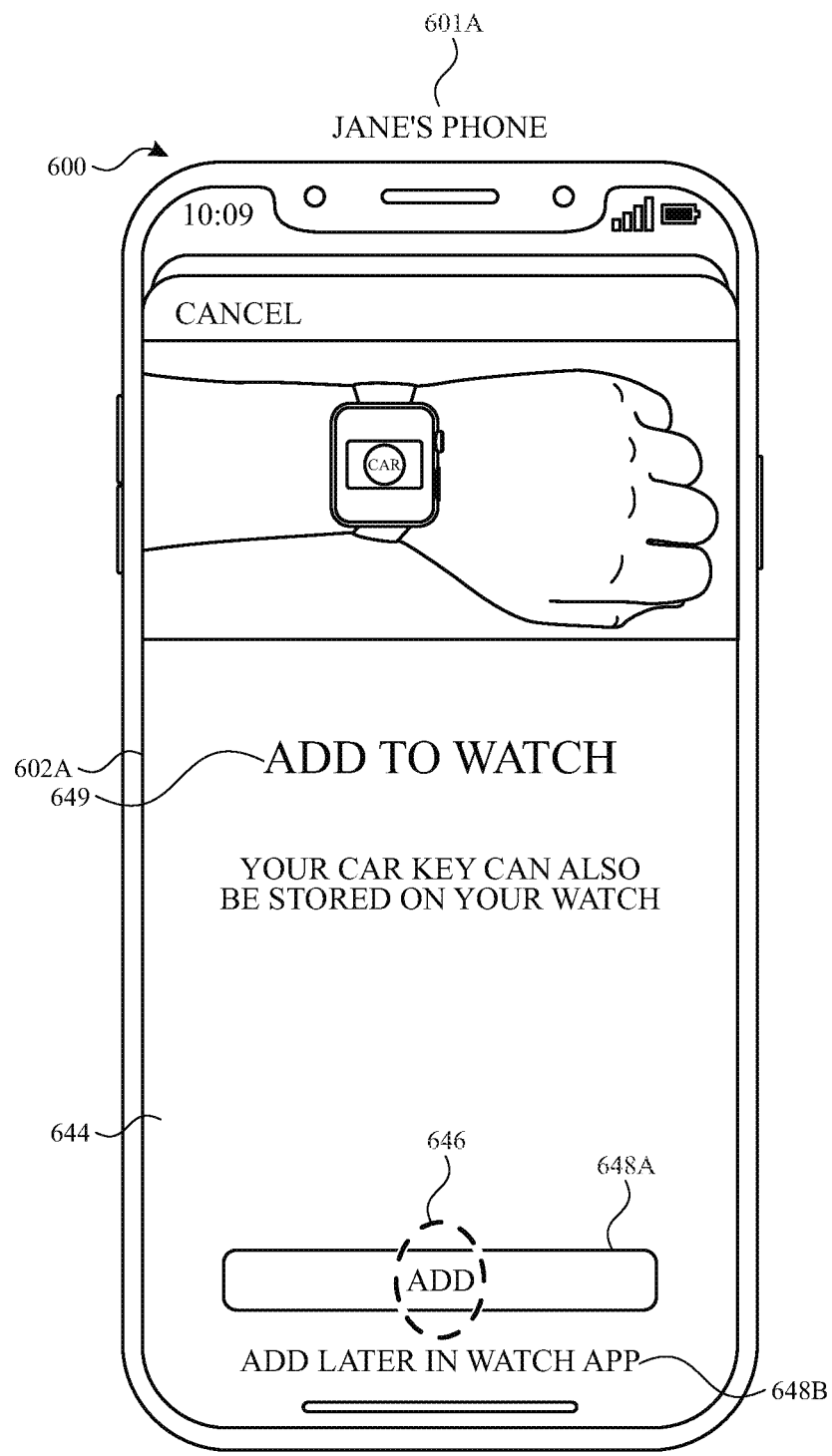

At FIG. 6J, in response to detecting input 640, electronic device 600 replaces display of completion user interface 638 with companion user interface 644. Companion user interface 644 includes options 648A-648B and prompt 649 to enroll a secure credential on companion device 650, which is a smartwatch that is operably connected to (e.g., paired with) electronic device 600. In particular, companion device 650 is wirelessly connected to electronic device 600 via a wireless protocol (e.g., Bluetooth). In some embodiment, companion device 650 includes one or more features of electronic device 100, 300, or 500.

As shown in FIG. 6J, electronic device 600 detects a tap gesture to proceed with the process for enrolling a secure credential on companion device 650. Electronic device 600 detects input 646 at option 648A.

Figure 6K:
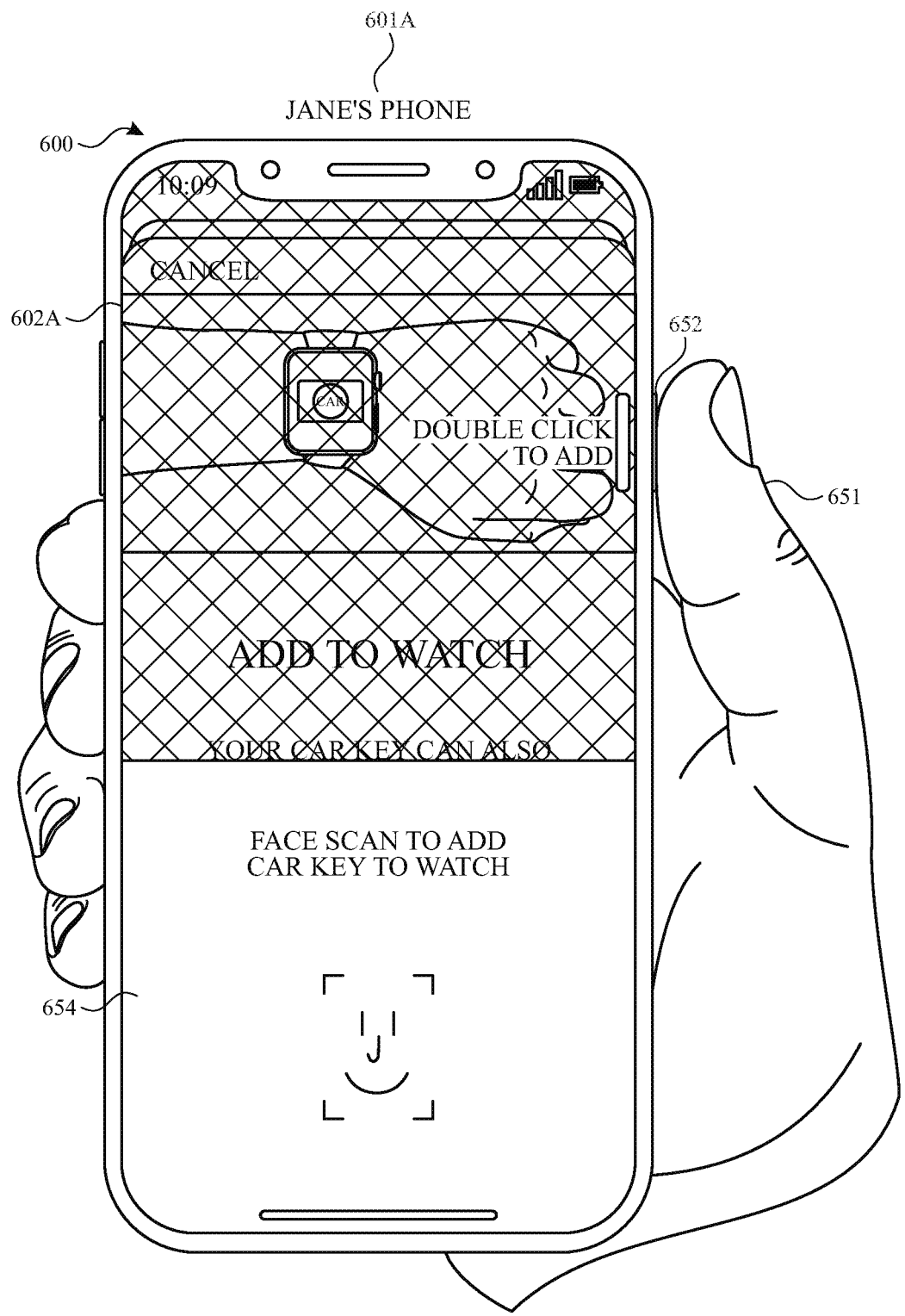

At FIG. 6K, in response to detecting input 646, electronic device 600 replaces display of companion user interface 644 with authentication user interface 654, which prompts the user to perform biometric authentication. Successful authentication of the user is a requirement for enrolling the secure credential on companion device 650. In some embodiments, authentication is not required to enroll the secure credential. Electronic device 600 detects a double press gesture to initiate biometric authentication. Electronic device 600 detects input 651 at hardware button 652 of electronic device 600. In response to detecting input 651, electronic device 600 attempts to biometrically authenticate the user.

Figure 6L:
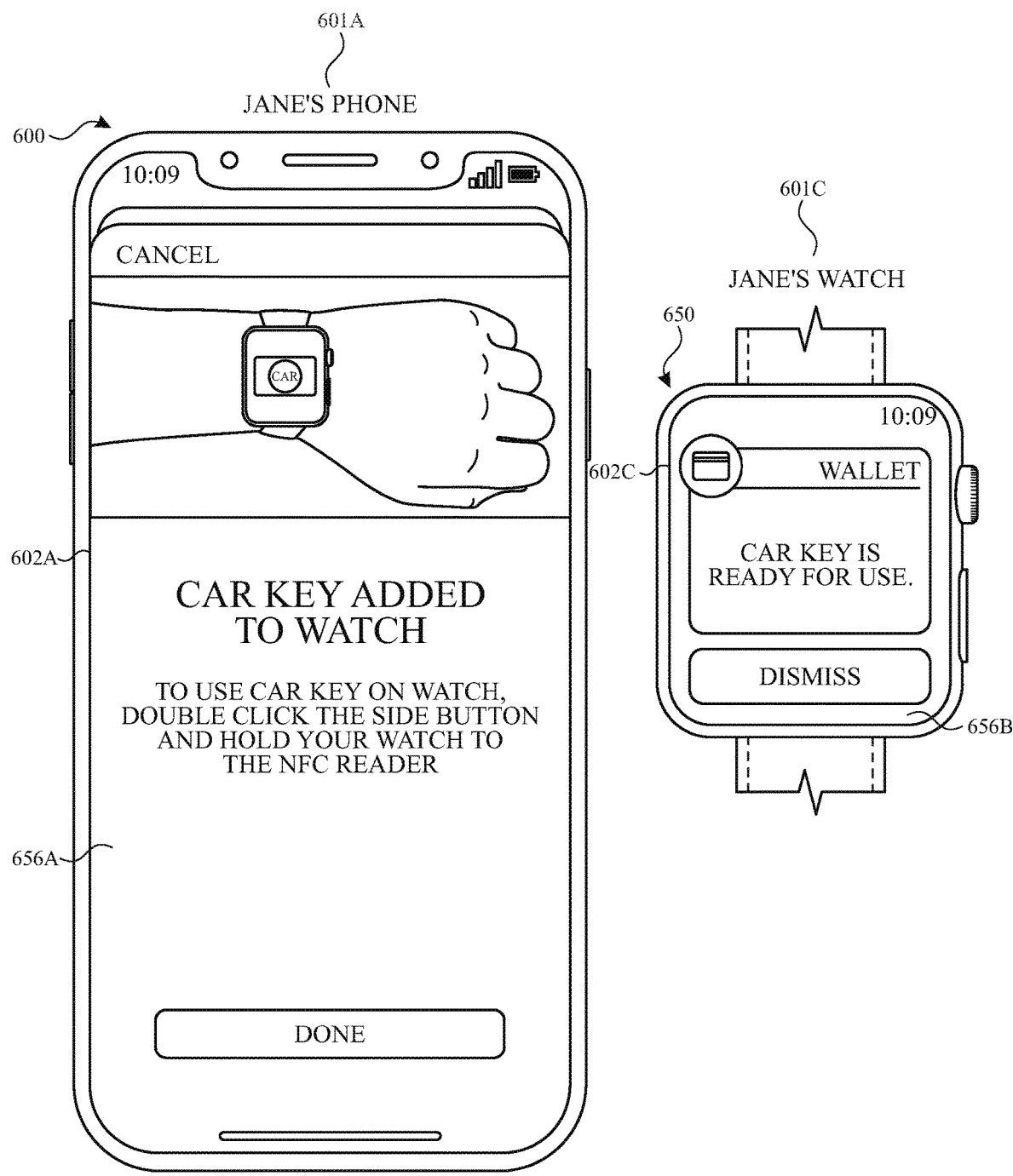

At FIG. 6L, in response to detecting input 651 and in accordance with a determination that biometric authentication is successful, electronic device 600 replaces display of authentication user interface 654 with completion user interface 656A. Completion user interface 656A indicates that the secure credential on companion device 650 is ready for use. Moreover, completion user interface 656A includes instructions for how to use the secure credential on companion device 500. Companion device 650 is logged into the same user account as electronic device 600, as indicated by identifier 601C. It is noted that identifier 601C is not displayed by companion device 650. Instead, identifier 601C is included in this figure for ease of explanation with respect to techniques performed by electronic device 600.

Additionally, in response to detecting input 651 and in accordance with a determination that biometric authentication is successful, electronic device 600 transmits data to companion device 650, causing display 602C to display completion user interface 656B that corresponds to completion user interface 656A. Completion user interface 656B similarly indicates that the secure credential on companion device 650 is ready for use.

Figure 6M:
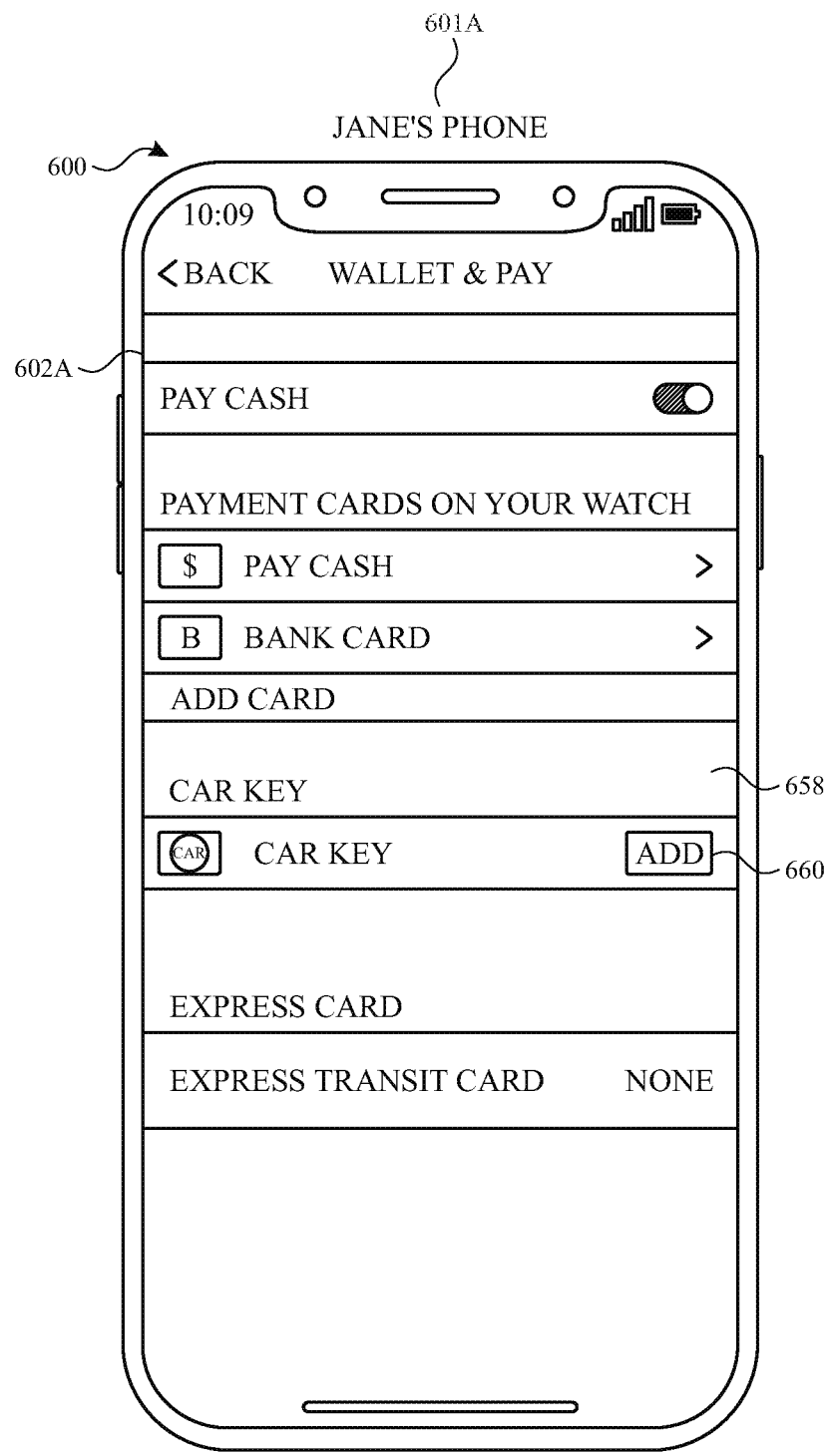

FIG. 6M depicts the result of the user selecting option 648B instead of option 648A in FIG. 6J. In response to detecting an input at a location corresponding to option 648B, electronic device 600 replaces display of companion user interface 644 with companion user interface 658 of an application dedicated to companion device 650. Companion user interface 644 includes option 660 that, when selected, triggers the process for enrolling a secure credential on companion device 650, as discussed above with respect to FIGS. 6J-6L.

FIGS. 6N-6Q depict a technique for deactivating express mode on electronic device 600. In some embodiments, when express mode is deactivated, electronic device 600 requires successful user authentication (e.g., biometric authentication, passcode authentication) as a condition for providing authorization, via the secure credential, to use one or more functions of the vehicle. Conversely, when express mode is activated, electronic device 600 provides authorization, via the secure credential, to use one or more functions of the vehicle without requiring successful user authentication.

Figure 6N:
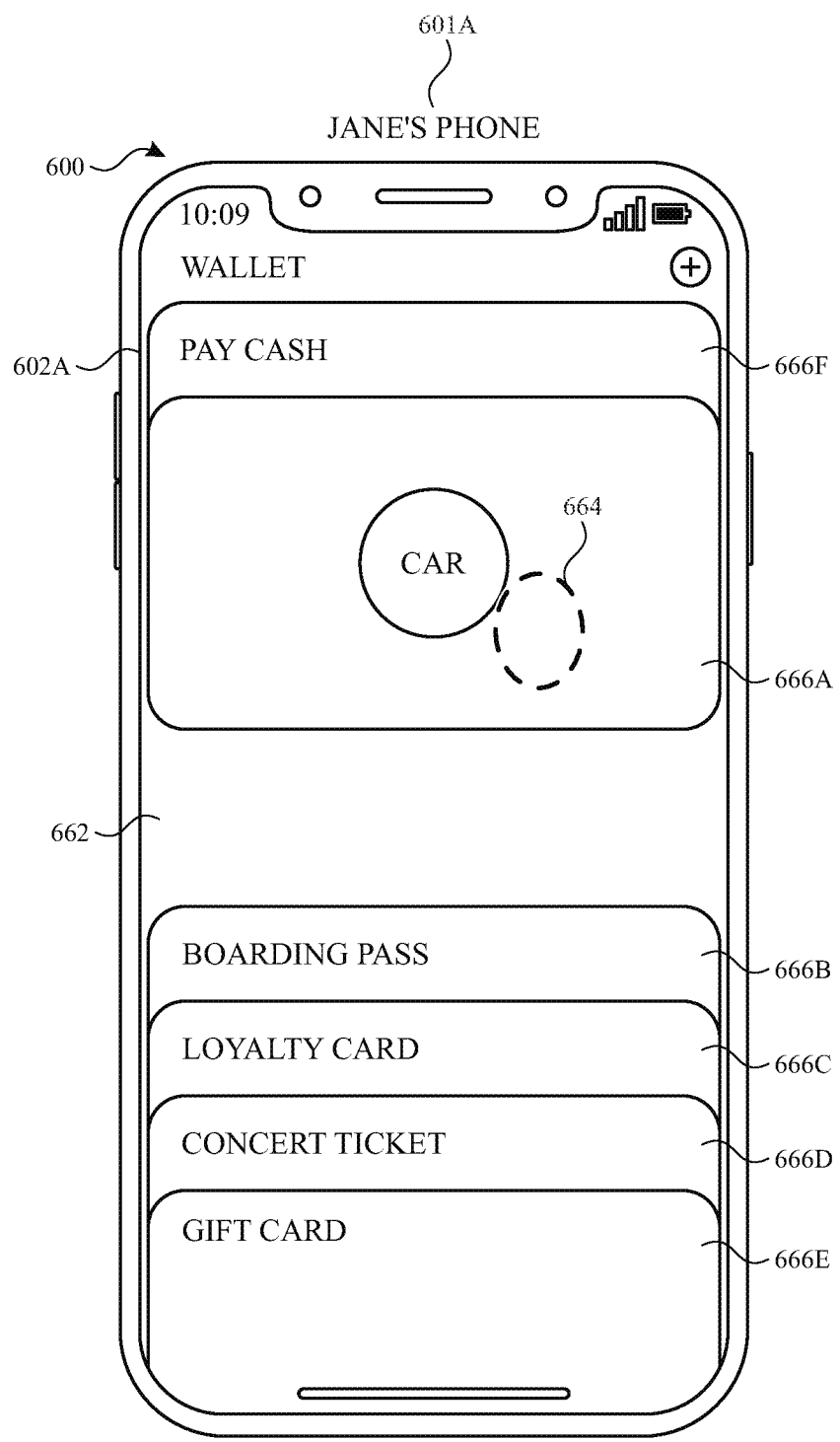

FIG. 6N depicts user interface 662 of a wallet application on electronic device 600. After completing the process for enrolling the secure credential on electronic device 600, the user navigates to the wallet application on electronic device 600. Electronic device 600 displays user interface 662 with representations 666A-666F. Representation 666A is a representation of the secure credential that was enrolled on electronic device 600, as discussed above with respect to FIG. 6A-6I. Representations 666B-666f are representations of other secure credentials that do not provide authorization to use one or more functions of the vehicle. For example, representation 666F is a representation of a secure credential corresponding to a payment account. As another example, representation 666B is a representation of a secure credential corresponding to a non-payment account. In particular, representation 666B is configured to provide authorization to access a restricted physical area.

Electronic device 600 detects a tap gesture on representation 666A to access additional information about the secure credential corresponding to representation 666A. Electronic device 600 detects input 664 at a location corresponding to representation 666A.

Figure 6O:
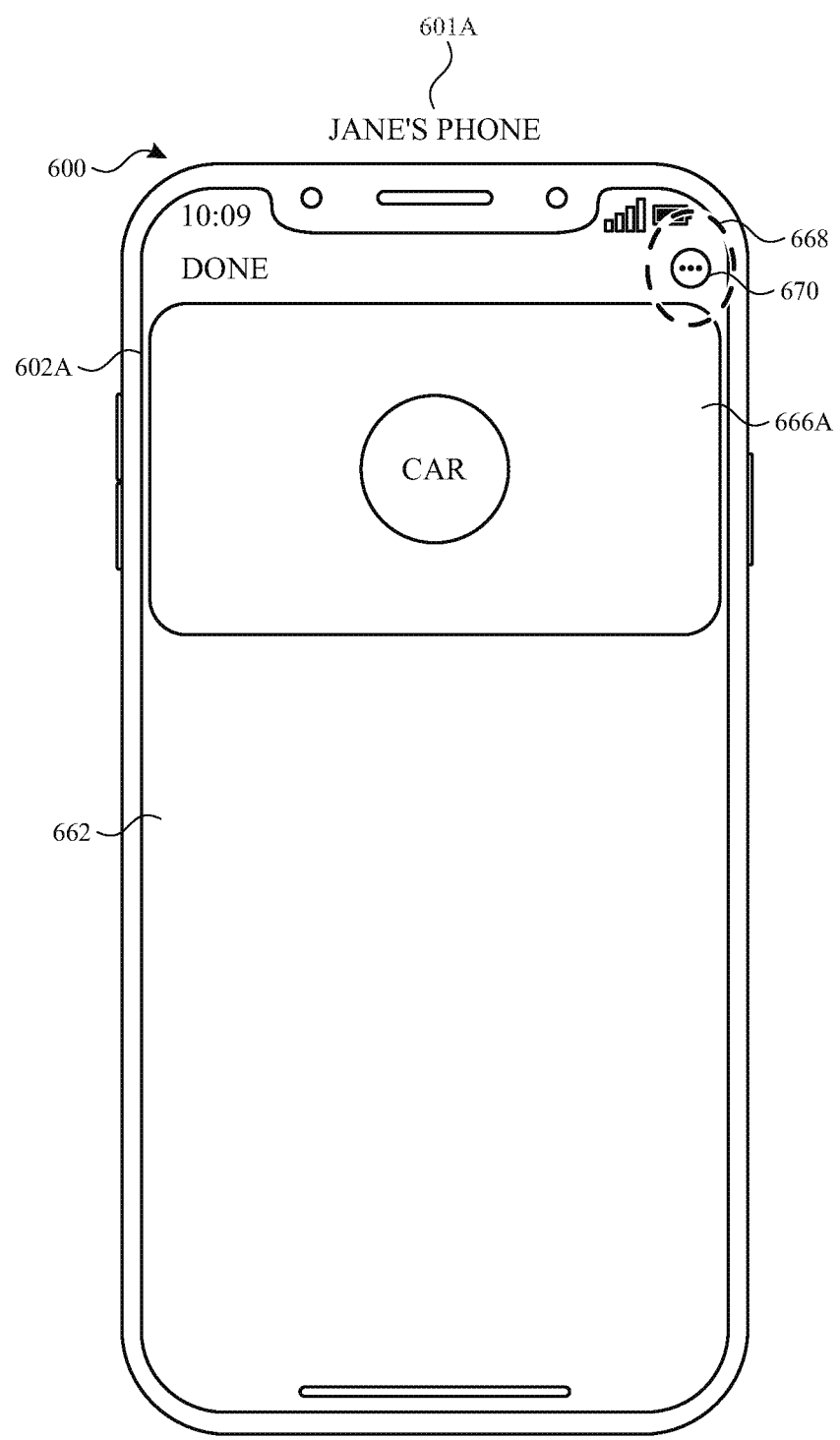

FIG. 6O depicts the result of detecting the tap gesture on representation 666A. In response to detecting input 664, electronic device 600 updates user interface 662 and displays representation 666A while ceasing to display representations 666B-666F. Electronic device 600 detects a tap gesture at option 670. Electronic device 600 detects input 668 at a location corresponding to option 670.

Figure 6P:
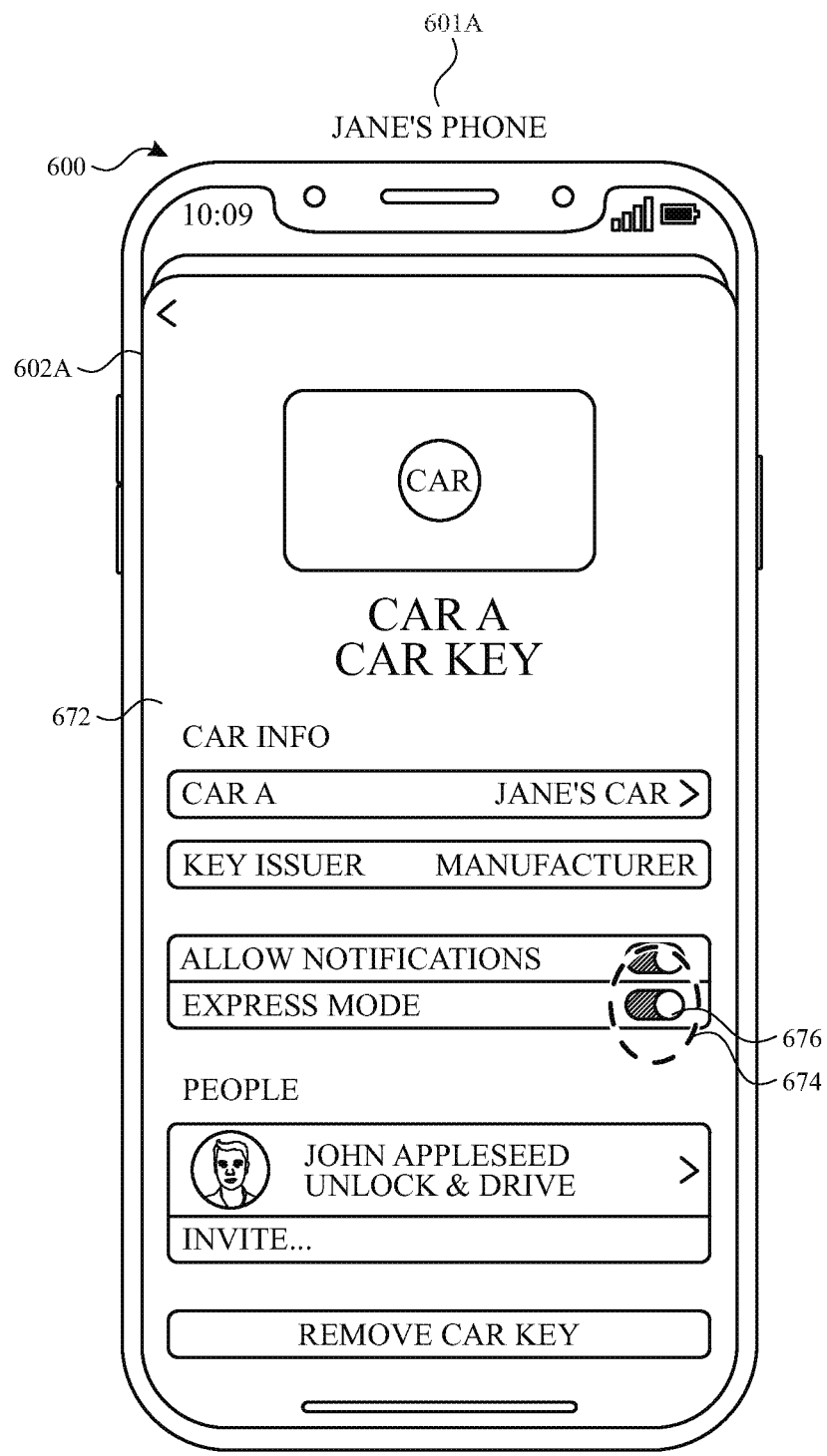

FIG. 6P depicts the result of detecting the tap gesture at option 670. In response to detecting input 668, electronic device 600 replaces display of user interface 662 with settings user interface 672. Settings user interface 672 includes option 676 for toggling the activation of express mode for the secure credential. In some embodiments, option 676 indicates that express mode is activated, which is the default setting upon successful enrollment of the secure credential. Electronic device 600 detects a tap gesture at option 676. Electronic device 600 detects input 674 at a location corresponding to option 676.

Figure 6Q:
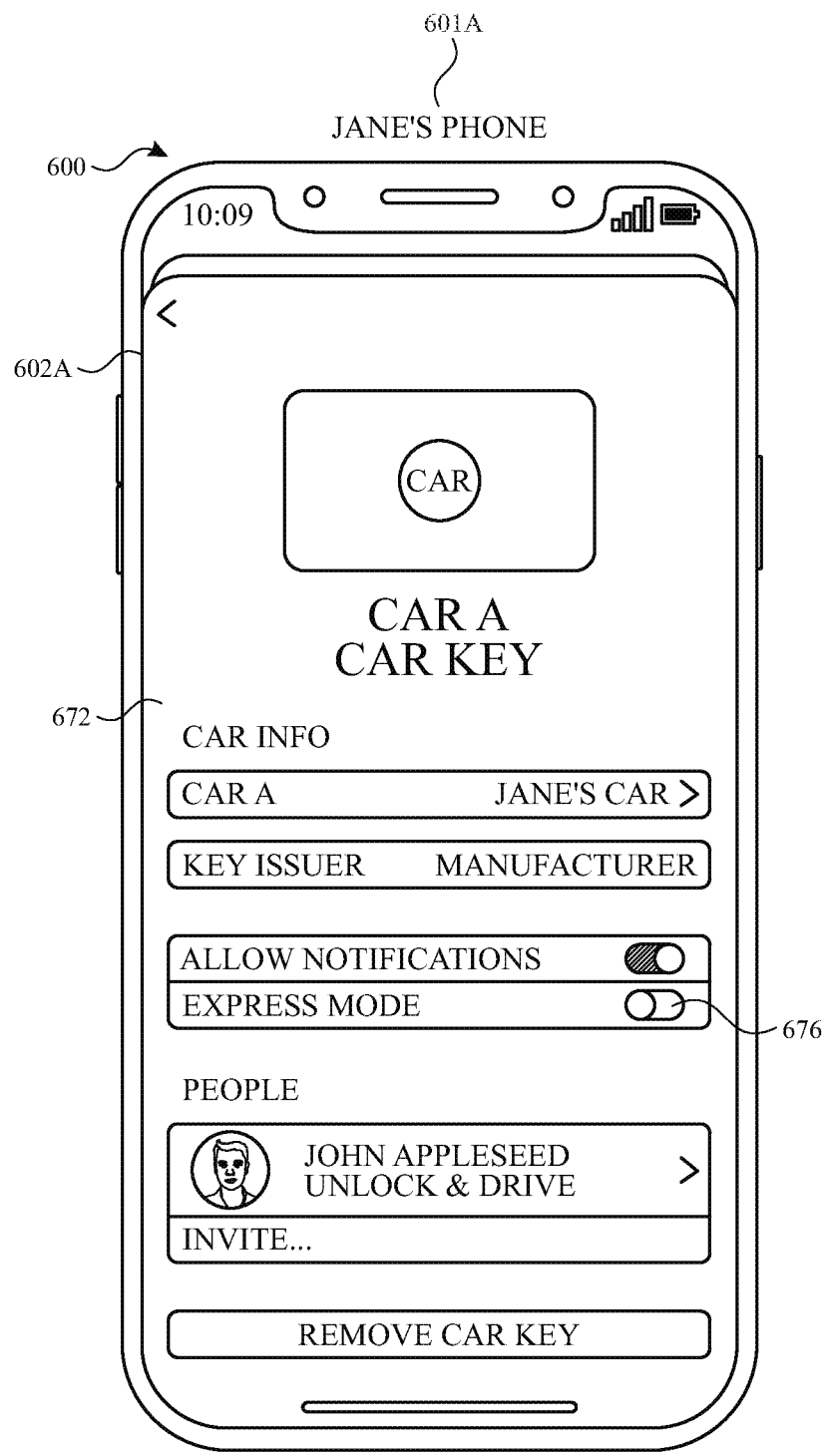

FIG. 6Q depicts the result of detecting the tap gesture at option 676. In response to detecting input 674, electronic device 600 deactivates express mode and modifies the display of option 676 to indicate that express mode has been deactivated.

Figure 6R:
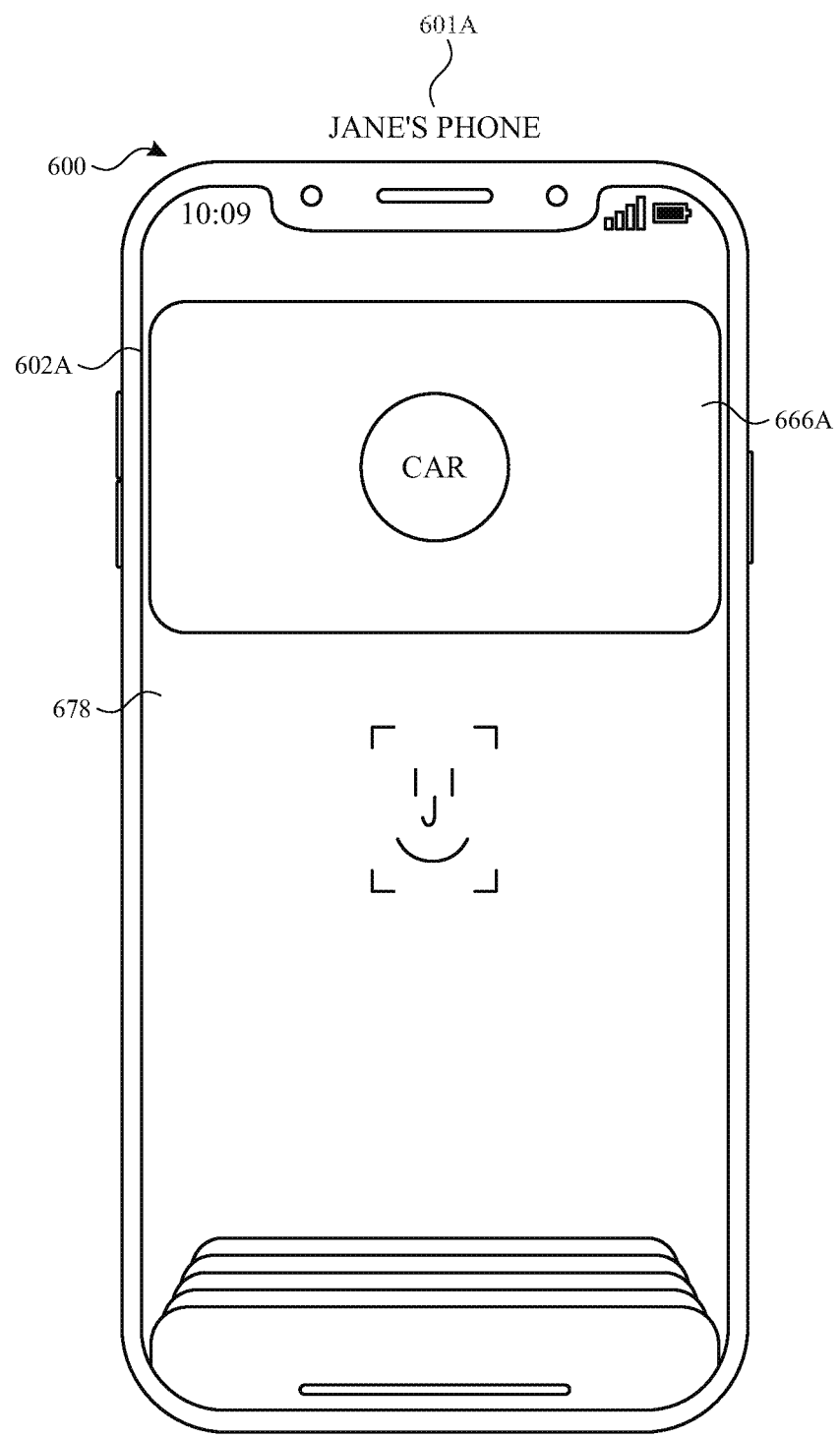

FIG. 6R depicts that, once express mode has been deactivated, successful authentication is required for the secure credential to provide authorization to use one or more functions of the vehicle. After deactivating express mode, the user attempts to unlock a door of the vehicle. Before the secure credential can provide authorization to unlock the door of the vehicle, electronic device 600 requires successful user authentication. Electronic device 600 displays user interface 678, which prompts the user to biometrically authenticate. In some embodiments, after successfully authenticating the user, the secure credential on electronic device 600 provides authorization to unlock the door of the vehicle. In some embodiments, if express mode is activated, successful authentication is not required for the secure credential to provide authorization to use one or more functions of the vehicle.

Figure 6S:
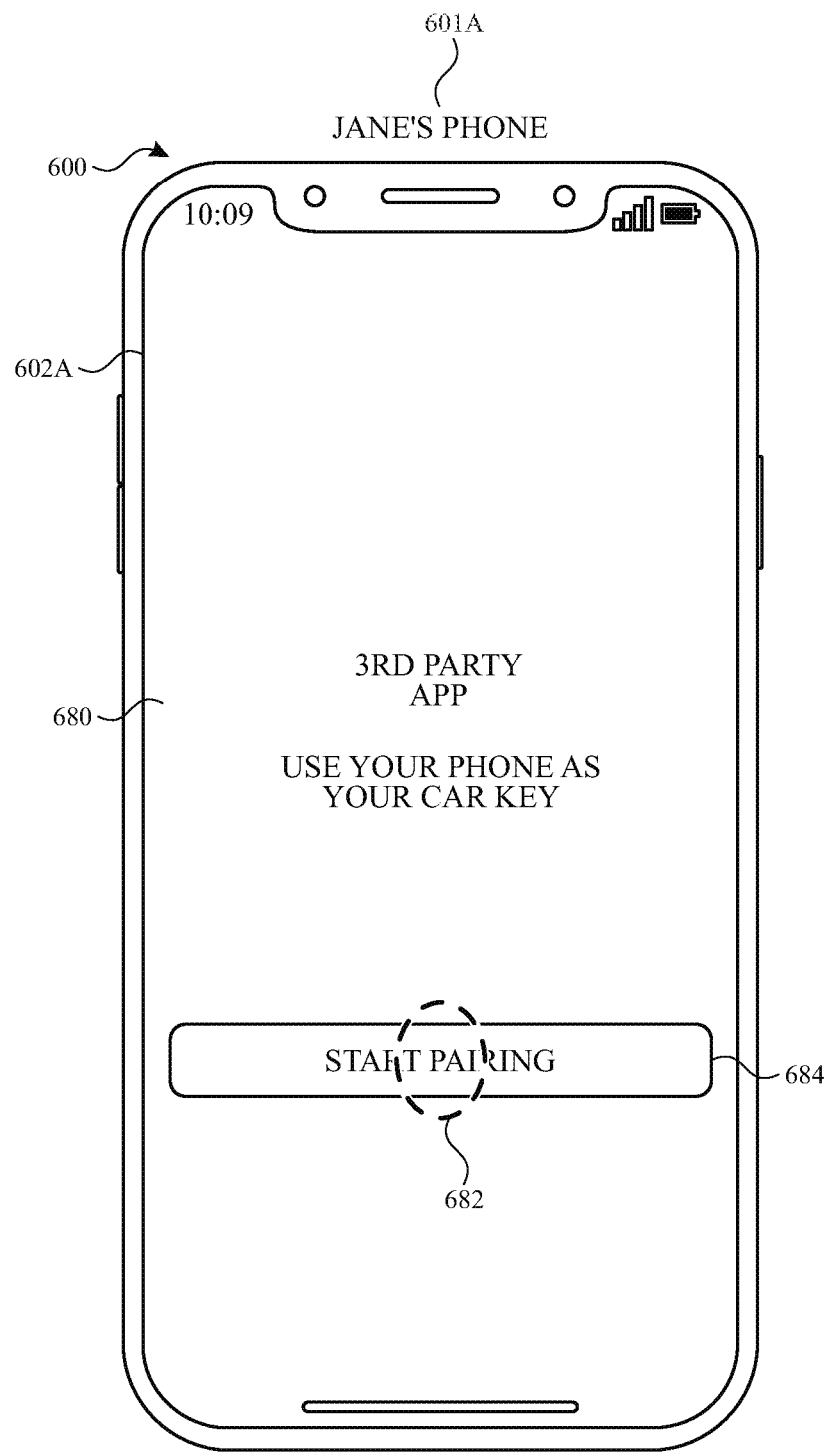

FIG. 6S depicts third party user interface 680 of a third party application, which includes option 684 that, when selected, initiates the process for enrolling the secure credential on electronic device 600. For example, in response to detecting input 682 at a location corresponding to option 684 and in accordance with a determination that information provided by electronic device 600 (e.g., via the third party application) has been successfully authenticated, electronic device 600 initiates the enrollment process (e.g., replaces display of third party user interface 680 with key user interface 626A of FIG. 6E). In some embodiments, the enrollment process proceeds as discussed above (e.g., starting from FIG. 6E).

Figure 6T:
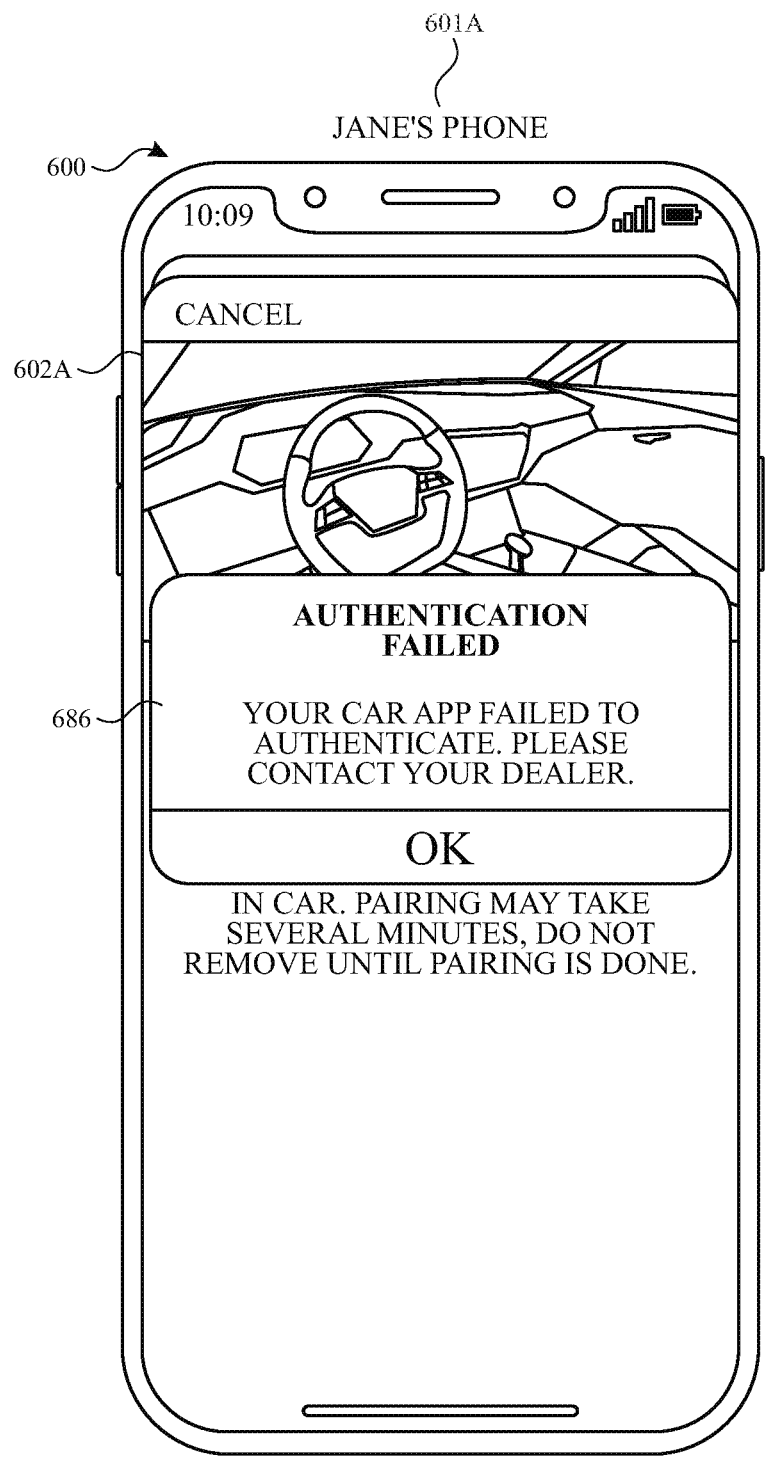

FIG. 6T depicts the result of information provided by electronic device failing to be authenticated. In response to detecting input 682 at a location corresponding to option 684 and in accordance with a determination that information provided by electronic device 600 (e.g., via the third party application) has failed to be authenticated, electronic device 600 forgoes initiating the enrollment process, and replaces display of third party user interface 680 with error user interface 686. Error user interface 686 provides an indication that the enrollment process has failed.

Figure 6U:
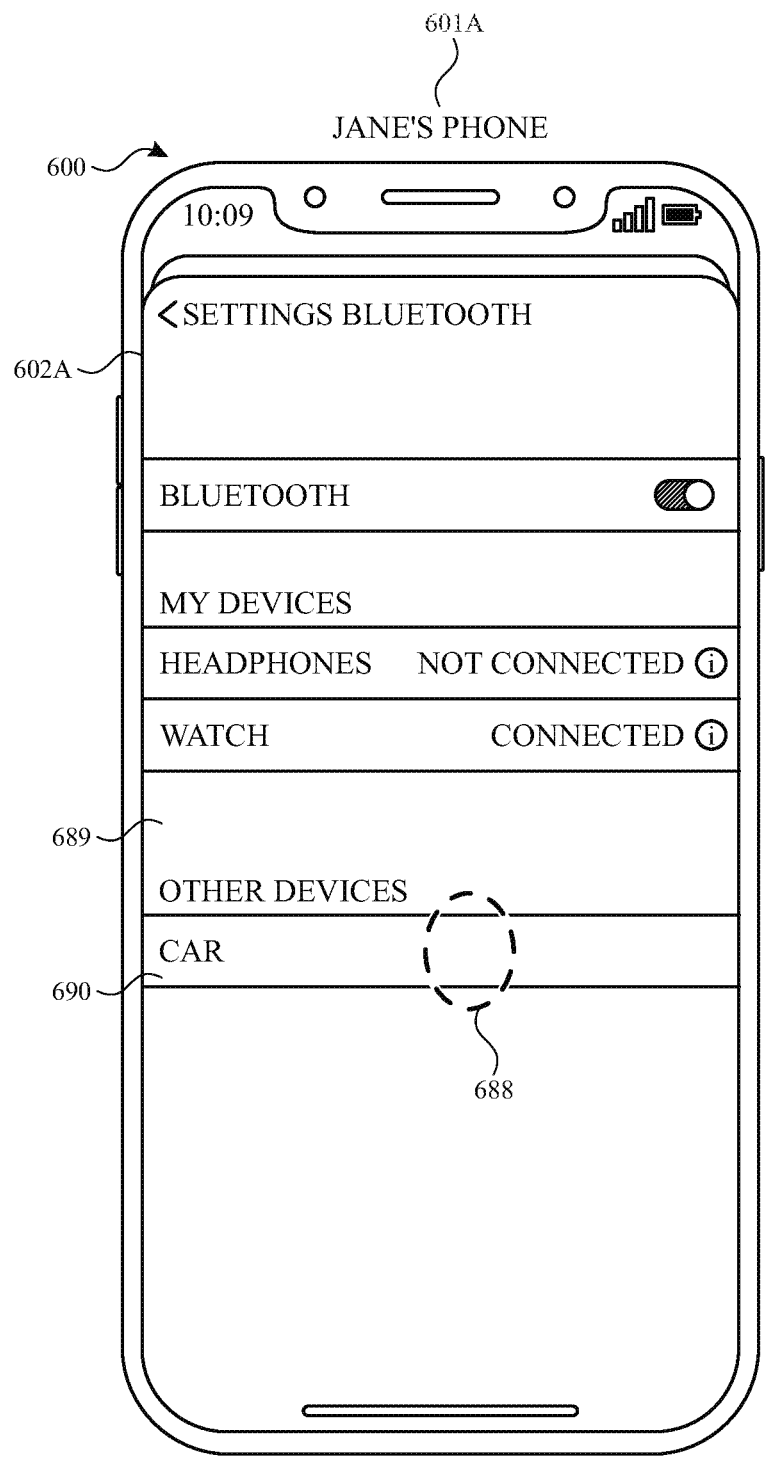
Figure 6V:
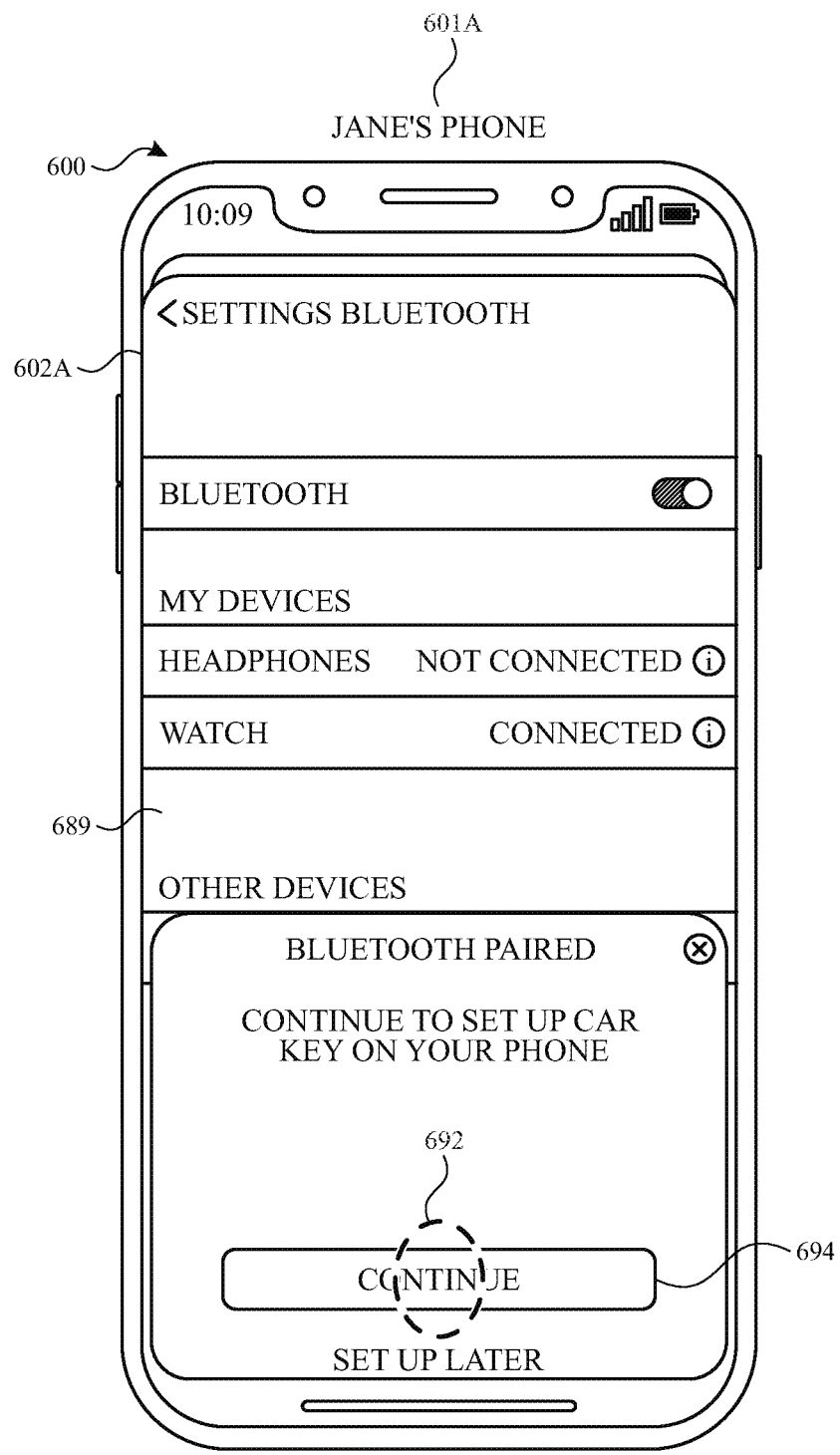

FIGS. 6U-6V depict a technique for establishing a wireless connection between electronic device 600 and the vehicle. In some embodiments, the wireless connection is established using a wireless protocol such as Bluetooth. At FIG. 6U, electronic device 600 detects a tap gesture to add the vehicle as a Bluetooth device. While displaying settings user interface 689, electronic device 600 detects input 688 at option 690.

FIG. 6V depicts the result of detecting input 688. At FIG. 6V, in some embodiments, in response to detecting input 688 and in accordance with a determination that wireless communication between the vehicle and electronic device 600 has been successfully established, electronic device 600 displays option 694 overlaid on settings user interface 689. Electronic device 600 detects a tap gesture to initiate the process for enrolling the secure credential on electronic device 600. Electronic device 600 detects input 692 at a location corresponding to option 694. In response to detecting input 692, electronic device 600 initiates the enrollment process (e.g., displays card 604 of FIG. 6A). In some embodiments, the enrollment process proceeds as discussed above (e.g., starting from FIG. 6A).

FIG. 7 is a flow diagram illustrating a method for enrolling a mobile key (e.g., secure credential) on an electronic device in accordance with some embodiments. Method 700 is performed at a first electronic device (e.g., 100, 300, 500, 600) with a display. Some operations in method 700 are, optionally, combined, the orders of some operations are, optionally, changed, and some operations are, optionally, omitted.

In some embodiments, the first electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for enrolling a mobile key. The method reduces the cognitive burden on a user for enrolling a mobile key, thereby creating a more efficient human-machine interface. For battery-operated computing devices, enabling a user to enroll a mobile key faster and more efficiently conserves power and increases the time between battery charges.

The first electronic device (e.g., 600) detects (702) a request (e.g., a user input (e.g., 608, 682) corresponding to an affordance, device placed in proximity of NFC/ultrawideband reader) to add a first secure credential to the first electronic device, wherein the first secure credential is configured to provide authorization to use one or more functions of a vehicle (e.g., car, truck, motorcycle, etc.). In some embodiments, adding the first secure credential includes storing the first secure credential in a secure element of the first electronic device. In some embodiments, the first secure credential is configured to enable (e.g., start, turn on) a physical vehicle. In some embodiments, the request is triggered by user activation of a displayed selectable user interface object (e.g., 684) in a third-party car manufacturer app. In some embodiments, the request is triggered by the device detecting that it has been placed at or in the vicinity of an NFC/ultra-wideband reader. In some embodiments, the first secure credential is a token or device-specific number corresponding to an account number. In some embodiments, the first secure credential is linked to account information associated with an asset (e.g., vehicle, credit card, debit card, etc.).

In some embodiments, detecting the request to add the first secure credential to the first electronic device (e.g., 600) includes detecting a user input (e.g., 682) corresponding to a selectable user interface object (e.g., 684, affordance) in a user interface (e.g., 680) of an (e.g., third-party, car manufacturer) application different from the electronic wallet application.

In some embodiments, detecting the request to add the first secure credential to the first electronic device (e.g., 600) includes detecting that an external device (e.g., a particular type of device (e.g., NFC/ultra-wideband reader)) is physically near (e.g., in the proximity of) the first electronic device (e.g., 600).

In some embodiments, the first secure credential is configured to unlock (e.g., provide physical access to) the vehicle and start (e.g., turn on, enable, power on) one or more systems of the vehicle.

In response to (704) detecting the request to add the first secure credential to the first electronic device, the first electronic device (e.g., 600) initiates (706) a process for adding the first secure credential to the first electronic device.

In some embodiments, initiating a process for adding the first secure credential to the first electronic device (e.g., 600) includes displaying, on the display (e.g., 602A), a plurality of character entry keys (e.g., 615, keyboard, numpad) for inputting authentication information (e.g., passcode, password). In some embodiments, initiating a process for adding the first secure credential to the first electronic device includes receiving input (e.g., 613), via the plurality of character entry keys, corresponding to authentication information. In some embodiments, initiating a process for adding the first secure credential to the first electronic device includes, in response to receiving the input corresponding to authentication information (e.g., or in response to receiving one or more inputs (e.g., 613, 616)) and in accordance with a determination that the authentication information is valid (e.g., matches a stored code provided by an entity (e.g., dealership, manufacturer) associated with the vehicle), proceeding with the process for adding the first secure credential to the first electronic device (e.g., displaying key user interface 626A). In some embodiments, in accordance with a determination that the authentication information is invalid, the device prompts the user with an error message (e.g., displays error user interface 620A) and does not proceed with the process for adding the first secure credential to the first electronic device.

In some embodiments, initiating the process for adding the first secure credential to the first electronic device (e.g., 600) includes displaying, on the display (e.g., 602A), a first visual indication of a current status (e.g., 605A, 620A, 626A, 628A, 629A, 630A, 636A) of the process for adding the first secure credential to the first electronic device. In some embodiments, initiating the process for adding the first secure credential to the first electronic device includes causing, at a third electronic device (e.g., in-dash display in the vehicle), display of a second visual indication of the current status (e.g., 605B, 620B, 626B, 628B, 629B, 630B, 636B) of the process for adding the first secure credential to the first electronic device, wherein the second visual indication is based on the first visual indication. In some embodiments, a display (e.g., 602B) of the vehicle provides feedback during provisioning of the secure credential to the first electronic device. Displaying, on the display of the first electronic device or the third electronic device, a visual indication of the current status provides the user with feedback as to the status of the process for adding the first secure credential to the first electronic device. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

After completing the process for adding the first secure credential to the first electronic device, the first electronic device (e.g., 600) displays (708), on the display (e.g., 602A), a user interface of an electronic wallet application (e.g., 662) with a representation of the first secure credential (e.g., 666A) and one or more representations of other secure credentials (e.g., 666B-666F) that are not associated with a vehicle manufacturer of the vehicle (e.g., other secure credentials stored on the first electronic device (e.g., stored in a secure element of the first electronic device)). Concurrently displaying the representation of the first secure credential with one or more representations of other secure credentials enables a user to quickly gain access to secure credentials that provide different types of authorizations (e.g., enable vehicle, enable payment, enable physical access to restricted area). Accordingly, concurrent display of the different representations reduces the number of inputs needed for performing operations pertaining to the representations (e.g., accessing additional information about a respective secure credential). Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic wallet application includes a plurality of representations of secure credentials (e.g., 666A-666F). In some embodiments, the plurality of representations of secure credentials includes payment card representations, where a payment card representation corresponds to a secure credential configured to enable a payment transaction. In some embodiments, the electronic wallet application includes a selectable user interface object (e.g., "+" icon in user interface 662) for adding a first secure credential to the first electronic device. In some embodiments, at least one of the other secure credentials is not configured to provide authorization to use one or more functions of the vehicle.

In some embodiments, the one or more representations of other secure credentials (e.g., 666B-666F) includes a representation of a secure credential (e.g., 666E, 666F) that corresponds to a payment account (710) (e.g., credit card, debit card). In some embodiments, the secure credential that corresponds to a payment account is configured to participate in a payment transaction. In some embodiments the first secure credential that is associated with a vehicle manufacturer of the vehicle is not configured to participate in a payment transaction.

In some embodiments, after completing the process for adding the first secure credential to the first electronic device (e.g., and prior to displaying the user interface (e.g., 662) of the electronic wallet application), the first electronic device (e.g., 600) displays, on the display (e.g., 602A), instructions for using the first secure credential (e.g., as depicted in completion user interface 638). In some embodiments, the instructions include pictorial illustrations and/or textual descriptions for how to use the first secure credential. For example, the instructions can provide detail as to how to unlock a vehicle or how to start the vehicle.

In some embodiments, after completing the process for adding the first secure credential to the first electronic device, the first electronic device (e.g., 600) detects a request to use one or more functions (e.g., unlock doors/trunk, start vehicle) of the vehicle. In some embodiments, in response to detecting the request to use one or more functions of the vehicle, the electronic device performs biometric authentication (e.g., as depicted in user interface 678), wherein successful biometric authentication is a requirement for authorizing use of the one or more functions of the vehicle using the first electronic device. In some embodiments, if the first electronic device successfully biometrically authenticates the user, the device provides authorization to use the one or more functions of the vehicle. Alternatively, if the first electronic device fails to biometrically authenticate the user, the device forgoes providing authorization to use the one or more functions of the vehicle. In some embodiments, biometric authentication is required by default upon adding the first secure credential. Forgoing performing the operation when authentication is not successful enhances device security by preventing fraudulent and/or unauthorized access to the device. Improving security measures of the device enhances the operability of the device by preventing unauthorized access to content and operations and, additionally, reduces power usage and improves battery life of the device by enabling the user to use the device more efficiently.

In some embodiments, after completing the process for adding the first secure credential to the first electronic device, the first electronic device (e.g., 600) displays, on the display (e.g., 602A), a selectable user interface object (e.g., affordance) that, when selected, activates (e.g., via input at option 676) a requirement that the first electronic device successfully biometrically authenticates a user to provide authorization to use one or more functions of a vehicle. In some embodiments, biometric authentication is not required by default upon adding the first secure credential. In some embodiments, the first electronic device provides an option (e.g., 676) for toggling whether biometric authentication is required before providing authorization to use one or more functions of a vehicle. In some embodiments, the first electronic device detects a request to use one or more functions (e.g., unlock doors/trunk, start vehicle) of the vehicle. In some embodiments, in response to detecting the request to use one or more functions of the vehicle and in accordance with a determination that the requirement is deactivated, the first electronic device provides authorization to use the one or more functions of the vehicle without requiring successful biometric authentication. In some embodiments, in response to detecting the request to use one or more functions of the vehicle and in accordance with a determination that the requirement is activated, the first electronic device forgoes providing authorization to use the one or more functions of the vehicle (e.g., and checks for the presence of a biometric feature that meets biometric authentication criteria and/or requests authentication such as a passcode or biometric authentication from the user before providing authorization to use the one or more functions of the vehicle).

In some embodiments, after completing the process for adding the first secure credential to the first electronic device, the first electronic device (e.g., 600) displays, on the display (e.g., 602A), a selectable user interface object (e.g., 648A, affordance) for adding a second secure credential to a second electronic device (e.g., 650, e.g., that is operably connected to the first electronic device; e.g., that is associated with a user account that is also associated with the first electronic device), wherein the second secure credential is configured to provide authorization to use one or more functions of the vehicle (e.g., the same vehicle associated with the first secure credential). In some embodiments, in response to detecting a user input (e.g., 646) corresponding to the selectable user interface object for adding the second secure credential, the first electronic device (e.g., 600) initiates a process for adding the second secure credential to the second electronic device (e.g., 650). Automatically providing the option to add the second secure credential to the second electronic device after the process for the first secure credential has been completed provides the user with capability to add the second secure credential without requiring further inputs (beyond the input for initiating the process for adding the second secure credential). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second secure credential is different from the first secure credential. In some embodiments, the second secure credential corresponds to the first secure credential, as both secure credentials are configured to provide authorization to use one or more functions of the same vehicle. In some embodiments, successful biometric authentication is a requirement for adding the second secure credential to the second electronic device. In some embodiments, the first electronic device (e.g., not the second electronic device) performs the biometric authentication. In some embodiments, biometric authentication is not required for adding the second secure credential to the second electronic device.

In some embodiments, a third secure credential is configured to provide authorization to use one or more functions of the vehicle. In some embodiments, the first electronic device (e.g., 600) receives data corresponding to a change in authorization that the third secure credential is configured to provide, wherein the change in authorization corresponds to a change in access to one or more functions of the vehicle (e.g., the same vehicle associated with the first secure credential). In some embodiments, the third secure credential is the first secure credential. In some embodiments, the third secure credential corresponds to a user (e.g., corresponding to 808A) different from the user of the first electronic device. In some embodiments, the first electronic device receives the data from a device (e.g., in-dash system) in the vehicle. In some embodiments, the received data is based on inputs received at a display (e.g., 602B) that is fixed to the vehicle (e.g., in-dash system). In some embodiments, the change in authorization can occur via inputs at the display if a physical fob for the vehicle (e.g., a physical fob that is configured to enable the vehicle) is physically near the vehicle. In some embodiments, the received data indicates that the third secure credential has been revoked, and thus, the third secure credential is no longer configured to provide authorization to use one or more functions of the vehicle. In some embodiments, the received data indicates that the type of access that the third secure credential is configured to provide has changed (e.g., change from unlock and drive to lock and unlock only, or vice-versa). In some embodiments, after receiving the data corresponding to the change in authorization, the first electronic device displays, on the display (e.g., 602A), a visual indication of the change in access to one or more functions of the vehicle. In some embodiments, the visual indication is a textual description of the change in access. For example, the visual indication shows the current state of the access type (e.g., lock and unlock only, unlock and drive, etc.). As another example, the visual indication shows that the third secure credential has been revoked from providing any authorization to use one or more functions of a vehicle.

In some embodiments, the first electronic device (e.g., 600) performs one or more operations (e.g., corresponding to FIGS. 6U-6V) for establishing a wireless connection (e.g., via Bluetooth) between the first electronic device and a fourth electronic device (e.g., in-dash entertainment system in the vehicle). In some embodiments, while performing the one or more operations, the electronic device displays a selectable user interface object (e.g., 694, affordance) for adding a secure credential, wherein user input (e.g., 692) corresponding to the selectable user interface object for adding a secure credential corresponds to (e.g., is) the request to add a first secure credential to the first electronic device. In some embodiments, detecting the request to add the first secure credential to the first electronic device corresponds to selection of the selectable user interface object. In some embodiments, in response to detecting selection of the selectable user interface object, the electronic device prompts the user to place the first electronic device at a NFC/ultra-wideband reader in the vehicle.

In some embodiments, initiating the process for adding the first secure credential to the first electronic device (e.g., 600) includes displaying, on the display (e.g., 602A), a plurality of character entry keys (e.g., 615, keyboard, numpad) for inputting authentication information (e.g., passcode, password). In some embodiments, initiating the process for adding the first secure credential to the first electronic device includes receiving input, via the plurality of character entry keys, corresponding to authentication information. In some embodiments, initiating the process for adding the first secure credential to the first electronic device includes, in accordance with a determination that the authentication information is valid (e.g., matches a stored code provided by an entity (e.g., dealership, manufacturer) associated with the vehicle), proceeding with the process for adding the first secure credential to the first electronic device. In some embodiments, in accordance with a determination that the authentication information is invalid, the device prompts the user with an error message (e.g., displays error user interface 620A) and does not proceed with the process for adding the first secure credential to the first electronic device.

In some embodiments, initiating the process for adding the first secure credential to the first electronic device (e.g., 600) includes displaying, on the display (e.g., 602A), a selectable user interface object (e.g., "GET CAR APP" on FIG. 6A, affordance) for an application associated with the vehicle (e.g., an application provided by a manufacturer of the vehicle). In some embodiments, initiating the process for adding the first secure credential to the first electronic device includes receiving input corresponding to the selectable user interface object for the application associated with the vehicle. In some embodiments, initiating the process for adding the first secure credential to the first electronic device includes, in response to receiving the input corresponding to the selectable user interface object for the application associated with the vehicle, initiating a process for downloading the application associated with the vehicle.

In some embodiments, after completing the process for adding the first secure credential to the first electronic device, the first electronic device (e.g., 600) causes (712), using the first secure credential, the vehicle to unlock (e.g., one or more points of entry (e.g., trunk, door(s)) of the vehicle unlock). In some embodiments, causing the vehicle to unlock includes transmitting the first secure credential to the vehicle.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, settings user interface 672, as discussed above, includes option 676 for toggling activation of express mode. Further, settings user interface 672 includes option 806 for inviting another user to use a secure credential. For brevity, these details are not repeated below.

FIGS. 8A-8AD illustrate exemplary user interfaces on electronic device 600 for inviting a user account to use a secure credential (e.g., mobile key, car key), in accordance with some embodiments. The secure credential is configured to provide authorization to use one or more functions of a vehicle. In some embodiments, the secure credential that the invited user account will use is the same secure credential that was enrolled on electronic device 600 as a result of performing the techniques described above with respect to FIGS. 6A-6I. In some embodiments, the secure credential that the invited user account will use is a different secure credential, but one that is associated with the secure credential that was enrolled on electronic device 600. The user interfaces in these figures are used to illustrate the processes described below, including the processes in FIG. 9.

FIG. 8A depicts electronic device 600, which is a smartphone with display 602A. As described above with respect to FIG. 6A, electronic device 600 is logged into a user account corresponding to Jane Appleseed, as indicated by identifier 601A. It is noted that identifier 601A is not displayed by electronic device 600. Instead, identifier 601A is included in certain figures for ease of explanation with respect to techniques performed by electronic device 600. Display 602A of electronic device 600 includes a touch-sensitive surface on which electronic device 600 can detect user gestures (e.g., tap, swipe, drag). In some embodiments, electronic device 600 includes one or more features of electronic device 100, 300, or 500.

At FIG. 8A, electronic device 600 depicts user interface 662 of a wallet application on electronic device 600 with representations 666A-666F. Representation 666A is a representation of the secure credential that was enrolled on electronic device 600, as discussed above with respect to FIG. 6A-6I. Representations 666B-666f are representations of other secure credentials that do not provide authorization to use one or more functions of the vehicle. For example, representation 666F is a representation of a secure credential corresponding to a payment account. As another example, representation 666B is a representation of a secure credential corresponding to a non-payment account. In particular, representation 666B is configured to provide authorization to access a restricted physical area.

As shown in FIG. 8A, electronic device 600 detects a tap gesture on representation 666A to access additional information about the secure credential corresponding to representation 666A. Electronic device 600 detects input 800 at a location corresponding to representation 666A.

Figure 8B:
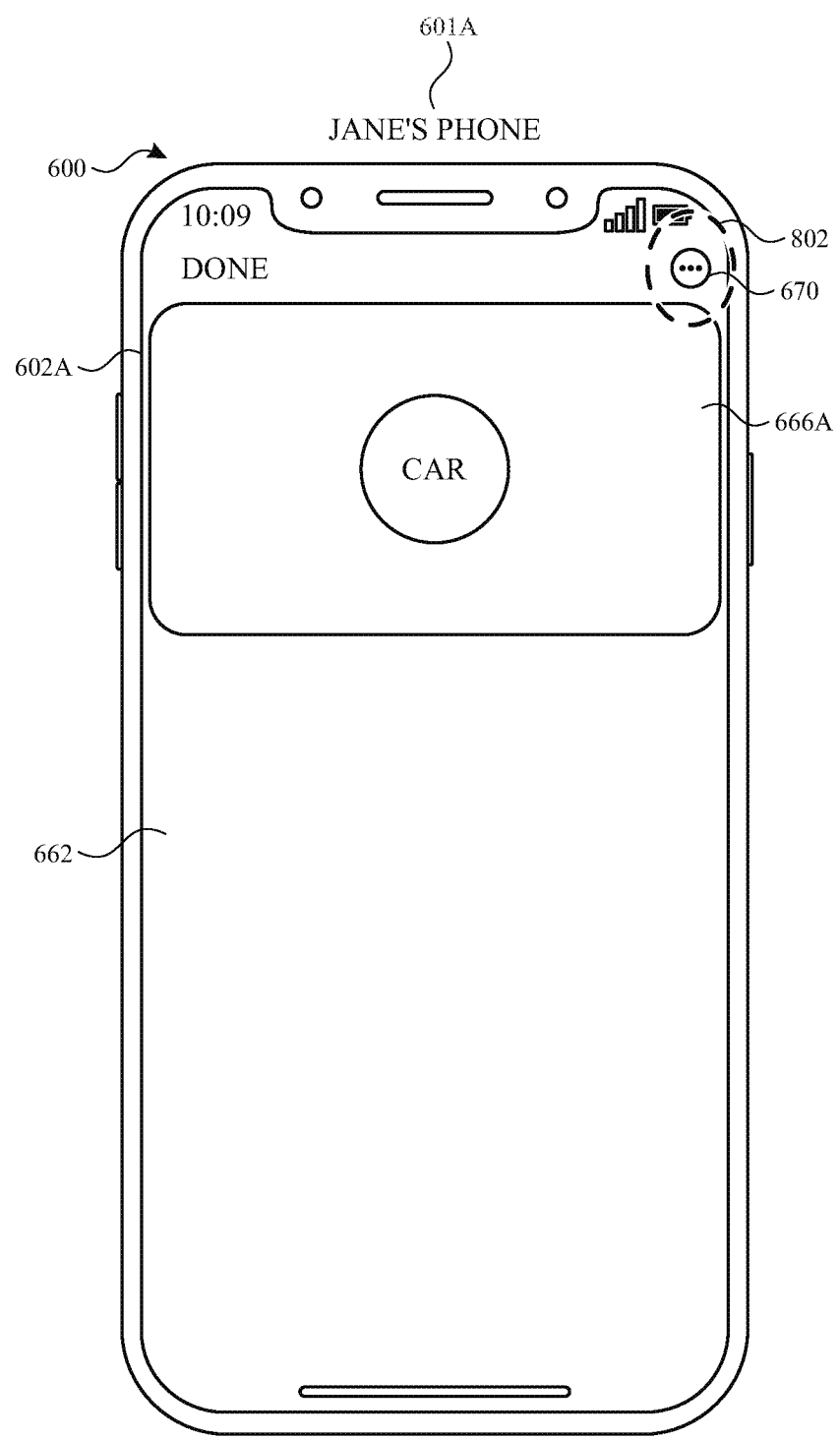

At FIG. 8B, in response to detecting input 800, electronic device 600 displays representation 666A while ceasing to display representations 666B-666F. Electronic device 600 detects a tap gesture at option 670 for displaying additional information about the secure credential. Electronic device 600 detects input 802 at a location corresponding to option 670.

Figure 8C:
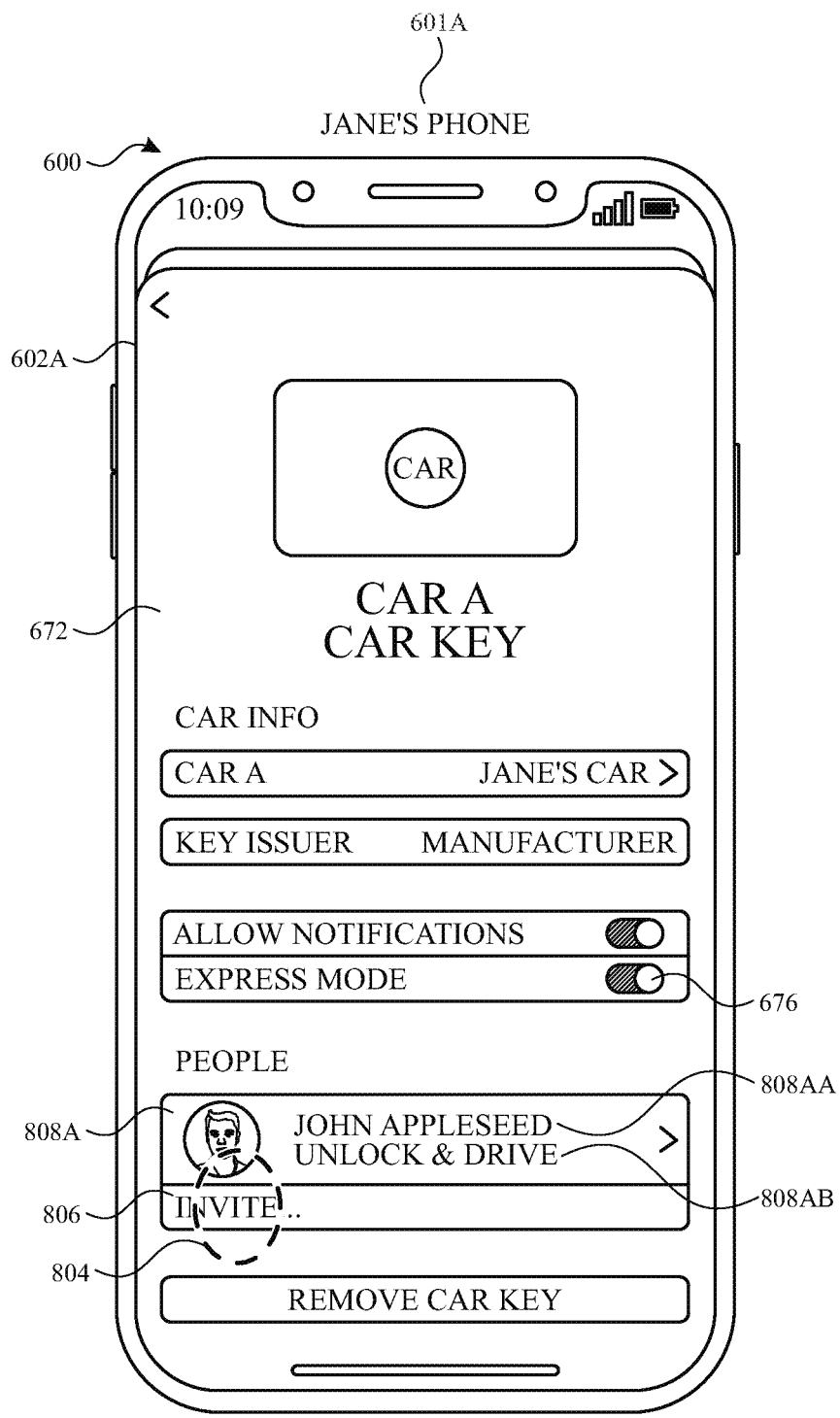

At FIG. 8C, in response to detecting input 802, electronic device 600 replaces display of user interface 662 with settings user interface 672. Settings user interface 672 includes user representation 808A, which represents a second secure credential corresponding to a user account for John Appleseed, as indicated by identifier 808AA. Access status 808AB indicates a status of the access that the second secure credential is authorized to provide. Access status 808AB indicates that the second secure credential has authorization to provide full (e.g., unrestricted) access to the vehicle belonging to Jane Appleseed. For example, the second secure credential is authorized to unlock and drive the vehicle. It is noted that representation 808A is a user interface object that includes identifier 808AA and access status 808AB.

As depicted in FIG. 8C, electronic device 600 detects a tap gesture to invite another user account to use a third secure credential, where the third secure credential is configured to provide authorization to use one or more functions of the vehicle belonging to Jane Appleseed. Electronic device 600 detects input 804 at a location corresponding to option 806.

Figure 8D:
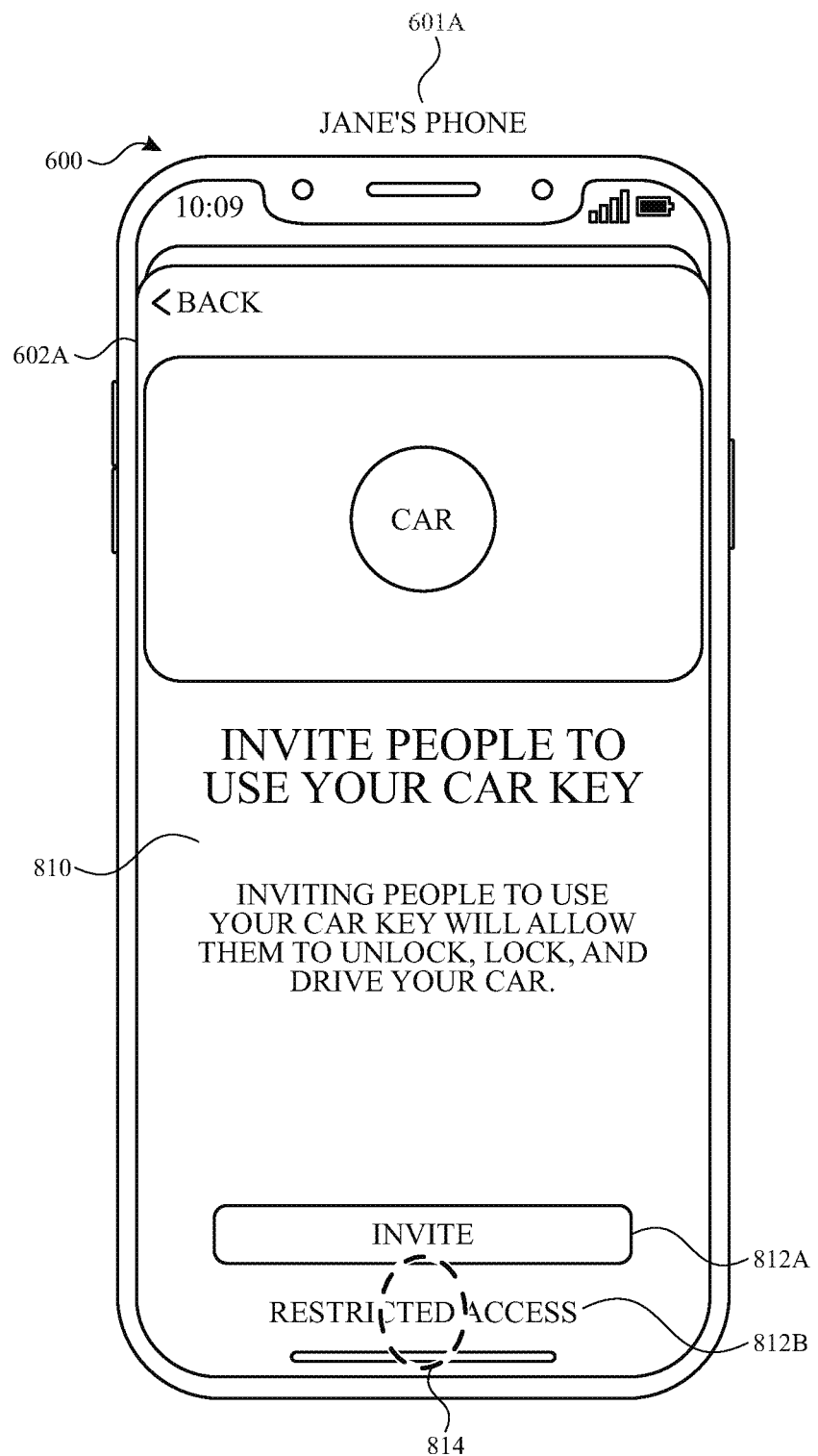

At FIG. 8D, in response to detecting input 804, electronic device 600 replaces display of settings user interface 672 with invite user interface 810, which prompts the user to invite another user to use the third secure credential. Electronic device 600 detects a tap gesture to modify the type of access the third secure credential is configured to authorize. Electronic device 600 detects input 814 at option 812B.

Figure 8E:
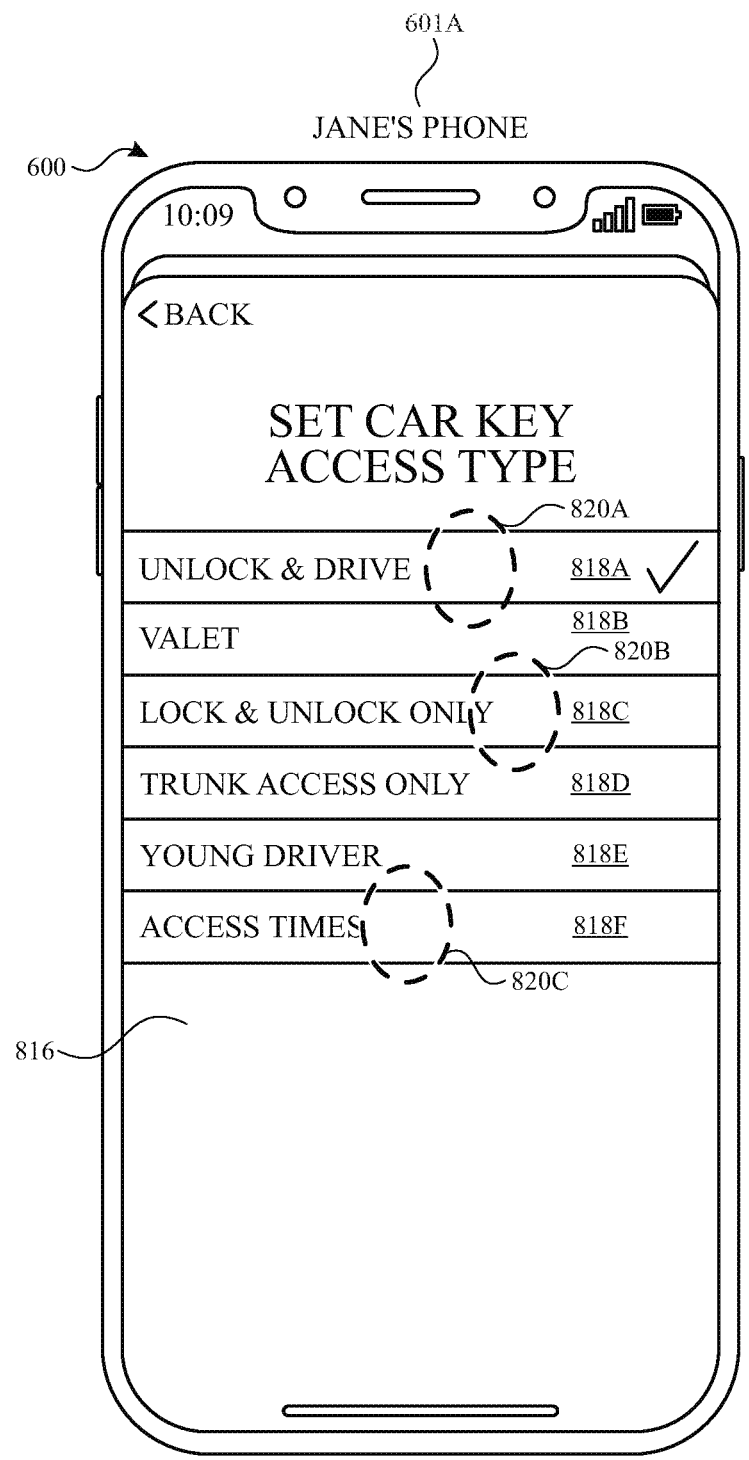

At FIG. 8E, in response to detecting input 814, electronic device 600 replaces display of invite user interface 810 with access user interface 816. Access user interface 816 includes access options 818A-818F. Selecting access option 818A causes the third secure credential to be configured to provide authorization to unlock and drive (e.g., start, enable) the vehicle. Selecting option 818B causes the third secure credential to be configured to provide authorization to certain limited functionality on the vehicle (e.g., limited driving performance, no access to glove compartment/trunk, and the like). Selecting option 818C causes the third secure credential to be configured to provide authorization to lock and unlock the vehicle only (e.g., trunk and cabin). Selecting option 818D causes the third secure credential to be configured to provide authorization to lock and unlock only the trunk of the vehicle. Selecting option 818E causes the third secure credential to be configured to provide authorization to certain limited functionality on the vehicle (e.g., limited driving performance, less aggressive suspension/steering/throttling). Selecting option 818F causes the third secure credential to be configured to provide authorization during a user-configurable period of time.

In some embodiments, certain access options are combinable. For example, access option 818F is selectable in combination with any of the other access options (e.g., 818A-818E). In some embodiments, only one access option is selectable at a time. Thus, in some embodiments, detecting selection of one of access options 818A-818F (e.g., Lock and Unlock Only) results in automatic deselection of the currently selected access option (e.g., Unlock & Drive).

Returning to FIG. 8E, electronic device 600 detects a plurality of tap gestures to modify the type of access the third secure credential is configured to authorize. Electronic device 600 detects inputs 820A-820C.

Figure 8F:
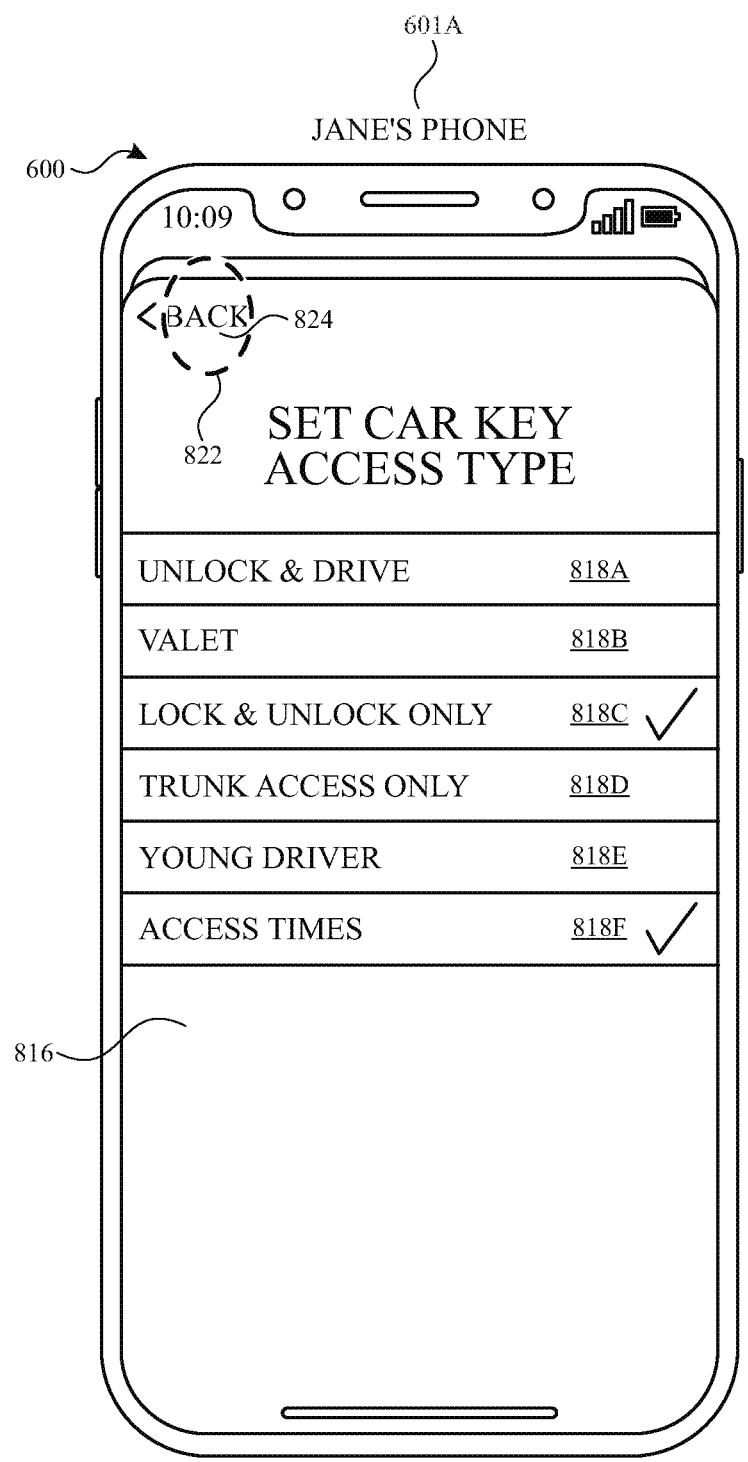

At FIG. 8F, in response to detecting inputs 820A-820C, electronic device 600 deselects Unlock & Drive (e.g., full access) and selects Lock & Unlock Only and Access Times. In some embodiments, in response to detecting input 820C, electronic device 600 displays one or more options for configuring a period of time during which the third secure credential is configured to provide authorization. After configuring the period of time during which the third secure credential is configured to provide authorization to lock and unlock the vehicle, electronic device 600 detects a tap gesture to confirm the user selections and to return to invite user interface 810. Electronic device 600 detects input 822 at option 824.

Figure 8G:
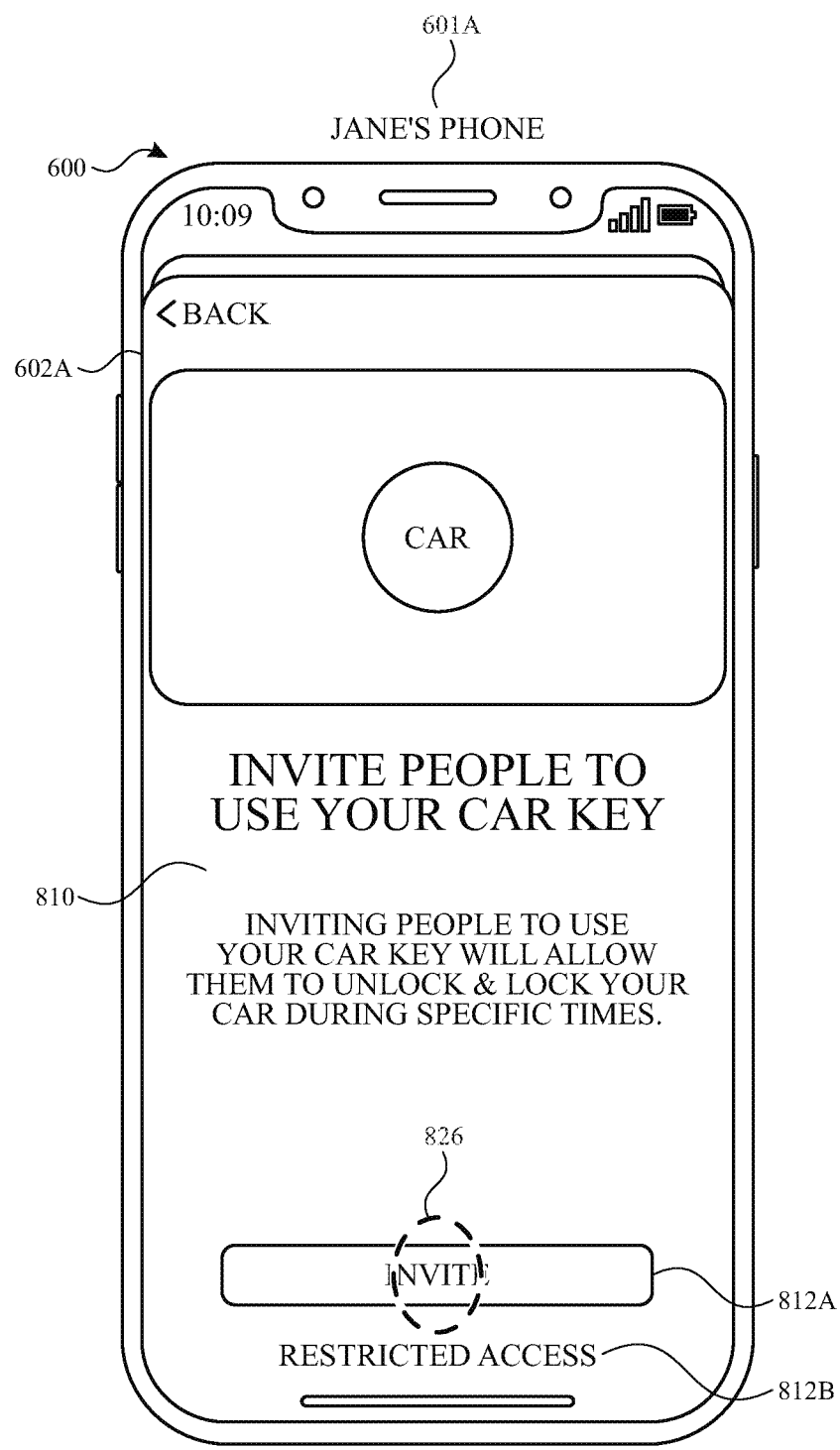

At FIG. 8G, in response to detecting input 822, electronic device 600 replaces display of access user interface 816 with invite user interface 810. Electronic device 600 detects a tap gesture to initiate a process for inviting a user account to use the third secure credential. Electronic device 600 detects input 826 at option 812A.

Figure 8H:
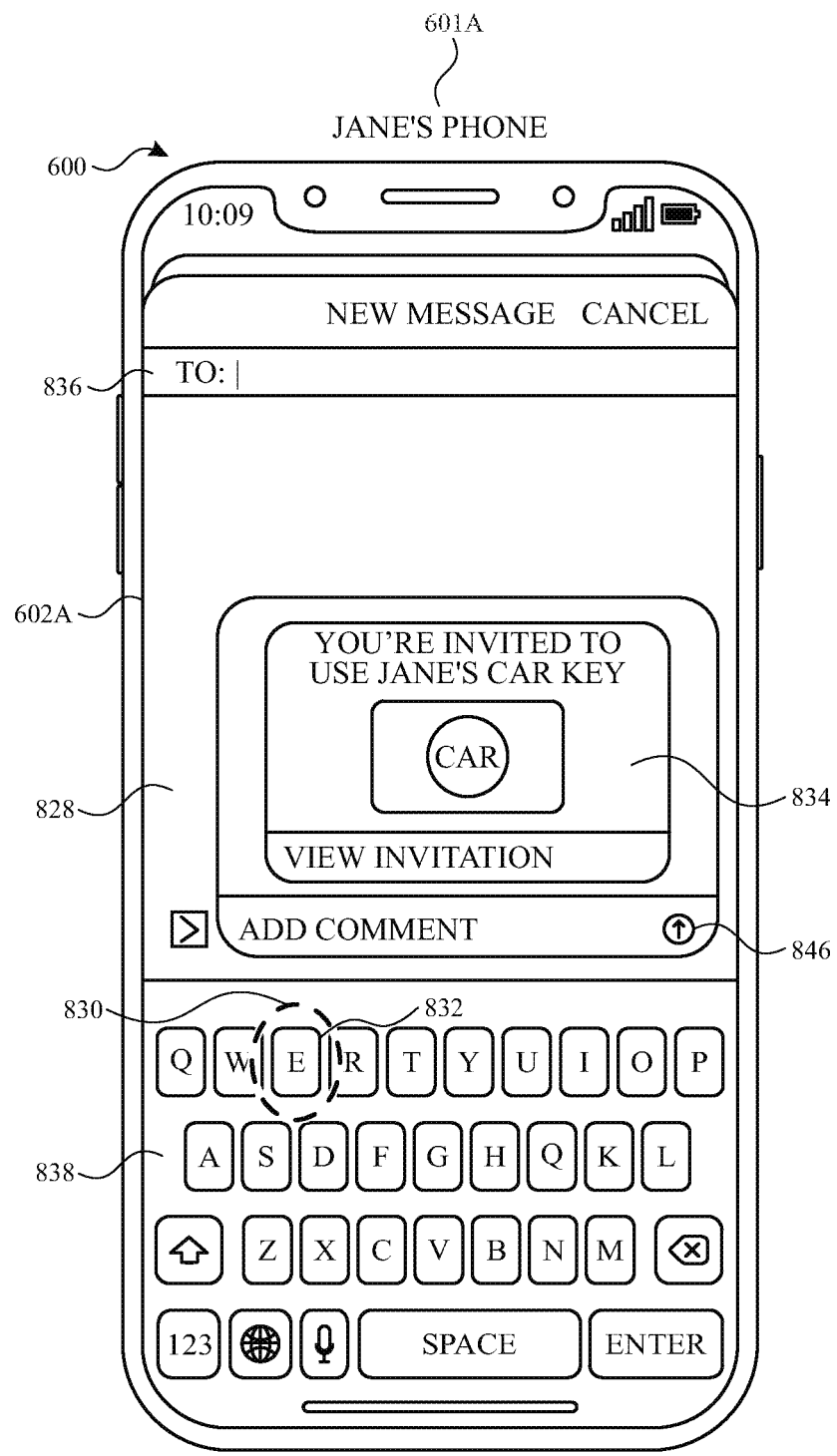

At FIG. 8H, in response to detecting input 826, electronic device 600 displays messages user interface 828 of a messages application. Messages user interface 828 includes to: field 836, where a user can input identifying information corresponding to the user account that is being invited to use the third secure credential. Additionally, messages user interface 828 includes representation 834, which represents the third secure credential that the invited user account can use after the third secure credential has been successfully added to the recipient device. Further, messages user interface 828 includes virtual keyboard 838 with a plurality of character entry keys, including "e" key 832.

As depicted in FIG. 8H, electronic device 600 detects one or more tap gestures on virtual keyboard 838 to input a name corresponding to the user account that is being invited to use the third secure credential. While displaying messages user interface 828, electronic device 600 detects input 830 at a location corresponding to "e" key 832.

Figure 8I:
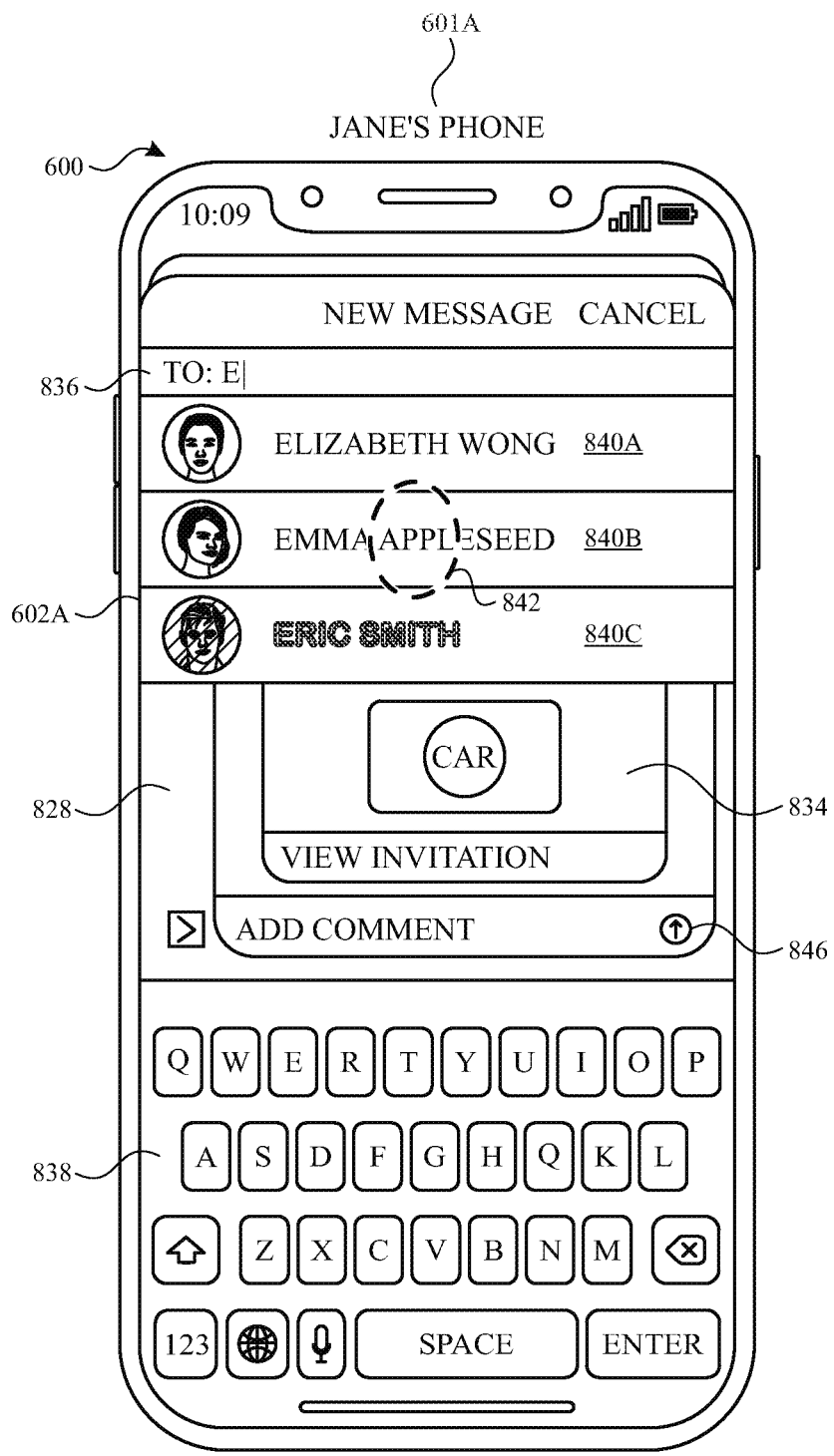

At FIG. 8I, in response to detecting input 830, electronic device 600 displays candidates 840A-840C, which are suggested based on the inputted one or more characters. Since "e" has been inputted, electronic device 600 displays candidates 840A-840C, which correspond to contacts stored on electronic device 600 whose names start with the letter "e". Candidates 840A-840B are associated with devices that are compatible with use of the third secure credential. In contrast, candidate 840C (Eric Smith) is associated with a device that is incompatible with use of the third secure credential. Accordingly, electronic device 600 visually modifies candidate 840C to indicate the incompatibility. Further, electronic device 600 does not allow the user to select candidate 840C. Accordingly, electronic device 600 does not respond to inputs detected at a location corresponding to candidate 840C.

As shown in FIG. 8I, electronic device 600 detects a tap gesture to select candidate 840B. Electronic device 600 detects input 842 at a location corresponding to candidate 840B (Emma Appleseed).

Figure 8J:
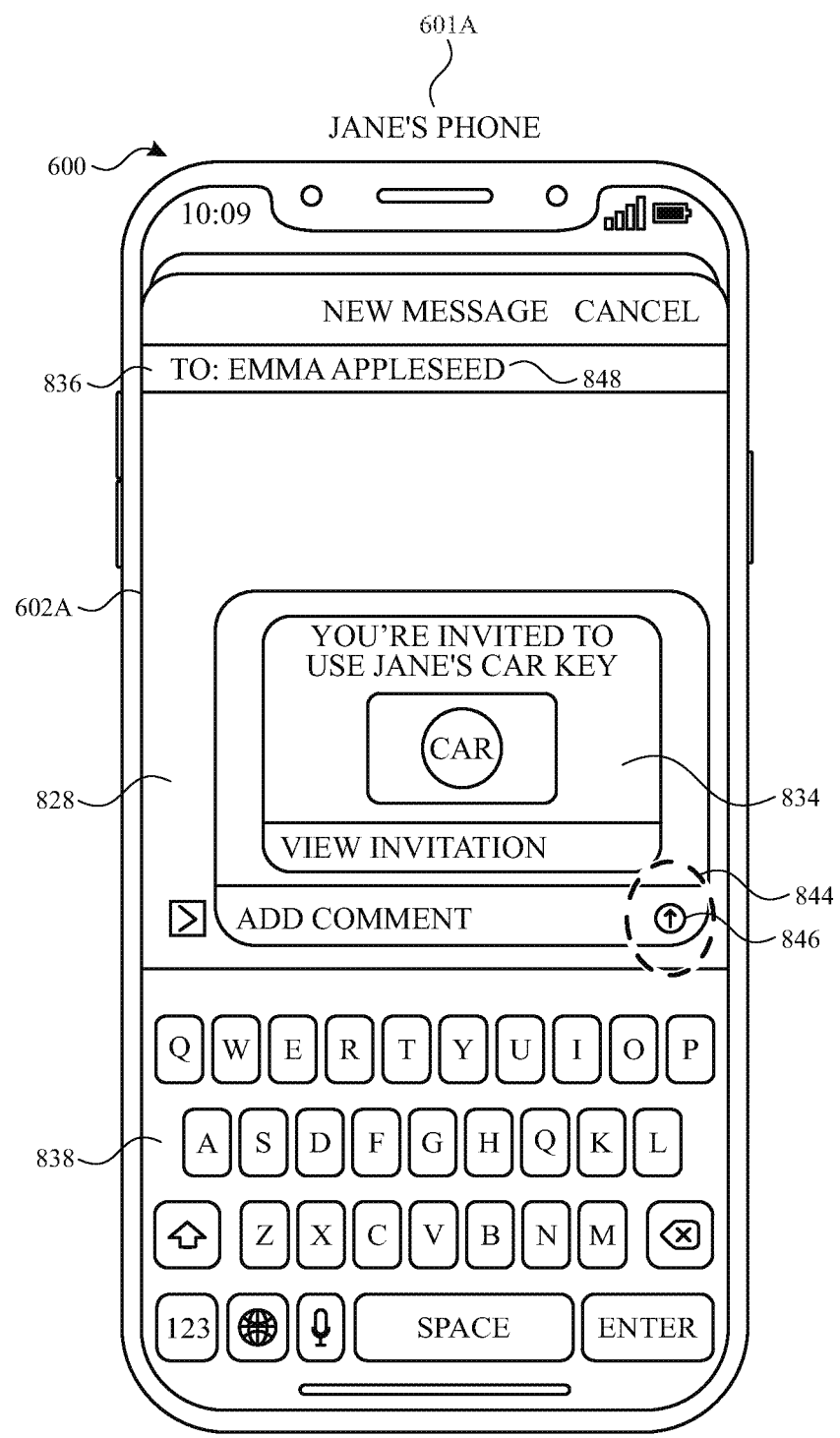

At FIG. 8J, in response to detecting input 842, electronic device 600 displays contact 848 in to: field 836, where contact 848 corresponds to candidate 840B. Electronic device 600 detects a tap gesture to send the invite to contact 848. Electronic device 600 detects input 844 at a location corresponding to option 846.

Figure 8K:
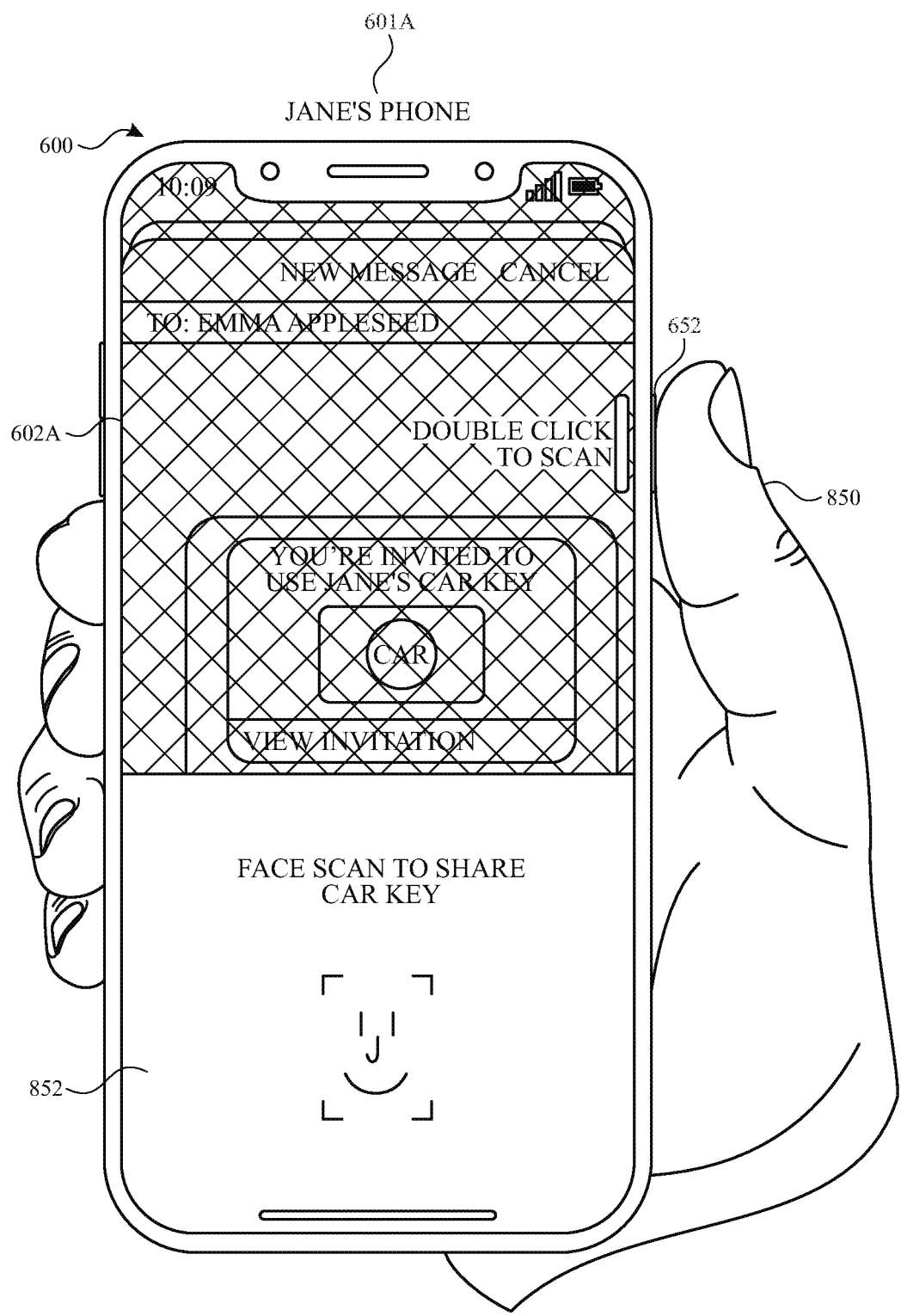

At FIG. 8K, in response to detecting input 844, electronic device 600 replaces display of messages user interface 828 with authentication user interface 852, which prompts the user to perform biometric authentication. Successful authentication of the user is a requirement for sending the invite to use the third secure credential to contact 848. Electronic device 600 detects a double press gesture to initiate biometric authentication. Electronic device 600 detects input 850 at hardware button 652 of electronic device 600. In response to detecting input 850, electronic device 600 attempts to biometrically authenticate the user.

Figure 8L:
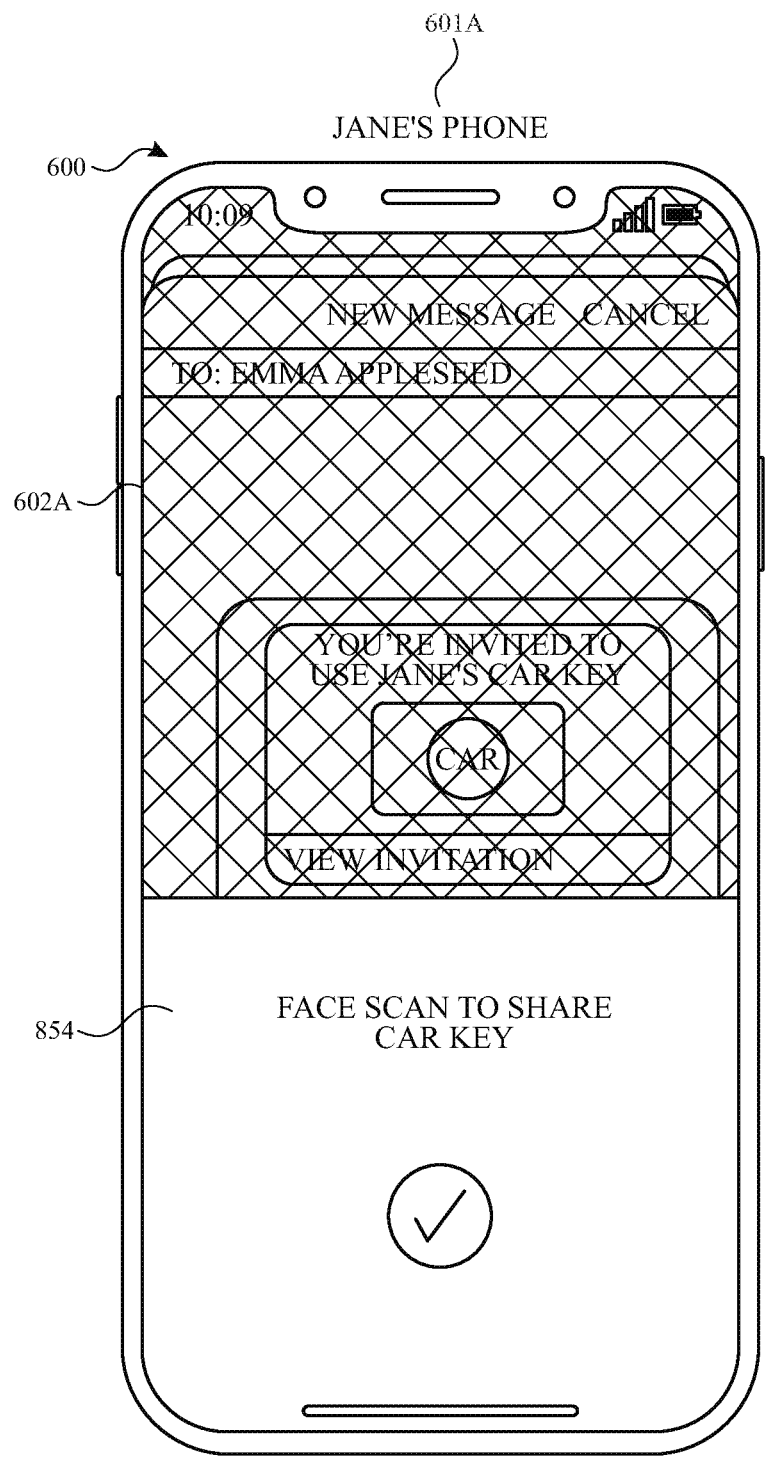

At FIG. 8L, in response to detecting input 850 and in accordance with a determination that biometric authentication is successful, electronic device 600 sends the invite to use the third secure credential to contact 848. Additionally, electronic device 600 replaces authentication user interface 852 with success user interface 854, which indicates that biometric authentication was successful. In some embodiments, in response to detecting input 850 and in accordance with a determination that biometric authentication has failed, electronic device 600 forgoes sending the invite, and provides a visual indication that biometric authentication has failed.

Figure 8M:
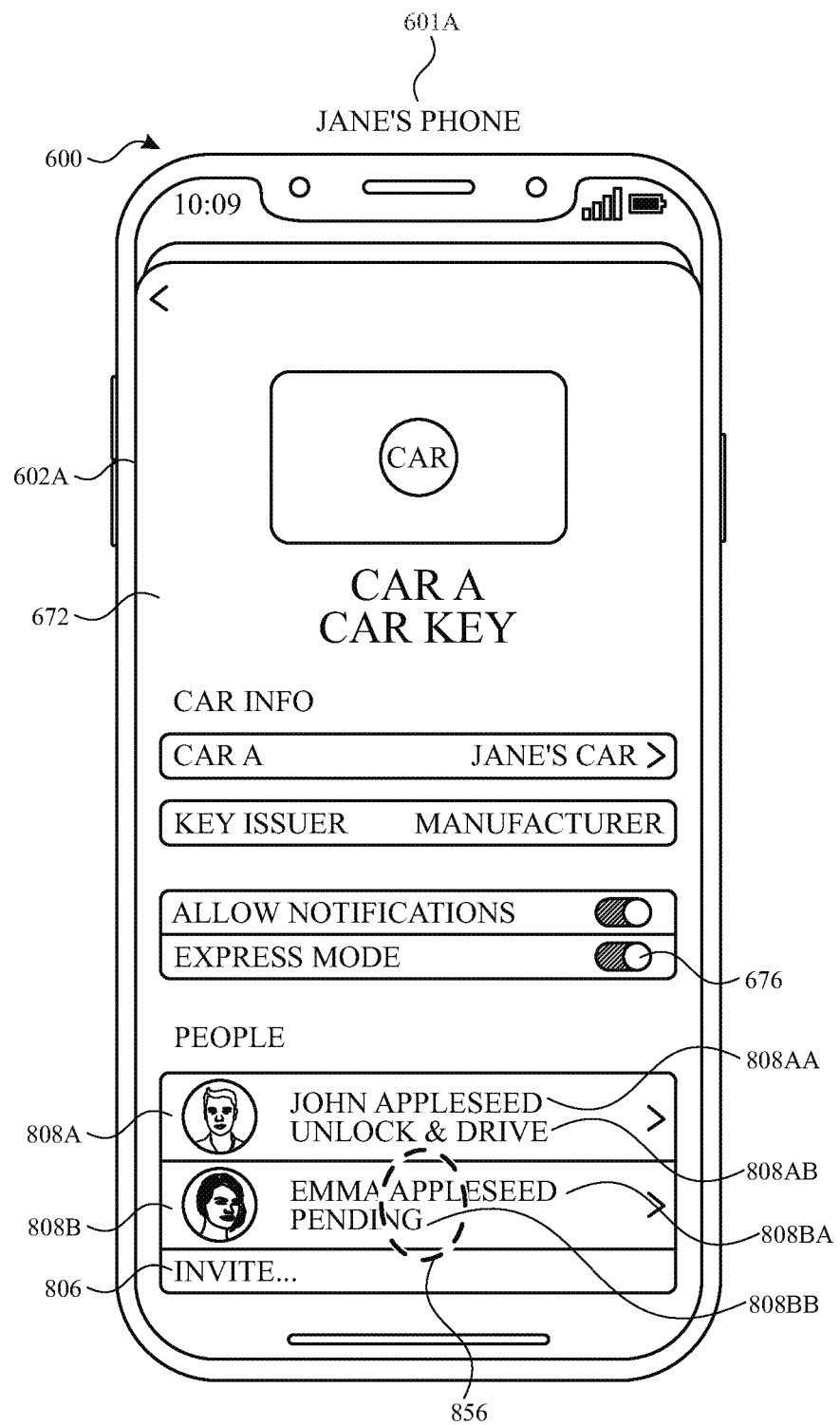

At FIG. 8M, electronic device 600 automatically transitions from success user interface 854 to settings user interface 672. In particular, in response to determining that a predetermined amount of time has elapsed, electronic device 600 replaces display of success user interface 854 with settings user interface 672. As compared to settings user interface 672 in FIG. 8C, electronic device 600 has updated settings user interface 672 to include user representation 808B, which represents the contact (e.g., 848) to which electronic device 600 sent the invitation. Identifier 808BA indicates that the invite was sent to a user account for Emma Appleseed. Access status 808BB indicates a status of the access that the third secure credential is authorized to provide. Access status 808BB indicates that the invitation is pending, as it has yet to be accepted by the recipient. Accordingly, access to the vehicle is pending. It is noted that representation 808B is a user interface object that includes identifier 808BA and access status 808BB.

As shown in FIG. 8M, electronic device 600 detects a tap gesture to modify the type of access the third secure credential is configured to authorize. Electronic device 600 detects input 856 at a location corresponding to user representation 808B.

Figure 8N:
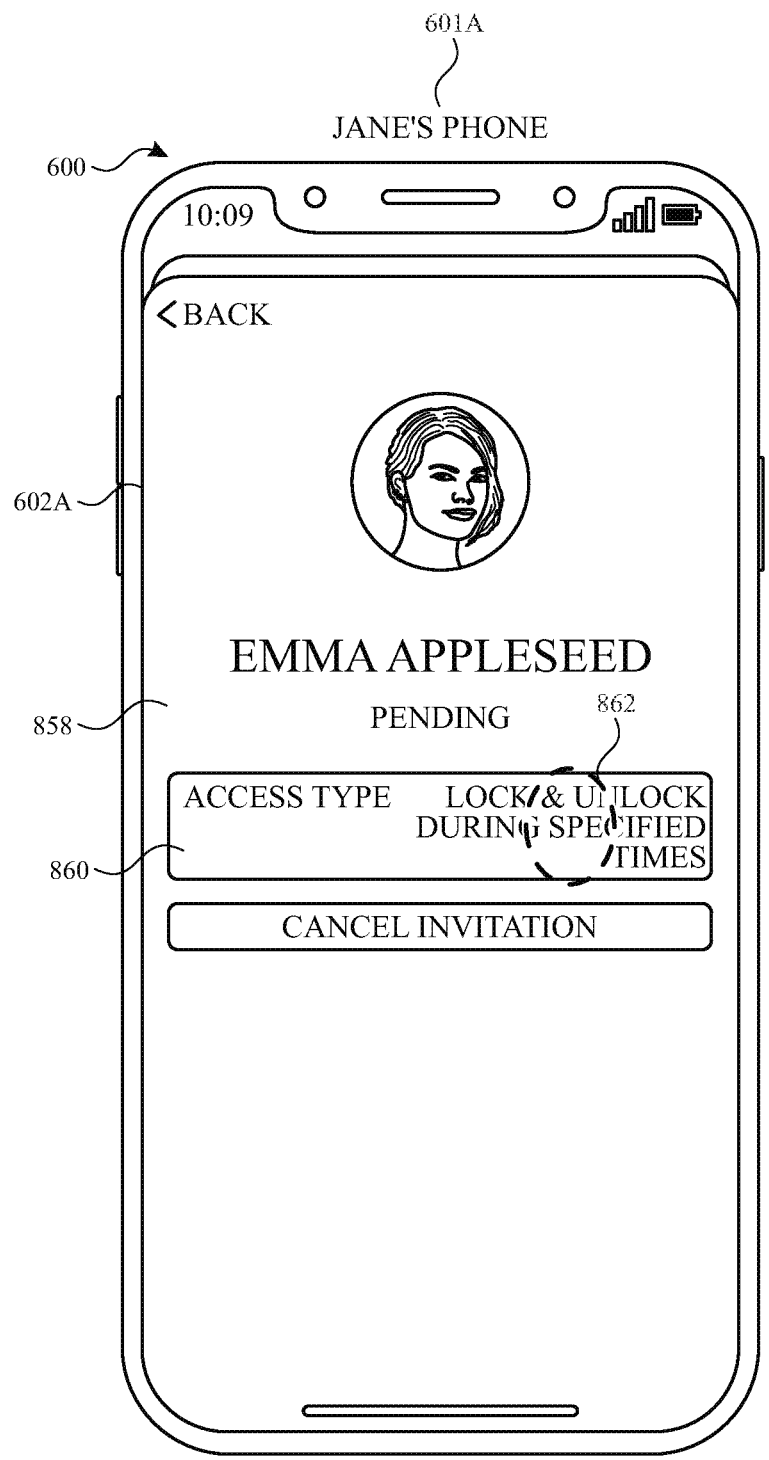

At FIG. 8N, in response to detecting input 856, electronic device 600 replaces display of settings user interface 672 with invitee user interface 858. Invitee user interface 858 includes information about the invitation to use the third secure credential sent to the recipient, Emma Appleseed. For example, invitee user interface 858 includes an indication of the status of the invitation (e.g., pending). Additionally, invitee user interface 858 includes option 860 for changing the type of access the third secure credential is configured to authorize, where option 860 includes a visual indication of the type of access that the third secure credential has been configured to authorize.

As shown in FIG. 8N, electronic device 600 detects a tap gesture to initiate a process for changing the type of access while the invitation is pending. Electronic device 600 detects input 862 at a location corresponding to option 860.

Figure 8O:
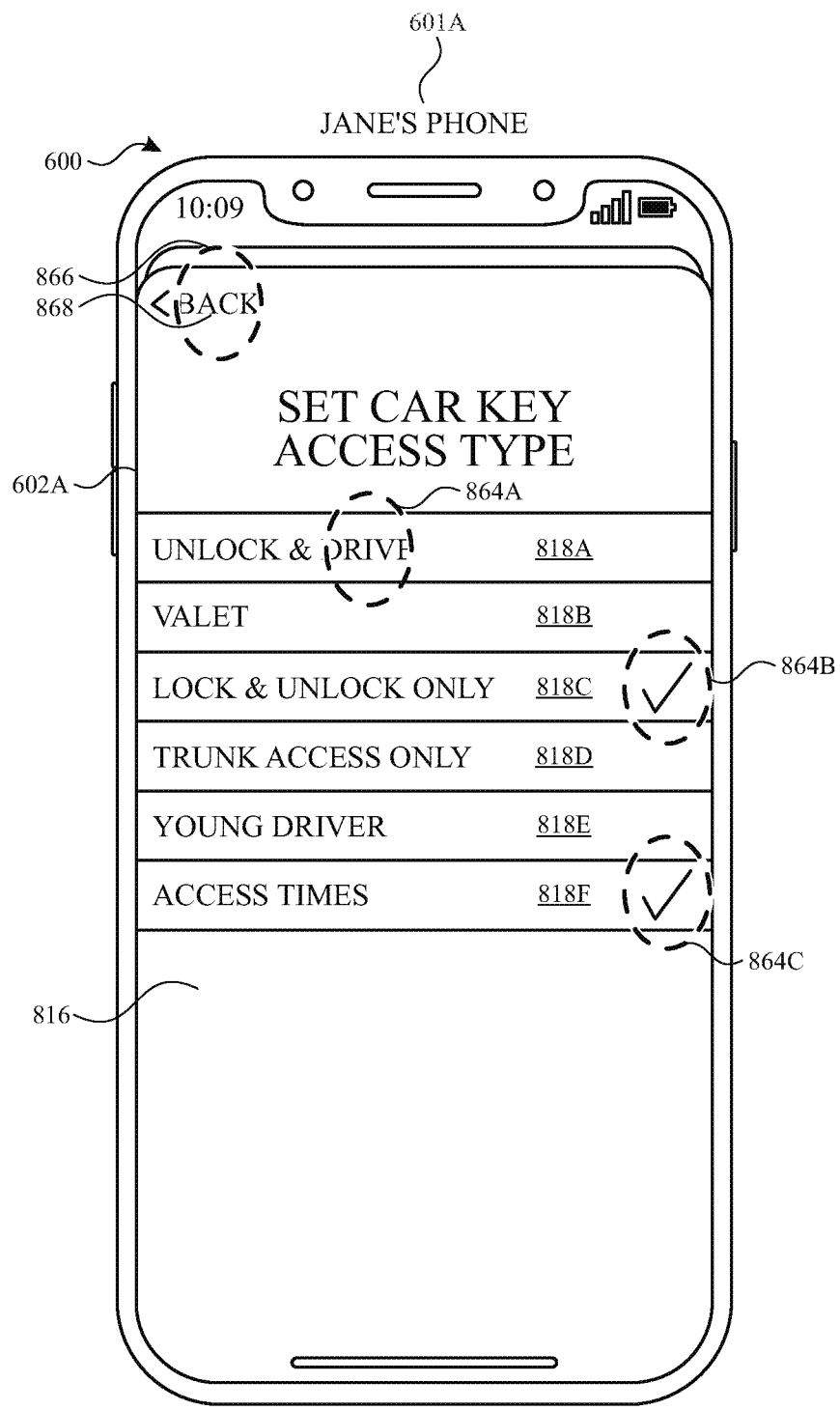

At FIG. 8O, in response to detecting input 862, electronic device 600 replaces display of invitee user interface 858 with access user interface 816. Access user interface 816 includes access options 818A-818F. Electronic device 600 detects a plurality of tap gestures to modify the type of access the third secure credential is configured to authorize. Electronic device 600 detects inputs 864A-864C.

In response to detecting inputs 864A-864C, electronic device 600 deselects Lock & Unlock Only and Access Times, and selects Unlock & Drive. Accordingly, access user interface 816 includes an indication that Unlock & Drive has been selected (e.g., as shown in FIG. 8E). Once the desired selections have been made, electronic device 600 detects a tap gesture to confirm the user selections and to return to invitee user interface 858. Electronic device 600 detects input 866 at option 868.

Figure 8P:
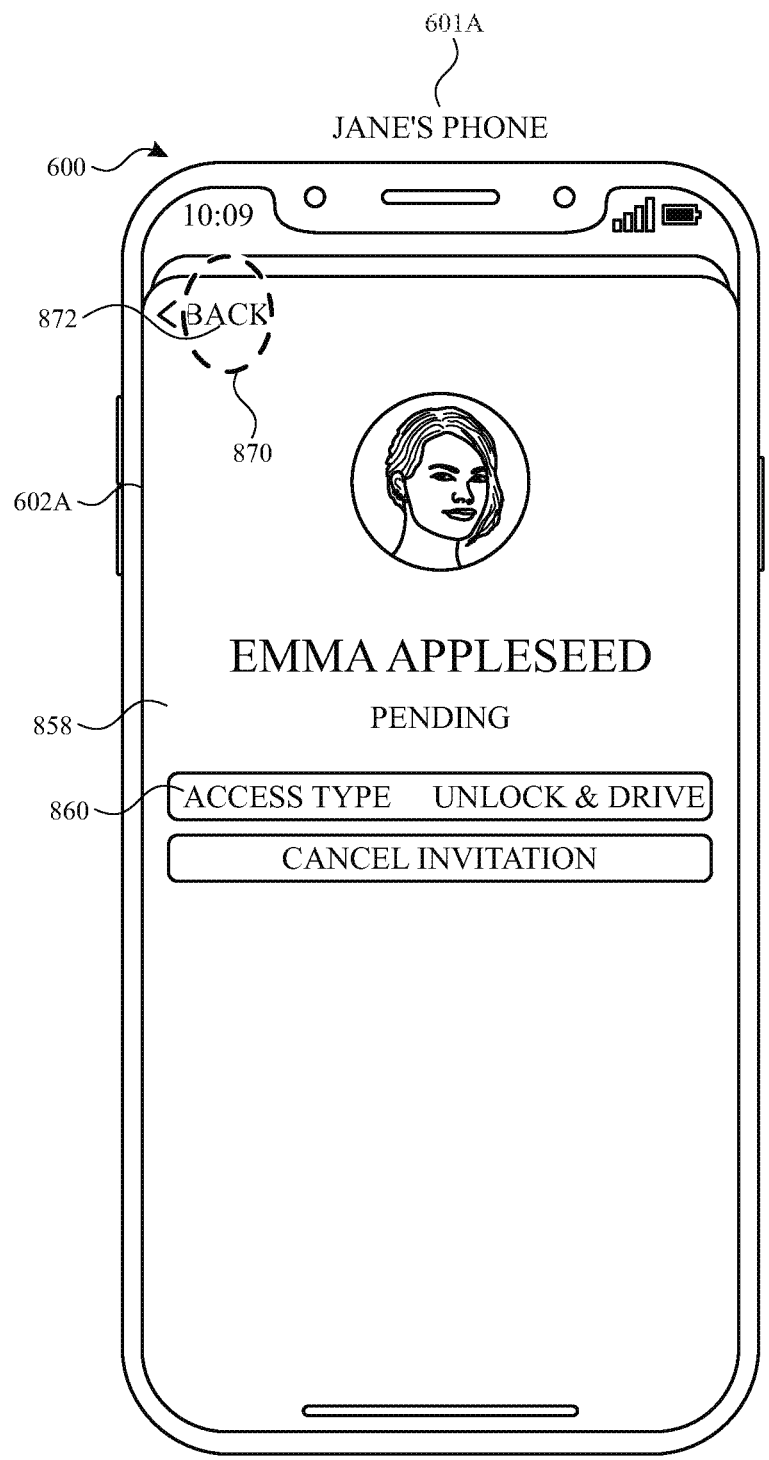

At FIG. 8P, in response to detecting input 866, electronic device 600 replaces display of access user interface 816 with invitee user interface 858, where option 860 has been updated to reflect the selections made at access user interface 816. For example, option 860 indicates that the access type is now Unlock & Drive. Electronic device 600 detects a tap gesture to return to settings user interface 672. Electronic device 600 detects input 870 at option 872.

Figure 8Q:
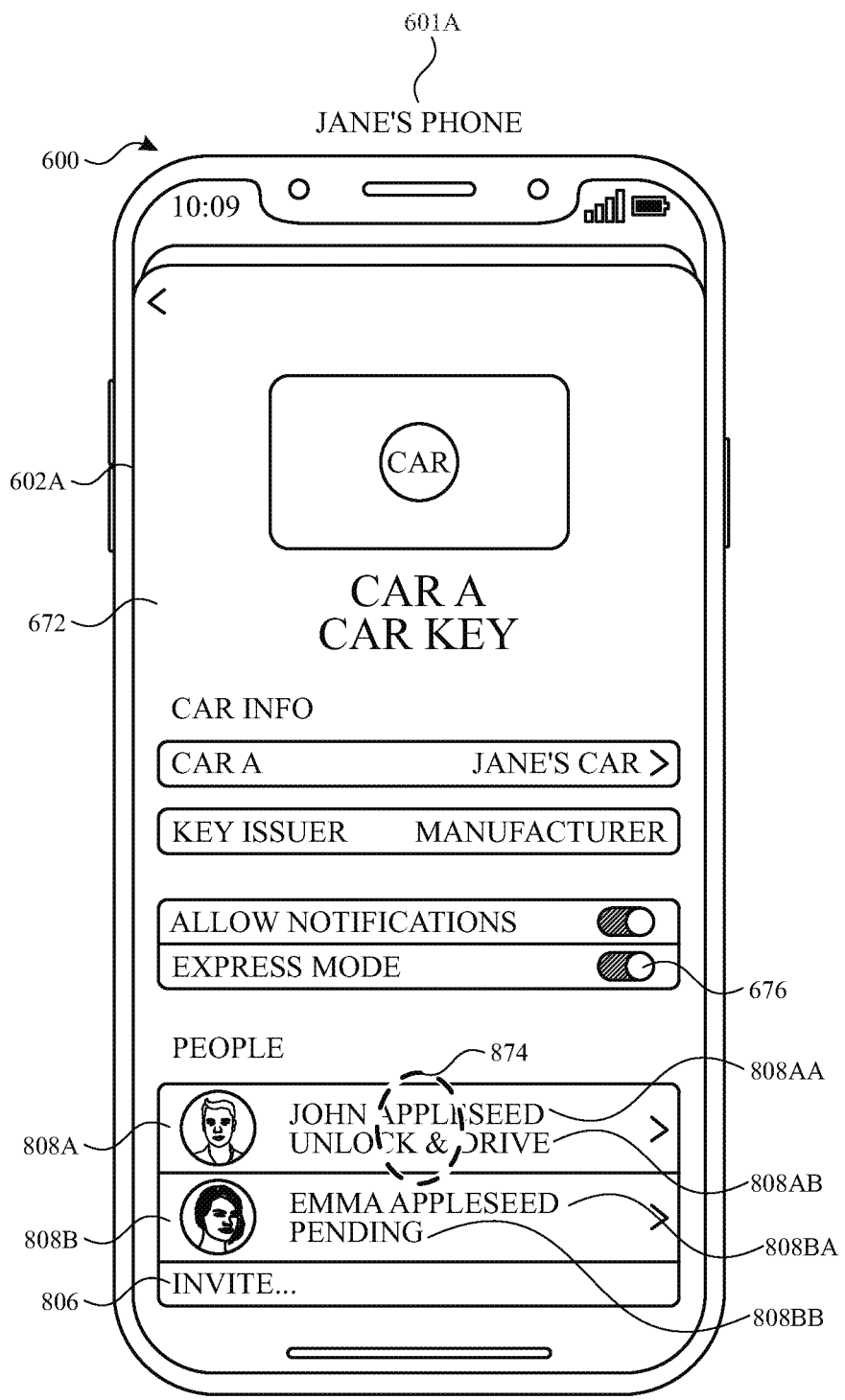

At FIG. 8Q, in response to detecting input 870, electronic device 600 replaces display of invitee user interface 858 with settings user interface 672. Electronic device 600 detects a tap gesture to access information about the second third secure credential used by a user account for John Appleseed. Electronic device 600 detects input 874 at a location corresponding to user representation 808A. It is noted that access status 808BB continues to indicate that the invitation is pending, as it has yet to be accepted by the recipient. In some embodiments, in accordance with a determination that the invitation has not been accepted and a predetermined amount of time has elapsed (e.g., 1, 3, or 7 days) since the invitation was sent, electronic device 600 updates access status 808BB to indicate that the invitation has expired. In some embodiments, if the invitation has expired, the recipient of the invitation is no longer able to accept the invitation.

Figure 8R:
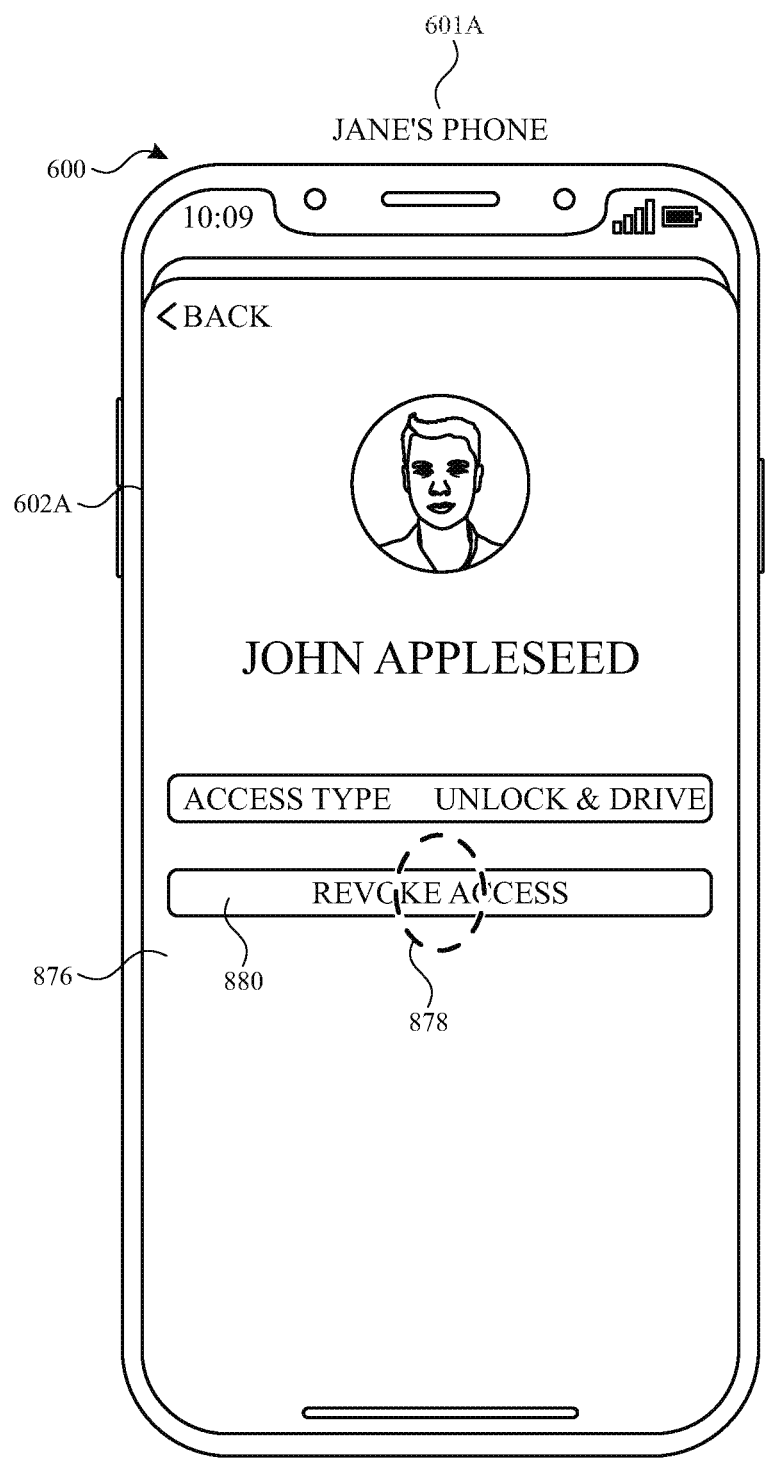

At FIG. 8R, in response to detecting input 874, electronic device 600 replaces display of settings user interface 672 with invitee user interface 876. Invitee user interface 876 includes information about the second secure credential used by a user account for John Appleseed. For example, invitee user interface 876 includes an indication of the type of access (e.g., Unlock & Drive) the second secure credential is configured to authorize. Additionally, invitee user interface 876 includes option 880 for revoking the second secure credential. Electronic device 600 detects a tap gesture to revoke the second secure credential. Electronic device 600 detects input 878 at a location corresponding to option 880.

Figure 8S:
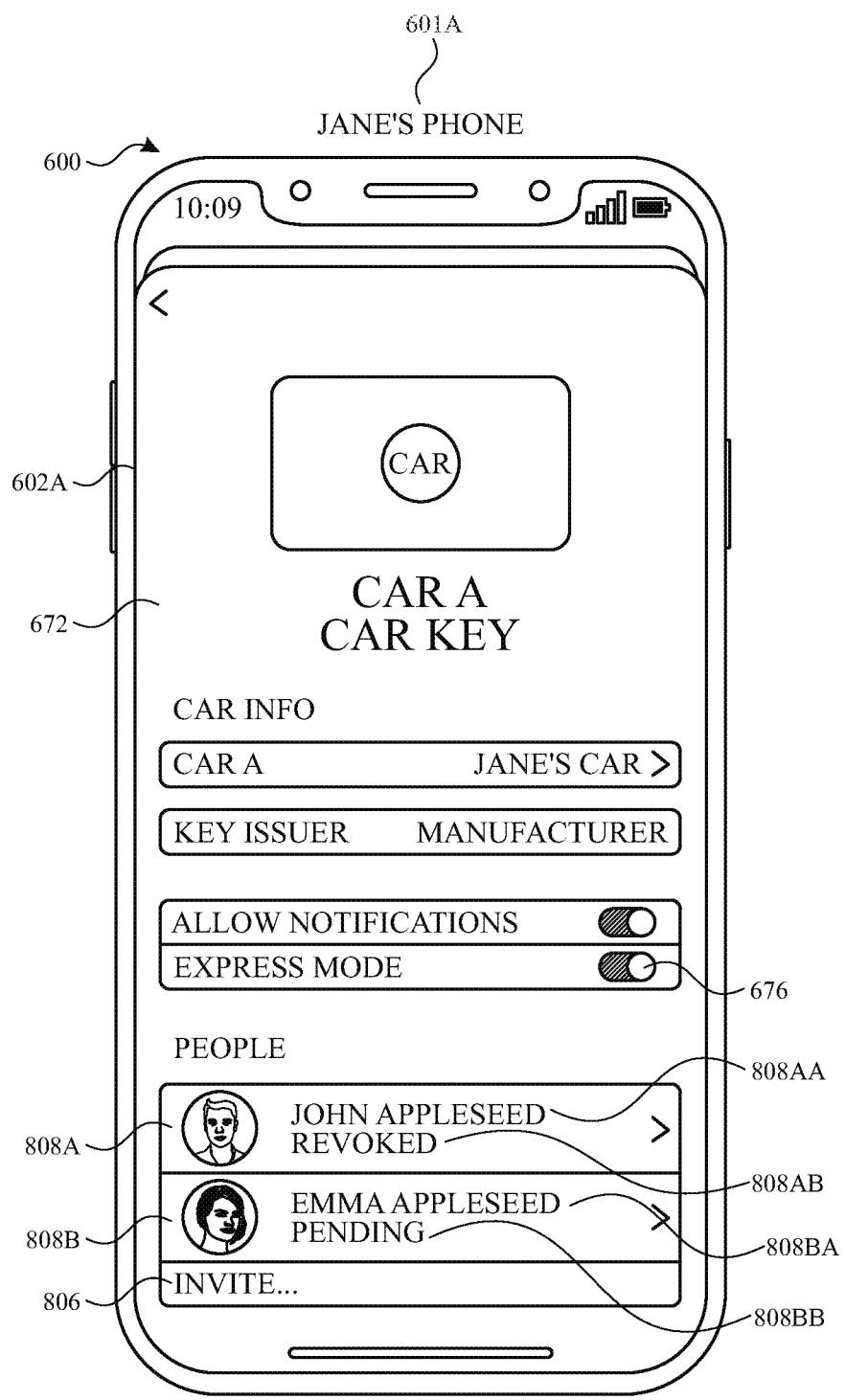

At FIG. 8S, the user has navigated to settings user interface 672 after revoking the second secure credential. After the second secure credential has been revoked, electronic device 600 replaces invitee user interface 876 with settings user interface 672. Additionally, electronic device 600 has updated access status 808AB to indicate that the second secure credential used by a user account for John Appleseed has been revoked. Accordingly, John Appleseed is no longer able to use the second secure credential to access one or more functions of the vehicle belonging to Jane Appleseed. In some embodiments, the second secure credential is revoked immediately in response to electronic device 600 detecting input 878. In some embodiments, the second secure credential is revoked after a predetermined amount of time (e.g., 1, 3, or 7 days) has elapsed after the detection of input 878.

Figure 8T:
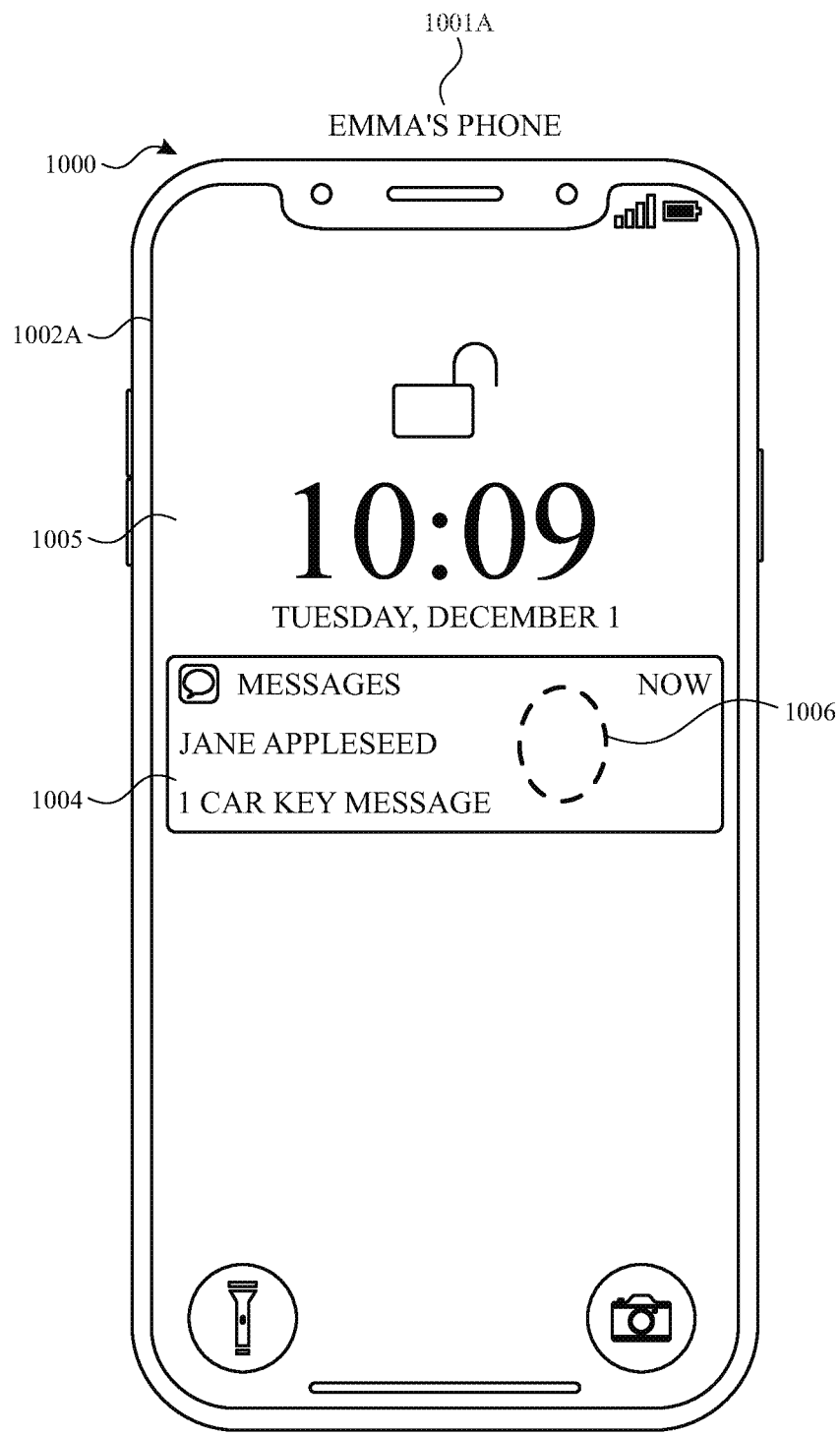

As shown in FIG. 8S, access status 808BB continues to indicate that the invitation for Emma Appleseed is pending, as it has yet to be accepted. Turning to FIGS. 8T-8AD, techniques are described with respect to accepting the invitation at one or more devices belonging to the recipient of the invitation, Emma Appleseed.

FIG. 8T depicts electronic device 1000, which is a smartphone with display 1002A. Electronic device 1000 is logged into a user account corresponding to Emma Appleseed, as indicated by identifier 1001A. It is noted that identifier 1001A is not displayed by electronic device 1000. Instead, identifier 1001A is included in certain figures for ease of explanation with respect to techniques performed by electronic device 1000. Display 1002A of electronic device 1000 includes a touch-sensitive surface on which electronic device 1000 can detect user gestures (e.g., tap, swipe, drag).

In some embodiments, electronic device 1000 includes one or more features of electronic device 100, 300, or 500.

At FIG. 8T, a user of electronic device 1000 performs a tap gesture to open a message from Jane Appleseed, where the message includes an invitation to use the third secure credential on electronic device 1000. Accepting the invitation results in the third secure credential being added to a secure element of electronic device 1000. The third secure credential is configured to provide authorization to use one or more functions of the vehicle belonging to Jane Appleseed. Electronic device 1000 detects input 1006 at a location corresponding to notification 1004 on cover sheet 1005.

Figure 8U:
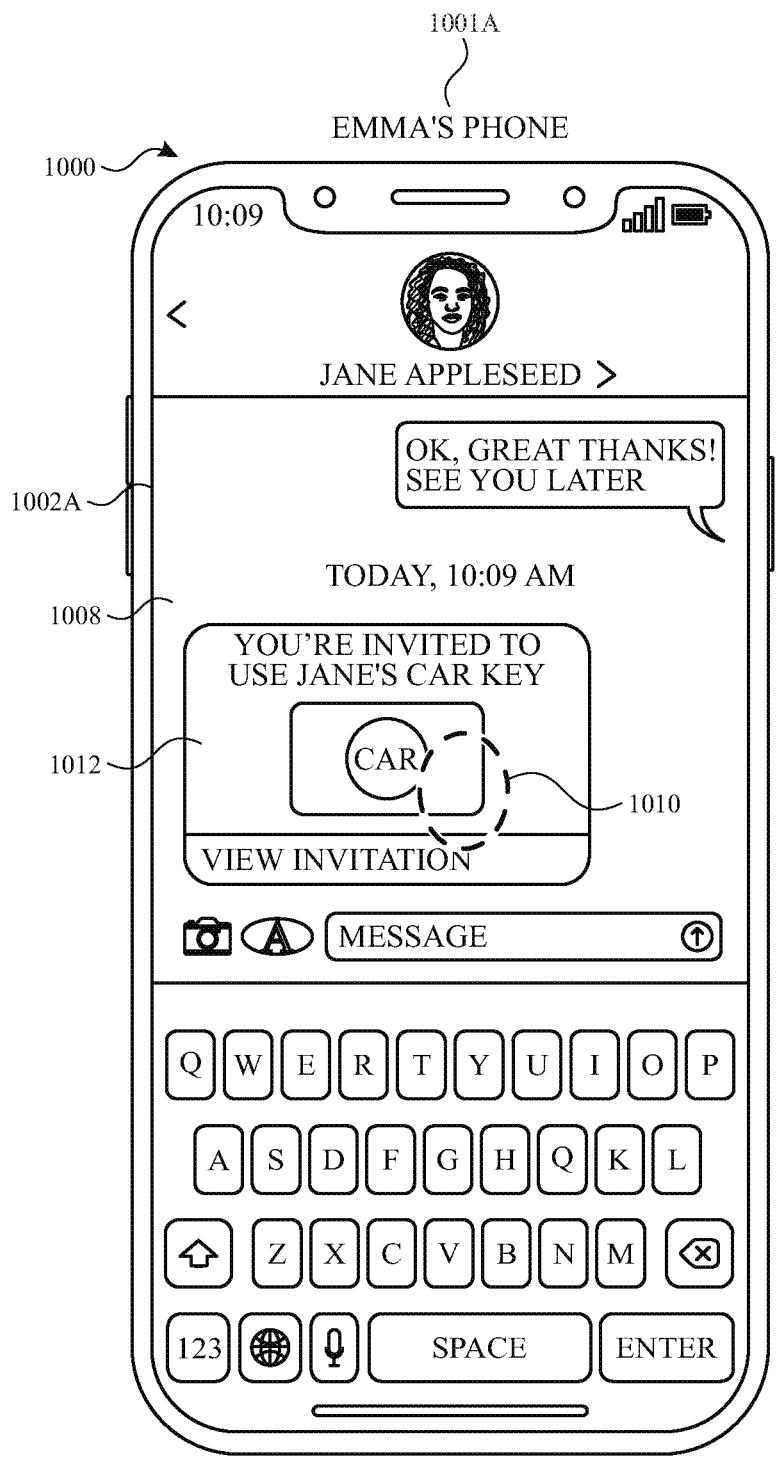

At FIG. 8U, in response to detecting input 1006, electronic device 1000 launches a messages application, and replaces display of cover sheet 1005 with messages user interface 1008. Messages user interface 1008 includes representation 1012, which represents the invitation to use the third secure credential that was sent by Jane Appleseed.

As shown in FIG. 8U, electronic device 600 detects a tap gesture to open the invitation. While displaying messages user interface 1008, electronic device 1000 detects input 1010 at representation 1012.

Figure 8V:
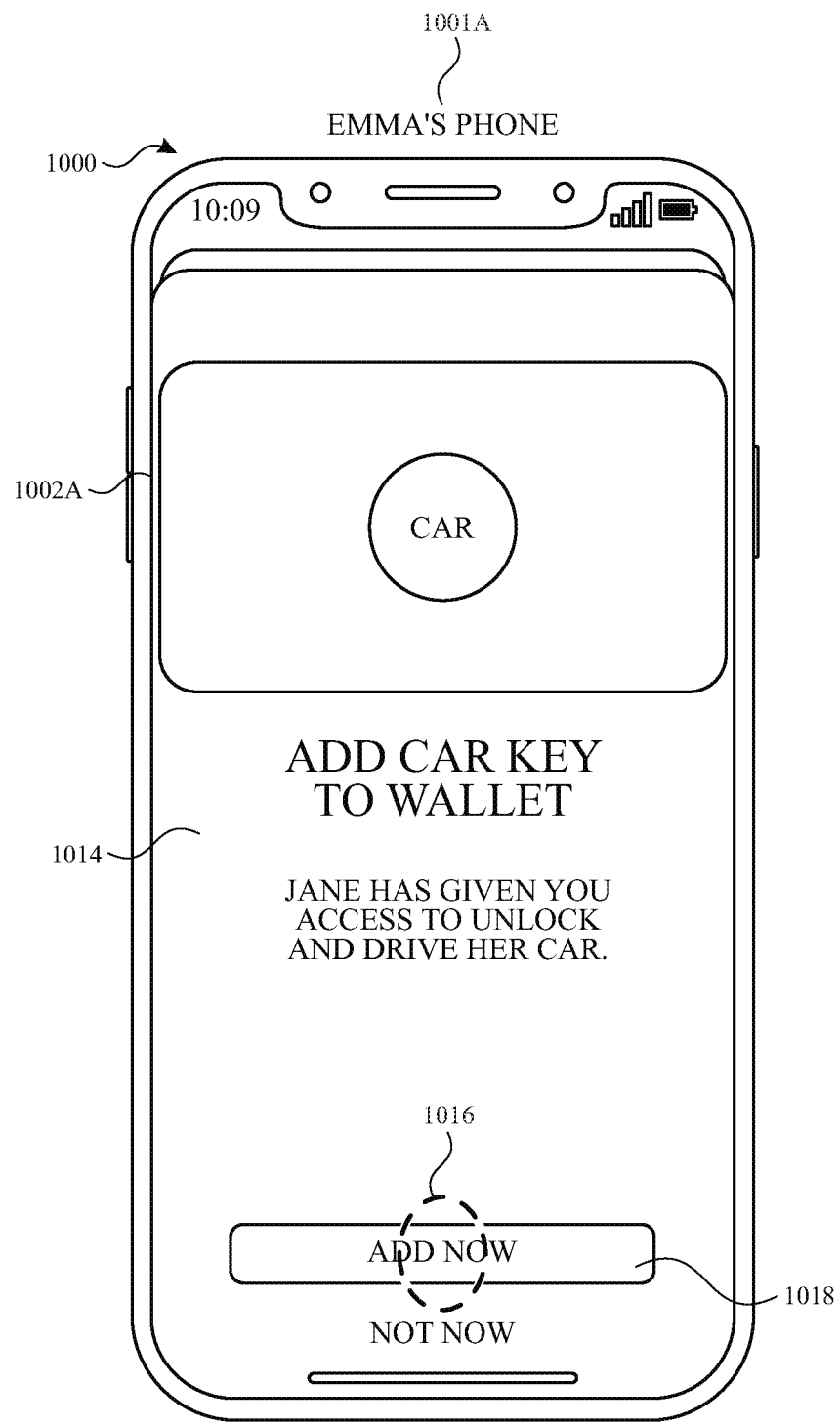

At FIG. 8V, in response to detecting input 1010, electronic device 1000 replaces display of message user interface 1008 with accept user interface 1014. Electronic device 600 detects a tap gesture to accept the invite and add the third secure credential to electronic device 1000. Electronic device 1000 detects input 1016 at a location corresponding to option 1018.

Figure 8W:
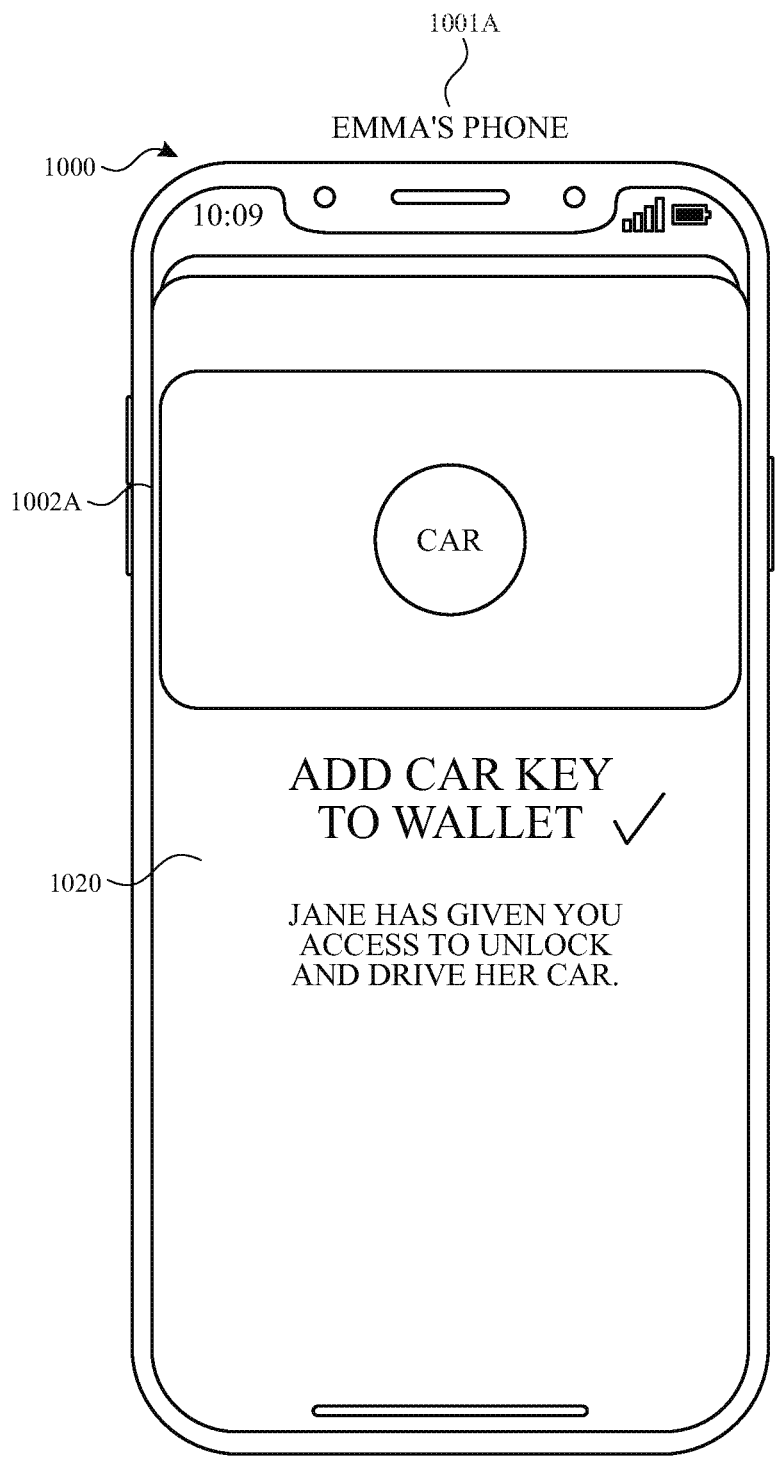

At FIG. 8W, in response to detecting input 1016, electronic device 1000 replaces display of accept user interface 1014 with success user interface 1020, which provides an indication that the third secure credential has been successfully added to electronic device 1000.

Figure 8X:
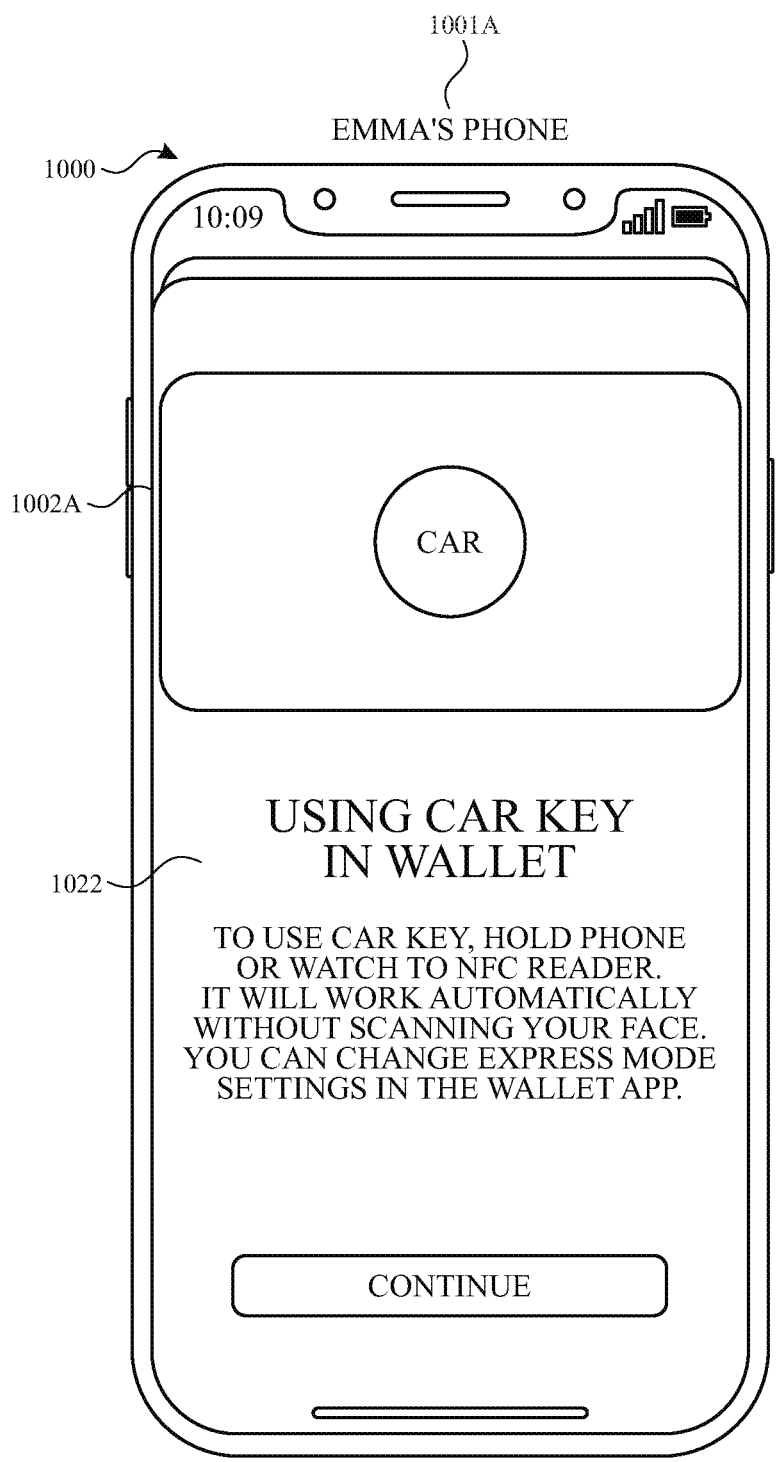

At FIG. 8X, electronic device 600 automatically transitions from success user interface 1020 to completion user interface 1022. In particular, in response to determining that a predetermined amount of time has elapsed, electronic device 1000 replaces display of success user interface 1020 with completion user interface 1022, which indicates that the third secure credential on electronic device 1000 is ready for use. Moreover, completion user interface 1022 includes instructions for how to use the third secure credential on electronic device 1000.

Figure 8Y:
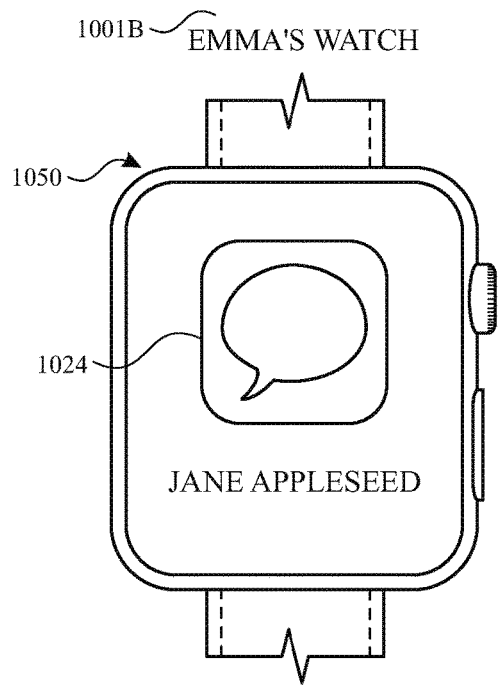

Turning to FIGS. 8Y-8AB, techniques are described with respect to accepting the invitation at companion device 1050 that belongs to the recipient of the invitation, Emma Appleseed. The invitation sent by electronic device 600 provides a secure credential for electronic device 1000 and companion device 1050. Companion device 1050 is a smartwatch that is operably connected to (e.g., paired with) electronic device 1000 when the third secure credential is added to electronic device 1000. In particular, companion device 650 is wirelessly connected to electronic device 600 via a wireless protocol (e.g., Bluetooth). Additionally, companion device 1050 is logged into the same user account as electronic device 1000, as indicated by identifier 1001B. In some embodiments, companion device 1050 includes one or more features of electronic device 100, 300, or 500.

In some embodiments, when the third secure credential is added to electronic device 1000, companion device 1050 is not operably connected to (e.g., paired with) electronic device 1000. In some embodiments, if companion device 1050 is not operably connected (e.g., paired) when the third secure credential is added, then a new secure credential must be requested from electronic device 600 once companion device 1050 is operably connected to electronic device 1000.

At FIG. 8Y, companion device 1050 displays notification 1024, which indicates that companion device 1050 has received a message from Jane Appleseed. The message includes an invitation to use a fourth secure credential that is configured to provide authorization to use one or more functions of the vehicle.

Figure 8Z:
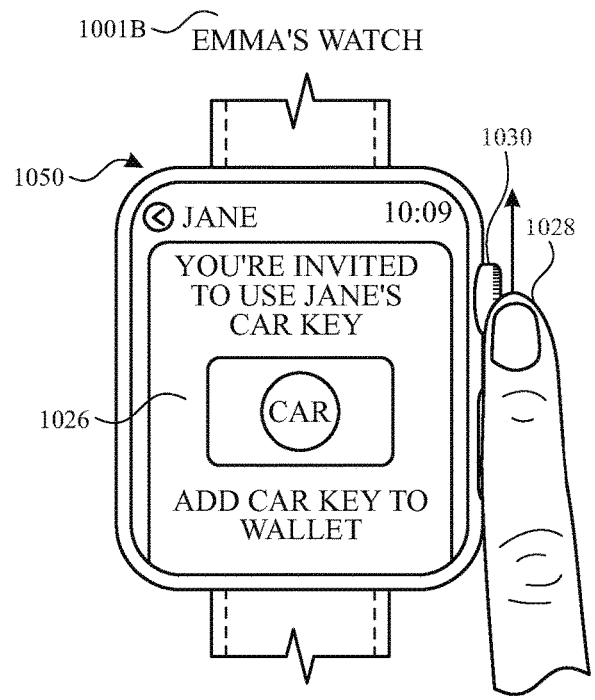
Figure 8A:
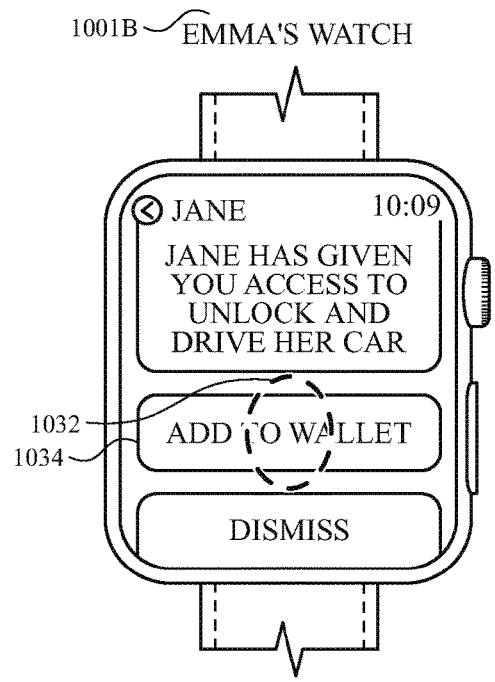
Figure 8A:
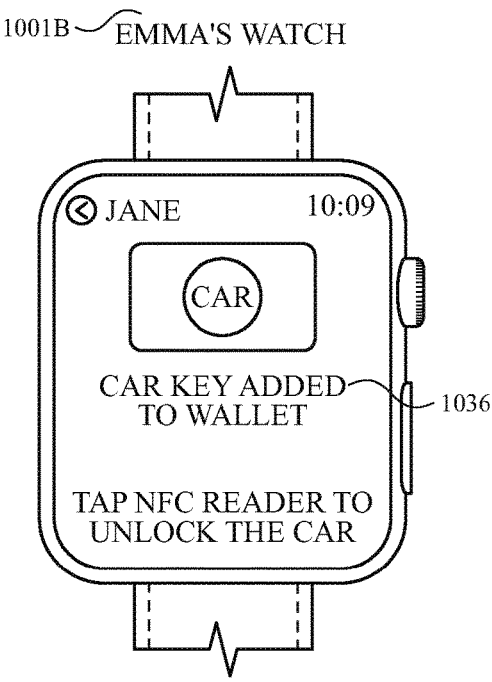
Figure 8A:
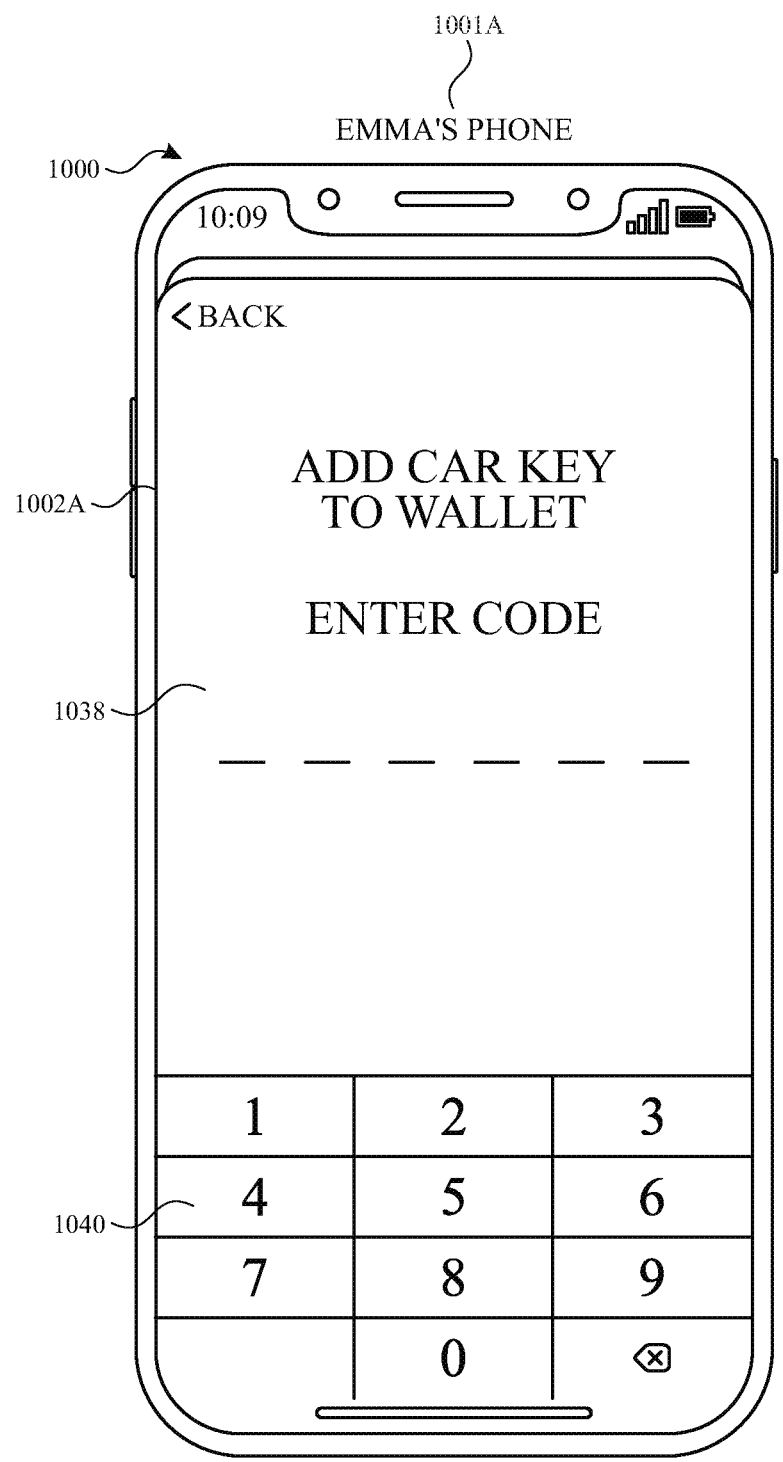
Figure 8A:
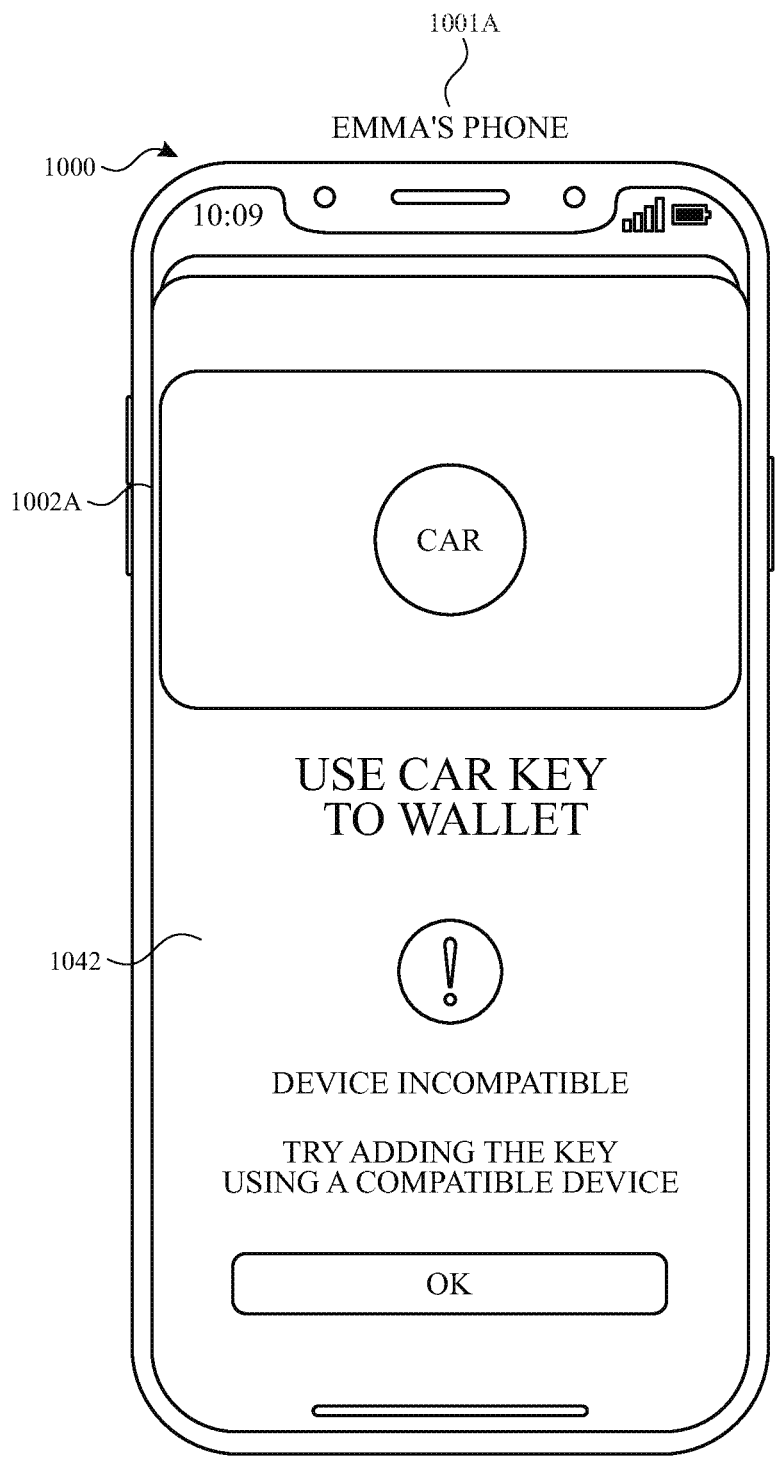

At FIG. 8Z, in response to receiving the message, companion device 1050 displays representation 1026, which represents the invitation to use the fourth secure credential that was sent by Jane Appleseed. Electronic device 600 detects a scroll gesture to display option 1034. Electronic device 1000 detects input 1028 at rotatable input mechanism 1030.

At FIG. 8AA, in response to detecting input 1028, electronic device 1000 scrolls the displayed content and displays option 1034 for adding the fourth secure credential to companion device 1050. Electronic device 600 detects a tap gesture to add the fourth secure credential to companion device 1050. Electronic device 1000 detects input 1032 at a location corresponding to option 1034.

At FIG. 8AB, in response to detecting input 1032, electronic device 1000 displays completion user interface 1036, which indicates that the fourth secure credential on companion device 1050 is ready for use. Moreover, completion user interface 1036 includes instructions for how to use the fourth secure credential on companion device 1050.

When the user attempts to add the third secure credential to electronic device 1000, electronic device 1000 prompts the user to enter a code that was provided by a manufacturer of the vehicle, as shown in FIG. 8AC. In response to detecting input 1010 (or input 1016), electronic device 1000 displays code entry user interface 1038 that includes virtual numpad 1040. It is noted that successful authentication of the inputted code is required to proceed with the process for adding the third secure credential.

When electronic device 1000 is incompatible with the third secure credential, electronic device 1000 displays an error to indicate incompatibility, as shown in FIG. 8AD. In response to detecting input 1010 (or input 1016) and in accordance with a determination that electronic device 1000 is incompatible with the third secure credential, electronic device 1000 forgoes proceeding with the process for adding the third secure credential and displays error user interface 1042, which provides an indication that electronic device 1000 is incompatible with the third secure credential. Additionally, error user interface 1042 prompts the user to add the third secure credential to a device that is compatible with the third secure credential.

FIG. 9 is a flow diagram illustrating a method for inviting a user to use a mobile key (e.g., secure credential) using an electronic device, in accordance with some embodiments. Method 900 is performed at a first electronic device (e.g., 100, 300, 500, 600) with a display. The first electronic device corresponds to a first user account (e.g., the first electronic device is logged into the first user account) and the first electronic device includes a first secure credential (e.g., the first secure credential is stored on a secure element of the first electronic device). In some embodiments, a secure credential is a token or device-specific number corresponding to an account number. In some embodiments, the secure credential is linked to account information associated with an asset (e.g., vehicle, credit card, debit card, etc.). In some embodiments, a second electronic device does not correspond to the first user account (e.g., the second electronic device is not logged into the first user account). In some embodiments, the first secure credential is configured to provide authorization to use one or more functions of a vehicle. Some operations in method 900 are, optionally, combined, the orders of some operations are, optionally, changed, and some operations are, optionally, omitted.

In some embodiments, the first electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 900 provides an intuitive way for inviting a user to use a mobile key (e.g., secure credential). The method reduces the cognitive burden on a user for inviting a user to use a mobile key, thereby creating a more efficient human-machine interface. For battery-operated computing devices, enabling a user to invite a user to use a mobile key faster and more efficiently conserves power and increases the time between battery charges.

The first electronic devices (e.g., 600) displays (902), on the display (e.g., 602A), an invite selectable user interface object (e.g., 806, graphical user interface object or affordance) for inviting a second user account that is different from the first user account to use a second secure credential. In some embodiments, the second secure credential corresponds to the first secure credential. In some embodiments, the second secure credential corresponds to the first secure credential in that both credentials can be used to access or enable the same vehicle, though the second secure credential optionally has restrictions that do not apply to the first secure credential. In some embodiments, the first and second secure credentials are the same. In some embodiments, the first and second secure credentials are different. In some embodiments, the second secure credential is configured to provide authorization to use one or more functions of a vehicle (e.g., car, truck, motorcycle, etc.). In some embodiments, the second user account corresponds to a second electronic device (e.g., the first electronic device is not logged into the second user account, the second electronic device is logged into the second user account). In some embodiments, the invite selectable user interface object (e.g., 806) is concurrently displayed with a representation of a first secure credential corresponding to the first user account.

In some embodiments, the first secure credential is stored in a secure element of the first electronic device (e.g., 600). In some embodiments, the secure element is a hardware component that controls release of secure information. In some embodiments, the secure element is a software component that controls release of secure information. In some embodiments, the secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., biometric authentication, passcode authentication.) In some embodiments, in accordance with a determination that authentication is successful, the secure element provides (or releases) payment information. In some embodiments, in accordance with a determination that authentication is not successful, the secure element forgoes providing (or releasing) payment information.

In some embodiments, the first secure credential is configured to provide authorization to unlock at least a portion of the vehicle (e.g., one or more points of entry (e.g., trunk, glove box, and/or door(s)) of the vehicle unlock). In some embodiments, the first secure credential provides authorization when the first secure credential is transmitted to the vehicle.

In some embodiments, the second secure credential includes a secure credential for a second electronic device (e.g., 1000, a smartphone, a smart watch, a tablet computer associated with the recipient (e.g., that corresponds to (e.g., logged into) a second user account associated with the recipient) and a secure credential for a third electronic device (e.g., 1050, a smartphone, a smart watch, a tablet computer associated with the recipient (e.g., that corresponds to (e.g., logged into) a second user account associated with the recipient) that is operably connected to (e.g., configured to wirelessly communicate with) the second electronic device. In some embodiments, adding the second secure credential to the second electronic device does not require biometric authentication.

In some embodiments, after the second secure credential has been added to the second electronic device (e.g., 1000, smartphone), operably connecting the second electronic device to the third electronic device (e.g., 1050, a new watch is paired to the smartphone). In some embodiments, after (or in response to) the second device being operably connected to the third device, the first electronic device (e.g., 600) requests a new secure credential for use by the third electronic device that is configured to provide authorization to use one or more functions of the vehicle (e.g., because the old secure credential was revoked or expired). In some embodiments, the secure credential for the third electronic device (e.g., that was initially received by the second electronic device) cannot be used by the third electronic device if the third electronic device has not yet been operably connected to the second electronic device at the time that the second electronic device adds the second secure credential. In some embodiments, after the second electronic device is operably connected to the third electronic device, the third electronic device transmits data prompting a request for a new secure credential for the third electronic device. In some embodiments, after (or in response to) receiving the transmitted data, the first electronic device requests a new secure credential for use by the third electronic device.

The first electronic device (e.g., 600) detects (904) a sequence of one or more user inputs (e.g., 832, 842) including selection of a recipient (e.g., corresponding to the second user account, corresponding to candidate 840B) for the second secure credential and user input (e.g., 844) corresponding to selection of the invite selectable user interface object (e.g., 846).

In response to (906) detecting the sequence of one or more user inputs, the first electronic device (e.g., 600) transmits (908) an invitation for the second user account to the recipient selected based on the sequence of one or more user inputs. In some embodiments, transmitting the invitation causes the second electronic device (e.g., 1000) to receive the invitation for the second user account.

In some embodiments, the invitation for the second user account (e.g., corresponding to 808BA) is transmitted to a second electronic device (e.g., 1000) that corresponds to the recipient regardless of proximity between the first electronic device (e.g., 600) and the vehicle. In some embodiments, the invitation for the second user account is transmitted to a second electronic device that corresponds to the recipient regardless of proximity between the second electronic device and the vehicle. In some embodiments, the invitation for the second user account is transmitted to a second electronic device that corresponds to the recipient regardless of the proximity between the first electronic device and the second electronic device.

In some embodiments, the invite graphical user interface object (e.g., 846) is displayed in a user interface (e.g., 828) of a messages application. In some embodiments, the user interface of the messages application includes: a content insertion user interface (such as virtual keyboard (e.g., 838, a plurality of character entry keys (e.g., 832))), and a message entry region (e.g., 836) for inputting content (such as one or more characters typed on the virtual keyboard). In some embodiments, the invitation for the second user account is transmitted via the messages application. In some embodiments, the user interface of the messages application includes one or more representations of messages from participants of a conversation. In some embodiments, the user interface (e.g., 828) of the messages application includes a visual representation of the type of access being sent to the recipient. In some embodiments, selection of the recipient for the second secure credential occurs while the first electronic device (e.g., 600) displays one or more representations (e.g., 840A-840C) of other devices (e.g., contact names, phone numbers). In some embodiments, if a device is not compatible with (e.g., capable of) using the second secure credential, the first electronic device visually distinguishes (e.g., deemphasizes, grays out) a representation of the incompatible device (e.g., as depicted for candidate 840C). In some embodiments, if a device is not compatible with (e.g., capable of) using the second secure credential, the first electronic device does not display a representation of the incompatible device.

In some embodiments, detecting the sequence of one or more user inputs includes receiving biometric information (e.g., corresponding to a face or finger) that is successfully authenticated (e.g., the biometric information corresponds to (e.g., matches) stored credentials, e.g., as depicted in FIGS. 8K-8L). In some embodiments, receiving biometric information occurs in response to receiving a user input that satisfies certain criteria (e.g., 850, a gesture that is a double-press of a virtual or physical button (e.g., 652), a tap on a touch-sensitive surface, a swipe on a touch-sensitive surface, or the like). Requiring successful authentication prior to transmitting the invitation enhances device security by preventing fraudulent uses of the device such as transmitting unauthorized invitations to use one or more functions of the vehicle.

In some embodiments, the first electronic device (e.g., 600) displays, on the display (e.g., 602A), a user interface (e.g., 662) of an electronic wallet application, wherein the user interface of the electronic wallet application includes a representation of the first secure credential (e.g., 666A) and one or more representations of other secure credentials (e.g., 666B-666F) that are not associated with a vehicle manufacturer of the vehicle). In some embodiments, while displaying the user interface of the electronic wallet application, the first electronic device detects one or more user inputs (e.g., 800, 802) corresponding to the representation of the first secure credential. In some embodiments, in response to detecting the one or more user inputs corresponding to the representation of the first secure credential, the first electronic device displays, on the display, additional information (e.g., in settings user interface 672) about the first secure credential, including the invite selectable user interface object (e.g., 806) for inviting the second user account. Concurrently displaying the representation of the first secure credential with one or more representations of other secure credentials enables a user to quickly gain access to secure credentials that provide different types of authorizations (e.g., enable vehicle, enable payment, enable physical access to restricted area). Accordingly, concurrent display of the different representations reduces the number of inputs needed for performing operations pertaining to the representations (e.g., accessing additional information about a respective secure credential). Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after transmitting the invitation for the second user account (e.g., corresponding to 808BA), the additional information (e.g., in settings user interface 672) about the first secure credential includes a status (e.g., 808BB) of the invitation (e.g., pending, expired, active, revoked) for the second user account. In some embodiments, the additional information also includes a status of one or more other invitations (e.g., 808AB). Displaying a status of the invitation for the second user account provides the user with feedback as to whether the second user account has accepted the invitation. Accordingly, extraneous user inputs are prevented, such as user inputs directed to re-sending the invitation. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the status of the invitation for the second user account (e.g., corresponding to 808BA) includes: in accordance with a determination that the invitation for the second user account is available to be added to a second electronic device (e.g., 1000), displaying, on the display (e.g., 602A), a first status (e.g., 808BA, pending, invitation is pending) indicating that the second secure credential is available to be added to the second electronic device.

In some embodiments, displaying the status of the invitation for the second user account (e.g., corresponding to 808BA) includes: in accordance with a determination that the invitation for the second user account has expired (e.g., no longer available to be added to the second electronic device due to a predetermined amount of time having been elapsed), displaying, on the display (e.g., 602A), a second status (e.g., expired) indicating that the invitation for the second user account has expired.

In some embodiments, displaying the status of the invitation for the second user account (e.g., corresponding to 808BA) includes: in accordance with a determination that the second secure credential is available at the second electronic device (e.g., 1000) to provide authorization to use one or more functions of the vehicle (e.g., as a result of the invitation being accepted at the second electronic device), displaying, on the display (e.g., 602A), a third status indicating (e.g., active, access type (e.g., 818A-818F)) that the second secure credential is available at the second electronic device to provide authorization to use one or more functions of the vehicle.

In some embodiments, displaying the status of the invitation for the second user account (e.g., corresponding to 808BA) includes: in accordance with a determination that the authorization the second secure credential is configured to provide is in the process of being revoked, displaying, on the display (e.g., 602A), a fourth status (e.g., pending, revocation is pending) indicating that the authorization the second secure credential is configured to provide is in the process of being revoked.

In some embodiments, displaying the status of the invitation for the second user account (e.g., corresponding to 808BA) includes: in accordance with a determination that the authorization the second secure credential is configured to provide has been revoked, displaying, on the display (e.g., 602A), a fifth status (e.g., revoked) indicating that the authorization the second secure credential is configured to provide has been revoked.

In some embodiments, after transmitting the invitation for the second user account (e.g., corresponding to 808BA), the additional information (e.g., in settings user interface 672) about the first secure credential includes an authorization type (e.g., 818A-818F, authorization to unlock and drive, lock and unlock only, restricted performance of the vehicle; a type that determines which one or more functions of the vehicle can be authorized for use by the second secure credential) corresponding to the second secure credential. In some embodiments, the additional information also includes an access type corresponding to one or more other secure credentials (e.g., corresponding to 808AA, e.g., different from the first and second secure credentials). Concurrently displaying the authorization type with other information (e.g., status of the invitation) enables a user to quickly gain access to various information about the first secure credential. Accordingly, concurrent display of the various information reduces the number of inputs needed for performing operations pertaining to the first secure credential. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after transmitting an invitation for the second user account (e.g., corresponding to 808BA) to the recipient selected based on the sequence of one or more user inputs, the first electronic device (e.g., 600) detects a request (e.g., user input(s) corresponding to a graphical user interface object (e.g., analogous to option 880)) to revoke the second secure credential. In some embodiments, after transmitting an invitation for the second user account (e.g., corresponding to 808BA) to the recipient selected based on the sequence of one or more user inputs and in response to detecting the request to revoke the second secure credential, the first electronic device causes the second secure credential to no longer be configured to provide authorization to use one or more functions of the vehicle. In some embodiments, the first electronic device causes the second secure credential to no longer be configured to provide authorization as a result of transmitting data to at least one of the vehicle, an authentication server, and the second electronic device, where the transmitted data indicates that the second secure credential has been revoked. In some embodiments, revoking the second secure credential includes revoking the invitation for the second user account. In some embodiments, revoking the second secure credential includes revoking the secure credential that was added to the second electronic device after the invitation was accepted. In some embodiments, after revoking the second secure credential, the status of the invitation for the second user account is updated (e.g., as part of the additional information corresponding to the first secure credential (e.g., in settings user interface 672)).

In some embodiments, after transmitting an invitation for the second user account (e.g., corresponding to 808BA) to the recipient selected based on the sequence of one or more user inputs, the first electronic device (e.g., 600) detects (910) a request (e.g., user input(s) (e.g., 862, 864A-864C) corresponding to a graphical user interface object) to change an authorization type for the second secure credential. In some embodiments, after transmitting an invitation for the second user account to the recipient selected based on the sequence of one or more user inputs and in response to detecting the request to change the authorization type for the second secure credential (912), the first electronic device modifies (914) which functions of the vehicle the second secure credential is configured to authorize for use. In some embodiments, modifying which functions of the vehicle the second secure credential is configured to authorize for use includes adding at least one function, removing at least one function, or a combination thereof. In some embodiments, a third secure credential is configured to provide authorization to use one or more functions of the vehicle. In some embodiments, modifying which functions of the vehicle the third secure credential is configured to authorize for use causes the second secure credential and the third secure credential to have a different set of functions for which the respective secure credential can authorize.

In some embodiments, modifying which functions of the vehicle the second secure credential is configured to authorize for use includes causing the second secure credential to (e.g., only) be configured to provide authorization to unlock one or more points of entry (e.g., trunk, door(s)) of the vehicle.

In some embodiments, modifying which functions of the vehicle the second secure credential is configured to authorize for use includes causing the second secure credential to be configured to provide authorization to unlock a trunk of the vehicle without unlocking one or more doors of the vehicle.

In some embodiments, modifying which functions of the vehicle the second secure credential is configured to authorize for use includes causing the second secure credential to be configured to provide authorization to drive the vehicle.

In some embodiments, the first secure credential is configured to provide authorization to operate the vehicle in a first mode (e.g., default/normal suspension settings, full access to infotainment system, full range of RPMs, no restriction on maximum speed, or a combination thereof). In some embodiments, modifying which functions of the vehicle the second secure credential is configured to authorize for use includes causing the second secure credential to be configured to provide authorization to operate the vehicle in a second mode different from the first mode (e.g., change in suspension settings (e.g., more aggressive/less aggressive), limited access to infotainment system, limited range of RPMs, restriction on maximum speed, or a combination thereof).

In some embodiments, transmitting the invitation for the second user account (e.g., corresponding to 808BA) causes a second electronic device (e.g., 1000) to display a graphical user interface object (e.g., 1004, notification, message) that, when selected, initiates a process for adding the second secure credential to the second electronic device. In some embodiments, initiating the process includes launching a messages application, where a user interface (e.g., 1008) of the messages application includes a representation (e.g., 1012) of the invitation sent by the first electronic device (e.g., 600).

In some embodiments, initiating the process for adding the second secure credential to the second electronic device (e.g., 1000) includes adding a third secure credential to a third electronic device (e.g., 1050) that is operably connected to (e.g., configured to wirelessly communicate with) the second electronic device. In some embodiments, the third secure credential corresponds to the first secure credential. In some embodiments, the third secure credential corresponds to the first secure credential in that both credentials can be used to access or enable the same vehicle, though the third secure credential optionally has restrictions that do not apply to the first secure credential. Causing, at the second electronic device, the option to add the third secure credential to the third electronic device as part of the process for adding the second secure credential to the second electronic device provides the user with capability to add the third secure credential without requiring further inputs (beyond the input for initiating the process for adding the third secure credential). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, transmitting the invitation for the second user account (e.g., corresponding to 808BA) causes a second electronic device (e.g., 1000) to prompt (e.g., as depicted in code entry user interface 1038) for valid authentication information (e.g., security code from device (e.g., first electronic device) owner and/or manufacturer of the vehicle) to proceed with adding the second secure credential to the second electronic device.

In some embodiments, transmitting the invitation for the second user account (e.g., corresponding to 808BA) causes a second electronic device (e.g., 1000) to: in accordance with a determination that the second secure credential is not compatible for use with the second electronic device, prompt (e.g., as depicted in error user interface 1042), at the second electronic device, a user to add the second secure credential to a different electronic device that is compatible with the second secure credential. In some embodiments, in accordance with a determination that the second secure credential is compatible for use with the second electronic device, the second electronic device proceeds with the process for adding the second secure credential to the second electronic device.

Note that details of the processes described above with respect to method 900 (e.g., FIG. 9) are also applicable in an analogous manner to the methods described above. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to enroll and use a mobile key. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to assist with enrolling the mobile key or for identifying users related to use of the mobile key. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of enrolling or using the mobile key, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a mobile key can be used based on non-personal information data or a bare minimum amount of personal information, such as data being requested by the device associated with a user, other non-personal information available to the device, or publicly available information.

What is claimed is:

1. A computer system configured to communicate with a display generation component and one or more input devices, comprising:
  one or more processors; and
  memory storing one or more programs configured to be executed by the one or more processors, the one or more programs including instructions for: displaying, via the display generation component, a first user interface of an electronic wallet application that concurrently includes a representation of a first secure credential associated with a first vehicle manufacturer of a first vehicle and one or more representations of other secure credentials that are not associated with a vehicle manufacturer of a vehicle;
  detecting that the computer system is physically near the first vehicle; and
  permitting a user access to use one or more functions of a first vehicle using the first secure credential.

2. The computer system of claim 1, wherein permitting access to use the one or more functions of the first vehicle using the first secure credential includes permitting access to the use the one or more functions of the vehicle without requiring successful authentication of the user.

3. The computer system of claim 1, the one or more programs further including instructions for:
  detecting, via the one or more input devices, a user input corresponding to the representation of the first secure credential; and
  in response to detecting the user input, displaying, via the display generation component, a selectable user interface object that, when selected, permits access to use one or more functions of the first vehicle using the first secure credential without requiring successful authentication of the user after detecting the user input.

4. The computer system of claim 3, wherein the selectable user interface object is displayed as part of a second user interface different from the first user interface.

5. The computer system of claim 3, the one or more programs further including instructions for:
  in response to detecting the user input, displaying, via the display generation component, at least one of an indication of a model of the first vehicle and an indication of an issuer of the first secure credential.

6. The computer system of claim 3, wherein, when the selectable user interface object is not selected, successful authentication of the user is a requirement to access one or more functions of the first vehicle using the first secure credential.

7. The computer system of claim 6, wherein authenticating the user to permit access to use the one or more functions of the first vehicle includes biometrically authenticating a user.

8. The computer system of claim 6, the one or more programs further including instructions for:
  detecting a request to use a first function of the first vehicle;
  in response to detecting the request to use the first function of the first vehicle:
    in accordance with a determination that access to use one or more functions of the first vehicle using the first secure credential without requiring successful authentication of the user has been enabled via the selectable user interface object, performing the first function of the first vehicle; and
    in accordance with a determination that access to use one or more functions of the first vehicle using the first secure credential without requiring successful authentication of the user has not been enabled via the selectable user interface object, displaying, via the display generation component, a prompt for authenticating the user to permit access to use the requested first function of the first vehicle.

9. The computer system of claim 8, wherein authenticating the user to permit access to use the one or more functions of the first vehicle includes:
  displaying, via the display generation component, a plurality of character entry keys for inputting authentication information;
  receiving input, via the plurality of character entry keys, corresponding to authentication information; and
  in response to receiving the input corresponding to authentication information, and in accordance with a determination that the authentication information is valid, permitting access to use the one or more functions of the first vehicle.

10. The computer system of claim 1, wherein the one or more representations of other secure credentials includes a representation of a secure credential that corresponds to a payment account.

11. The computer system of claim 1, wherein the one or more functions of the first vehicle includes at least one of unlocking the first vehicle, opening a trunk of the first vehicle, and starting one or more systems of the first vehicle.

12. A non-transitory computer-readable storage medium storing one or more programs configured to be executed by one or more processors of a computer system that is in communication with a display generation component and one or more input devices, the one or more programs including instructions for:
  displaying, via the display generation component, a first user interface of an electronic wallet application that concurrently includes a representation of a first secure credential associated with a first vehicle manufacturer of a first vehicle and one or more representations of other secure credentials that are not associated with a vehicle manufacturer of a vehicle;
  detecting that the computer system is physically near the first vehicle; and
  permitting a user access to use one or more functions of a first vehicle using the first secure credential.

13. A method comprising:
  at a computer system that is in communication with a display generation component and one or more input devices:
    displaying, via the display generation component, a first user interface of an electronic wallet application that concurrently includes a representation of a first secure credential associated with a first vehicle manufacturer of a first vehicle and one or more representations of other secure credentials that are not associated with a vehicle manufacturer of a vehicle;
    detecting that the computer system is physically near the first vehicle; and
    permitting a user access to use one or more functions of a first vehicle using the first secure credential.

14. The non-transitory computer-readable storage medium of claim 12, wherein permitting access to use the one or more functions of the first vehicle using the first secure credential includes permitting access to the use the one or more functions of the vehicle without requiring successful authentication of the user.

15. The non-transitory computer-readable storage medium of claim 12, wherein the one or more programs further include instructions for:
  detecting, via the one or more input devices, a user input corresponding to the representation of the first secure credential; and in response to detecting the user input, displaying, via the display generation component, a selectable user interface object that, when selected, permits access to use one or more functions of the first vehicle using the first secure credential without requiring successful authentication of the user after detecting the user input.

16. The non-transitory computer-readable storage medium of claim 15, wherein the selectable user interface object is displayed as part of a second user interface different from the first user interface.

17. The non-transitory computer-readable storage medium of claim 15, wherein the one or more programs further include instructions for:
in response to detecting the user input, displaying, via the display generation component, at least one of an indication of a model of the first vehicle and an indication of an issuer of the first secure credential.

18. The non-transitory computer-readable storage medium of claim 15, wherein, when the selectable user interface object is not selected, successful authentication of the user is a requirement to access one or more functions of the first vehicle using the first secure credential.

19. The non-transitory computer-readable storage medium of claim 18, wherein authenticating the user to permit access to use the one or more functions of the first vehicle includes biometrically authenticating a user.

20. The non-transitory computer-readable storage medium of claim 18, wherein the one or more programs further include instructions for:
detecting a request to use a first function of the first vehicle;
in response to detecting the request to use the first function of the first vehicle:
in accordance with a determination that access to use one or more functions of the first vehicle using the first secure credential without requiring successful authentication of the user has been enabled via the selectable user interface object, performing the first function of the first vehicle; and
in accordance with a determination that access to use one or more functions of the first vehicle using the first secure credential without requiring successful authentication of the user has not been enabled via the selectable user interface object, displaying, via the display generation component, a prompt for authenticating the user to permit access to use the requested first function of the first vehicle.

21. The non-transitory computer-readable storage medium of claim 20, wherein authenticating the user to permit access to use the one or more functions of the first vehicle includes:
displaying, via the display generation component, a plurality of character entry keys for inputting authentication information;
receiving input, via the plurality of character entry keys, corresponding to authentication information; and
in response to receiving the input corresponding to authentication information, and in accordance with a determination that the authentication information is valid, permitting access to use the one or more functions of the first vehicle.

22. The non-transitory computer-readable storage medium of claim 12, wherein the one or more representations of other secure credentials includes a representation of a secure credential that corresponds to a payment account.

23. The non-transitory computer-readable storage medium of claim 12, wherein the one or more functions of the first vehicle includes at least one of unlocking the first vehicle, opening a trunk of the first vehicle, and starting one or more systems of the first vehicle.

24. The method of claim 13, wherein permitting access to use the one or more functions of the first vehicle using the first secure credential includes permitting access to the use the one or more functions of the vehicle without requiring successful authentication of the user.

25. The method of claim 13, further comprising:
detecting, via the one or more input devices, a user input corresponding to the representation of the first secure credential; and
in response to detecting the user input, displaying, via the display generation component, a selectable user interface object that, when selected, permits access to use one or more functions of the first vehicle using the first secure credential without requiring successful authentication of the user after detecting the user input.

26. The method of claim 25, wherein the selectable user interface object is displayed as part of a second user interface different from the first user interface.

27. The method of claim 25, further comprising:
in response to detecting the user input, displaying, via the display generation component, at least one of an indication of a model of the first vehicle and an indication of an issuer of the first secure credential.

28. The method of claim 25, wherein, when the selectable user interface object is not selected, successful authentication of the user is a requirement to access one or more functions of the first vehicle using the first secure credential.

29. The method of claim 28, wherein authenticating the user to permit access to use the one or more functions of the first vehicle includes biometrically authenticating a user.

30. The method of claim 28, further comprising:
detecting a request to use a first function of the first vehicle;
in response to detecting the request to use the first function of the first vehicle:
in accordance with a determination that access to use one or more functions of the first vehicle using the first secure credential without requiring successful authentication of the user has been enabled via the selectable user interface object, performing the first function of the first vehicle; and
in accordance with a determination that access to use one or more functions of the first vehicle using the first secure credential without requiring successful authentication of the user has not been enabled via the selectable user interface object, displaying, via the display generation component, a prompt for authenticating the user to permit access to use the requested first function of the first vehicle.

31. The method of claim 30, wherein authenticating the user to permit access to use the one or more functions of the first vehicle includes:
displaying, via the display generation component, a plurality of character entry keys for inputting authentication information;
receiving input, via the plurality of character entry keys, corresponding to authentication information; and
in response to receiving the input corresponding to authentication information, and in accordance with a determination that the authentication information is valid, permitting access to use the one or more functions of the first vehicle.

32. The method of claim 13, wherein the one or more representations of other secure credentials includes a representation of a secure credential that corresponds to a payment account.

33. The method of claim 13, wherein the one or more functions of the first vehicle includes at least one of unlocking the first vehicle, opening a trunk of the first vehicle, and starting one or more systems of the first vehicle.

\* \* \* \* \*

UNITED STATES PATENT AND TRADEMARK OFFICE
CERTIFICATE OF CORRECTION

PATENT NO. : 12,221,065 B2
APPLICATION NO. : 18/595238
DATED : February 11, 2025
INVENTOR(S) : Vitalii Kramar et al.

Page 1 of 1

It is certified that error appears in the above-identified patent and that said Letters Patent is hereby corrected as shown below:

In the Claims

In Column 59, Lines 15-16, Claim 2, delete "to the use the one or more" and insert -- to use the one or more --, therefor.

In Column 60, Lines 59-60, Claim 14, delete "to the use the one or more" and insert -- to use the one or more --, therefor.

In Column 62, Lines 6-7, Claim 24, delete "to the use the one or more" and insert -- to use the one or more --, therefor.

Signed and Sealed this
Fifteenth Day of April, 2025

Coke Morgan Stewart
*Acting Director of the United States Patent and Trademark Office*